US009710741B2

(12) United States Patent
Nosaka

(10) Patent No.: US 9,710,741 B2
(45) Date of Patent: Jul. 18, 2017

(54) INFORMATION CODE GENERATION METHOD, INFORMATION CODE, AND INFORMATION CODE USE SYSTEM

(71) Applicant: DENSO WAVE INCORPORATED, Chita-gun, Aichi-pref. (JP)

(72) Inventor: Kazuto Nosaka, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 109 days.

(21) Appl. No.: 14/706,411

(22) Filed: May 7, 2015

(65) Prior Publication Data

US 2015/0332136 A1 Nov. 19, 2015

(30) Foreign Application Priority Data

May 16, 2014 (JP) ................................ 2014-102610

(51) Int. Cl.
*G06K 19/06* (2006.01)
(52) U.S. Cl.
CPC ... *G06K 19/06037* (2013.01); *G06K 19/0614* (2013.01); *G06K 19/06046* (2013.01); *G06K 19/06075* (2013.01)
(58) Field of Classification Search
CPC ............. G06K 19/06; G06K 19/06009; G06K 19/06037; G06K 19/06046; G06K 19/06103; G06K 19/06075
See application file for complete search history.

(56) References Cited

U.S. PATENT DOCUMENTS

| 6,267,296 B1 * | 7/2001 | Ooshima | G06K 19/06037 235/462.08 |
| 8,978,989 B2 * | 3/2015 | Friedman | G06K 19/06037 235/492 |
| 2007/0277150 A1 * | 11/2007 | Oouchi | G06F 8/36 717/109 |
| 2009/0242649 A1 * | 10/2009 | Mizukoshi | G06K 19/06037 235/494 |
| 2009/0255992 A1 * | 10/2009 | Shen | G06T 11/60 235/462.1 |

(Continued)

FOREIGN PATENT DOCUMENTS

JP 5057560 B2 10/2012

*Primary Examiner* — Thien M Le
*Assistant Examiner* — April Taylor
(74) *Attorney, Agent, or Firm* — Oliff PLC

(57) ABSTRACT

An information code generation method producing information code by an information code generation apparatus is provided. Cells are arranged inside a predetermined code area of the information code. The cells function as a unit of information. The information code generation method includes providing a specific pattern region and a data recording region inside the code area, the specific pattern region being disposed with a specific pattern having a predetermined shape, the data recording region storing a data using multiple kinds of cells; and showing at least a part of the code area using a shape, a pattern, a color, or a combination of the shape, the pattern, and the color. The shape, the pattern, the color, or the combination of them identifies a classification regarding a code content of at least either a record content stored in the code area or a display content shown in the code area.

35 Claims, 30 Drawing Sheets

(56) References Cited

U.S. PATENT DOCUMENTS

| | | | |
|---|---|---|---|
| 2013/0021364 A1* | 1/2013 | Azuma | G06K 19/06103 345/589 |
| 2014/0326792 A1* | 11/2014 | Sakahashi | G06K 19/06037 235/494 |
| 2014/0326793 A1* | 11/2014 | Windmueller | G06K 19/06037 235/494 |
| 2016/0042262 A1* | 2/2016 | Tanaka | G06K 7/1417 235/494 |
| 2016/0092760 A1* | 3/2016 | Tanaka | G06K 7/1443 382/180 |

* cited by examiner

| REGISTRATION TARGET | IMAGE | CLASSIFICATION | PERSONAL INFORMATION |
|---|---|---|---|
| PERSON 1 | IMAGE 1 | CLASSIFICATION 1 | INFORMATION 1 |
| PERSON 2 | IMAGE 2 | CLASSIFICATION 1 | INFORMATION 2 |
| PERSON 3 | IMAGE 3 | CLASSIFICATION 3 | INFORMATION 3 |
| PERSON 4 | IMAGE 4 | CLASSIFICATION 2 | INFORMATION 4 |
| PERSON 5 | IMAGE 5 | CLASSIFICATION 4 | INFORMATION 5 |
| ⋮ | ⋮ | ⋮ | ⋮ |

INFORMATION CODE GENERATION METHOD, INFORMATION CODE, AND INFORMATION CODE USE SYSTEM

CROSS REFERENCE TO RELATED APPLICATIONS

The present disclosure is based on Japanese Patent Application No. 2014-102610 filed May 16, 2014, the disclosure of which is incorporated herein by reference.

TECHNICAL FIELD

The present disclosure relates to an information code generation method, an information code, and an information code use system.

BACKGROUND ART

Patent literature 1: Japanese Patent No. 5057560.

Recently, a use of an information code is diversified, and a provided technology disposes a photograph and a drawing inside a code area. For example, a technology in patent literature 1 calculates an inverse conversion bit string that configures a region read as a single value in a two dimensional code through an inverse conversion of a bit string, generate a two dimensional code by converting the inverse conversion bit string based on format information of a two dimensional code, and generates a special two dimensional code having a design region configured from a single gradation value.

As described in the technology in patent literature 1, conventionally, a technology such as not only simply storing a data, but also changing a shape and a color of a cell and putting a picture and a character inside the code area as an information code may be progressed so that a design property is improved. According to this technology, an information code with originality is likely to be used according to a utilization of a user.

The inventor of the present disclosure has found the following. According a conventional use method, in order to improve design property, a cell shape and a cell color are changed or an incorporation of a picture and a character is performed. A further advanced use method is not considered at all. For example, it may be considered a use method that causes to visually suppose that a stored data relates to which subject by displaying a facial image of a person in a code area and by storing an e-mail address of the person in a data recording region. However, an advanced use that immediately recognizes an attribution of the subject by a visual sense and combines the recognized result with a following action may be extremely difficult. Accordingly, although a conventional information code may provide a certain convenience to a user, an effect is limited.

SUMMARY

It is an object of the present disclosure to provide an information code by which a classification of code content included in a code area is enabled to be immediately recognized by a visual sense, a generation method generating the information code, and a use system utilizing the information code.

According to a first aspect, an information code generation method producing information code by an information code generation apparatus is provided. Cells are arranged inside a predetermined code area of the information code. The cells function as a unit of information. The information code generation method includes providing a specific pattern region and a data recording region inside the code area, the specific pattern region being disposed with a specific pattern having a predetermined shape, the data recording region storing a data using multiple kinds of cells; and showing at least a part of the code area using a shape, a pattern, a color, or a combination of the shape, the pattern, and the color. The shape, the pattern, the color, or the combination of the shape, the pattern, and the color identifies a classification regarding a code content of at least either a record content stored in the code area or a display content shown in the code area.

According to a second aspect, an information code arranged with cells inside a predetermined code area is provided. The cells functions as a unit of information. The information code includes a specific pattern region disposed with a specific pattern having a predetermined shape inside the code area; and a data recording region storing data with multiple kinds of cells. A shape, a pattern, a color, or a combination of the shape, the pattern, and the color identifies a classification regarding a code content of at least either a record content that is stored inside the code area or a display content that is displayed in the code area. At least a part of the code area is shown using the shape, the pattern, the color, or the combination of the shape, the pattern, and the color.

According to a third aspect, an information code use system is provided. The information code use system includes an information code generation portion producing an information code, cells being arranged inside a predetermined area of the information code, the cells functioning as a unit of information; and an information code display portion enabling to display the information code generated by the information code generation portion. The information code generation portion provides a specific pattern region disposed with a specific pattern having a predetermined shape and a data recording region storing a data by multiple kinds of cells inside the code area. The information code generation portion generates the information code that shows at least a part of the code area using a shape, a pattern, a color, or a combination of the shape, the pattern, and the color that identifies a classification regarding a code content of at least either a record content stored in the code area or a display content displayed on the code area. The information code display portion includes a display device enabling to display an image. The display device displays the information code generated by the information code generation portion.

According to a fourth aspect, an information code use system is provided. The information code use system includes an information code generation portion producing an information code, cells being arranged inside a predetermined code area of the information code, the cells functioning as a unit of information; and an information code read portion reading the information code generated by the information code generation portion. The information code generation portion provides a specific pattern region disposed with a specific pattern having a predetermined shape and a data recording region storing data by multiple cells inside the code area. The information code generation portion generates the information code that shows at least a part of the code area using a shape, a pattern, a color, or a combination of the shape, the pattern, and the color that identifies a classification regarding a code content of at least either a record content stored in the code area or a display content displayed on the code area.

According to the information code generation method, it is possible to show at least a part of the code area in the generated information code using a shape, a pattern, a color, or a combination of them. The shape, the pattern, the color, or the combination of them identifies a classification regarding a code content (at least either the record content stored in the code area or the display content shown in the code area). According to the information code, it is possible that a user and a third person recognize a classification of a target shown by the information code without reading, and it is possible that a new use method is performed. The new use method cannot be performed with a conventional information code.

According to the information code of the present disclosure, it is possible to provide information code having an effect similar to the information code generation method.

According to the information code use system, it is possible to provide information code having the effect similar to the information code generation method. In addition, a novel use method by which the information code showing the classification to which the code content belongs visually recognizably is displayed and used in the display device may be possible.

According to the information code use system in the present disclosure, it is possible to provide a system by which an information code having the effect similar to the information code generation method is generated. The information code use system is an electrically readable system.

According to the information code generation method, the information code, and the information code use system in the present disclosure, it is possible to provide an information code by which a classification of code content included in a code area is enabled to be immediately recognized by a visual sense, a generation method generating the information code, and an use system utilizing the information code.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
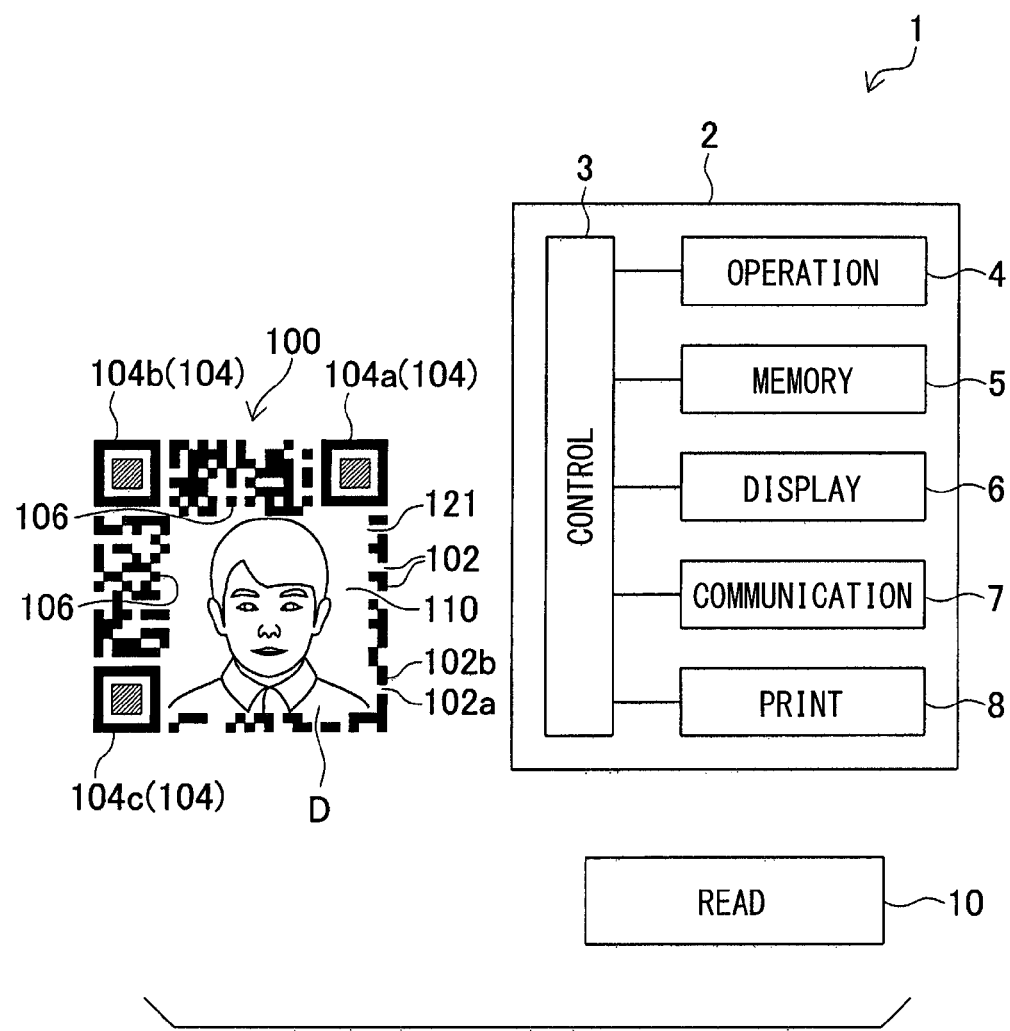
FIG. 1 is a diagram schematically exemplifying a part of an information code use system according to a first embodiment.

A first embodiment will be explained with referring to the drawings.

An information code use system 1 described in FIG. 1 includes an information code generation apparatus 2 and an information code read apparatus 10. The information code generation apparatus 2 generates an information code 100 in which cells are arranged inside a predetermined code area. The cells function as a unit of information. The information code read apparatus 10 reads out the information code 100 generated by the information code generation apparatus 2. A basic configuration of the information code generation apparatus 2, the information code read apparatus 10, and the information code 100 described in FIG. 1 will be explained.

(Information Code Generation Apparatus)

The information code generation apparatus 2 corresponds to an example of an information code generation portion. For example, the information code generation apparatus 2 is configured as an information processing apparatus such as a personal computer. For example, the information code generation apparatus 2 includes a control portion 3 including a CPU, an operation portion 4 including a key board, a mouse, and another input device, a memory portion 5 including a ROM, a RAM, a HDD, and a storage device such as a non-volatile memory, a display portion 6 including a known display device (a liquid crystal display, and another display device), a communication portion 7 functioning as a communication interface performing a wire communication or a wireless communication with an external device, and a print portion 8 (a print device) having a hardware configuration similar to a known printer and printing the information code 100 based on a print data transmitted from the control portion 3.

(Information Code Read Apparatus)

A whole structure of the information code read apparatus 10 will be explained. The information code read apparatus 10 corresponds to an example of an information code read portion. As described in FIG. 2, the information code read apparatus 10 is configured as a code reader that enables to read a two dimensional code in a hardware manner. A not-shown case configures an outer ward of the information code read apparatus 10. The case contains various electronic components.

The information code read apparatus 10 mainly includes an optical system, a microcomputer system, and a power source system. The optical system includes an illumination light source 21, a light reception sensor 23, a filter 25, and an image formation lens 27 or the like. The microcomputer system includes a memory 35, a control circuit 40, an operation switch 42, a liquid crystal display 46, or the like. The power source system includes a power switch 41, a battery 49, or the like. Incidentally, they are mounted to a not-shown printed wiring board, or contained into the case (not shown).

The optical system includes the illumination light source 21, the light reception sensor 23, the filter 25, and the image formation lens 27. The illumination light source 21 functions as an illumination light source that enables to emit illumination light Lf. For example, the illumination light source 21 includes a diffusion lens provided to a red color LED and an outgoing side of the LED, a condenser lens, or the like. In the present configuration, the illumination light sources 21 are provided to the both sides sandwiching the light reception sensor 23. The illumination light Lf is emitted to a read target R through a read port (not shown) provided to the case. It may be considered that a various targets such as resin material and metal material correspond to the read target R, for example. The information code 100, for example, as described in FIG. 1 is provided to the read target R by a known image formation method. An information code display apparatus 90 may be the read target R. In this case, the information code 100 displayed on the information code display apparatus 90 corresponds to the read target by the read apparatus 10.

The light reception sensor 23 corresponds to an example of an imaging portion that enables to image the information code 100. The light reception sensor 23 enables to receive a light Lr (for example, a reflection light irradiated to and reflected from the read target R and the information code 100, or a light emitted from the read target R) from the read target R. For example, an area sensor corresponds to the light reception sensor 23. In the area sensor, light receiving elements that are a solid state image sensing device such as C-MOS and CCD are arranged two-dimensionally. The light reception sensor 23 is mounted to the not-shown printed wiring board so as to receive an incident light entering through the image formation lens 27 with a light reception surface 23a.

The filter 25 corresponds to an optical low pass filter that permits a passing of a light equal to or less than a wavelength corresponding to the reflection light Lr and blocks a passing of a light exceeding the corresponding wavelength, for example. The filter 25 is provided between the reading port (not shown) provided in the case and the image formation lens 27. Accordingly, an unnecessary light exceeding the wavelength corresponding to the reflected light Lr is prevented from entering the light reception sensor 23. The image formation lens 27 includes, for example, a lens barrel and multiple condenser lenses housed in the lens barrel. In the present configuration, the image formation lens 27 condenses the reflected light Lr entering into the reading port (not shown) provided to the case, and forms a code image of the information code 100 on the light reception surface 23a of the light reception sensor 23.

The microcomputer system includes an amplifying circuit 31, an A/D conversion circuit 33, a memory 35, an address generation circuit 36, a synchronization signal generation circuit 38, a control circuit 40, the operation switch 42, a LED 43, a buzzer 44, a liquid crystal display 46, and a communication interface 48. The microcomputer system mainly includes the control circuit 40 functioning as a microcomputer (an information processing device) and the memory 35. The microcomputer system enables to perform signal processing of an image signal of the information code 100 imaged by the optical system in a hardware manner and in a software manner.

An image signal (an analog signal) outputted from the light reception sensor 34 in the optical system is input to the amplifying circuit 31, and then, amplified at a predetermined gain. After amplification, the image signal is input to the A/D conversion circuit 33, and converted from the analog signal to a digital signal. The digitalized image signal, that is, the image data (image information) is input to the memory 35, and is stored to an image data storage region in the memory 35. Incidentally, the synchronization signal generation circuit 38 enables to generate a synchronization signal to the light reception sensor 23 and the address generation circuit 36. The address generation circuit 36 enables to generate a storage address of the image data stored in the memory 35 based on the synchronization signal supplied from the synchronization signal generation circuit 38.

The memory 35 includes a known storage medium such as a semiconductor memory device. The memory 35 corresponds to a RAM (DRAM, SRAM), a ROM, a non-volatile memory, or the like. The RAM in the memory 35 enables to secure the image data storage region. The RAM in the memory 35 enables to secure a working region and a read condition table that the control circuit 40 uses at the time of each processing such as an arithmetic operation and a logical operation. The ROM stores a predetermined program enabling to execute read processing, and stores a system program enabling to control each hardware such as the illumination light source 21, and the light reception sensor 23 in advance.

The control circuit 40 corresponds to a microcomputer enabling to control the whole information code read apparatus 10. The control circuit 40 includes a CPU, a system bus, and an input output interface. The control circuit 40 has an information processing function. The control circuit 40 is connected with various input and output devices (peripheral devices) through an installed input output interface. In the present configuration, the control circuit 40 is connected with the power switch 41, the operation switch 42, the LED 43, the buzzer 44, the liquid crystal display 46, and the communication interface 48. The communication interface 48 is communicably connected to a host computer HST corresponding to an upper system of the information code read apparatus 10.

The power source system includes the power switch 41 and the battery 49. Turning on and off of the power switch 41 managed by the control circuit 40 controls a conduction and block of drive voltage supplied from the battery 49 to each device and each circuit. Incidentally, the battery 49 is a secondary battery enabling to generate a predetermined DC voltage, and is, for example, a lithium ion battery.

(Basic Configuration of Information Code)

Figure 5:
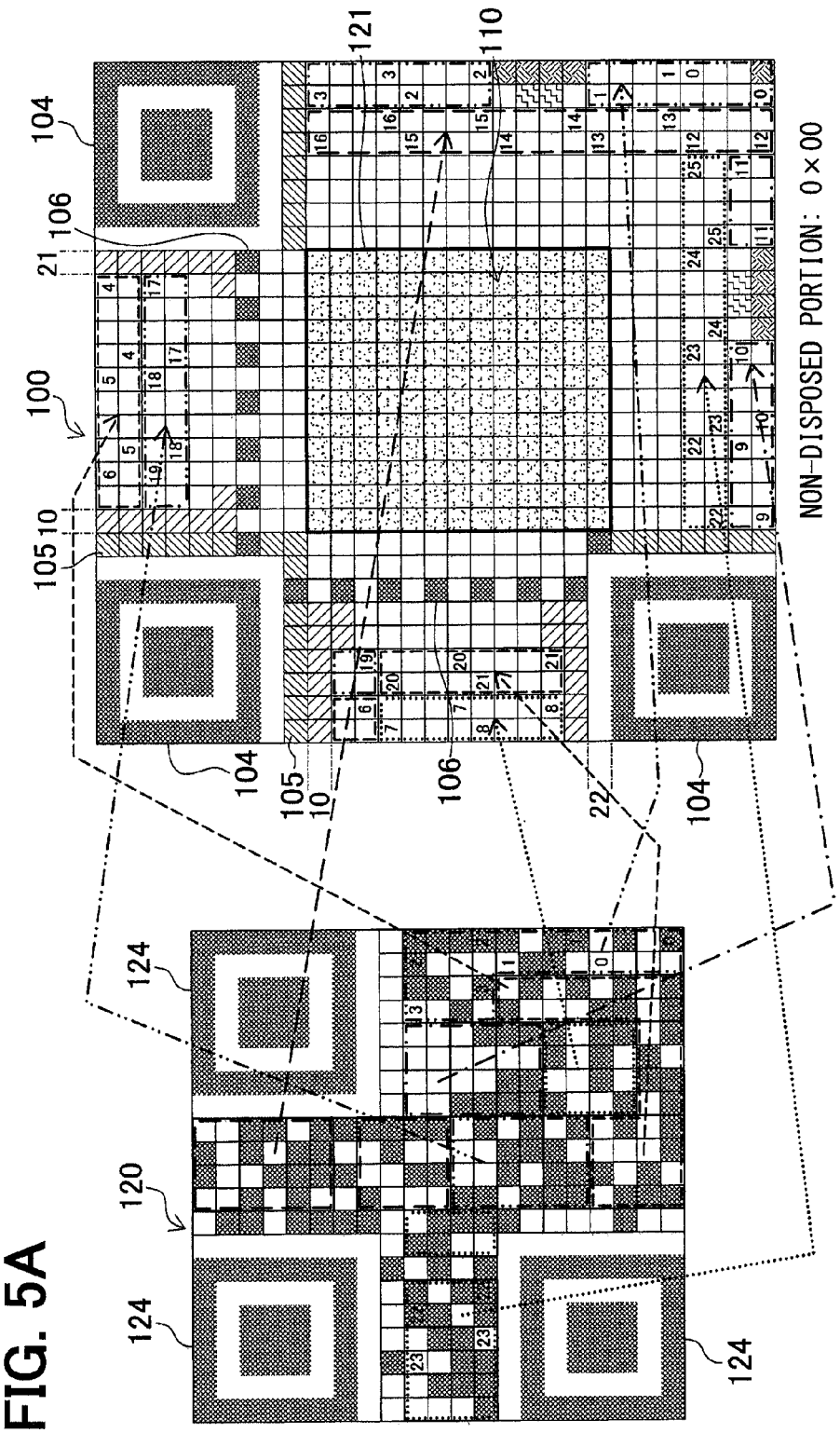
FIG. 5A is a diagram explaining a correspondence relation between an arrangement of each data word in the information code generated by the information code generation apparatus configuring the information code use system in FIG. 1 and an arrangement of each data word in the different type of the code.
FIG. 5B is a diagram explaining a correspondence relation between the arrangement of each data word in the information code generated by the information code generation apparatus configuring the information code use system in FIG. 1 and an arrangement of each data word in the different type of the code.

The information code 100 used in the information code use system in FIG. 1 will be explained with referring to FIG. 1, FIG. 5A, FIG. 5B, or the like. Incidentally, in an example of FIG. 1 and an example of a right part of FIG. 5A, a cell arrangement and size of a specific pattern are slightly different. However, a basic concept is similar and a similar feature is included. The information code 100 described in FIG. 1, FIG. 5A, FIG. 5B, or the like is generated by the above described information code generation apparatus 2. A cell 102 (a bright color cell 102a or a dark color cell 102b) serving a unit displaying information within a predetermined code area is arranged. Incidentally, in the information code 100 in FIG. 1, FIG. 5A, FIG. 5B, or the like, a code area corresponds to a rectangular shape region that may include all dark color cells, which are arranged. Specifically, the code area corresponds to a minimum square region or a rectangular region including all three position detection patterns (segment symbols) 104. Incidentally, in the examples of FIG. 1, FIG. 5A, FIG. 5B, or the like, each of the multiple cells 102 is configured from a bright color (a white color) cell 102a or a dark color (a black color) cell 102b having a rectangular shape (for example, an outer shape being a square shape). The cells 102 are disposed in a matrix shape around a free space 110 inside the code area. The bright color cell 102a and the dark color cell 102b respectively are not limited to a white color cell and a black color cell. When the dark color cell 102b is configured at a predetermined brightness, the bright color cell 102a may have brightness higher than the brightness of the dark color cell 102b. A margin region being a bright color or a dark color is provided around the code area in the information code 100 so as to surround the code area. In the example of FIG. 1, FIG. 5A, FIG. 5B, or the like, the margin region being the bright color (for example, a white color or another color having brightness higher than the dark color cell) are adjacently disposed around the code area.

The information code 100 includes a specific pattern region, a data recording region, and an error correction code recording region inside the code area having the rectangular shape (for example, a square shape or a rectangular shape). In the specific pattern region, a specific pattern having a predetermined shape is disposed. In the data recording region, a data is stored by multiple kinds of cells 102. In the error correction code recording region, an error correction code is stored by the multiple kinds of cells 102. As described in FIG. 1, FIG. 5A, FIG. 5B, or the like, the specific pattern in the information code 100 has an identical shape and an identical position to a specific pattern of a known predetermined model number (in the examples in FIG. 5A and FIG. 5B, a predetermined model number of a QR code standardized by JIS or the like) of a QR code (a registered trademark), for example. In the examples in FIG. 1, FIG. 5A, FIG. 5B, or the like, in three corners of the code area, the position detection patterns (the segment symbols) 104 as the specific pattern are disposed. Incidentally, the position detection pattern 104 corresponds to a position to be detected as a mark for specifying a position (for example, a rectangular boundary providing an outward form of the code area) of the code area at the time of reading. In the present configuration, three position detection patterns 104 are disposed to the three corners of the code area in a similar configuration of a position detection pattern (a segment symbol) of a standardized QR code (a registered trademark). At the time of reading, for example, the position detection patterns 104 are recognized by a recognition method (for example, a method that recognizes a region where a dark color region and a bright color region are alternately disposed at a width ratio of 1:1:3:1:1) identical with a recognition method of the QR code. Incidentally, although an example of the position detection pattern is described, another configuration other than the position detection pattern 104 may be used as long as a pattern is configured from a fixed graphic pattern and is used as a mark detecting a position (for example, an outward shape of the code form) of the code area.

A timing pattern 106 as the specific pattern is also provided at a predetermined position in the predetermined model number. In the information code 100, the specific pattern (the position detection pattern 104 and the timing pattern 106) is disposed at a predetermined position with a fixed shape. The position detection pattern 104 may also be referred to as a specific pattern 104. Incidentally, a position other than a free space 110 inside the code area includes the specific region, a recording region (a region including the data recording region, the error correction code recording region), or the like.

The read apparatus may recognize the number of rows and columns of cells in the information code 100, a shape and a position of the specific pattern, a position of the format information, and a candidate position (an address specifying a disposition order of the cord word) of a code word in any manner. For example, multiple model numbers may be provided in a classification of the information code 100. In this case, it may be sufficient that the number of rows and columns of cells, the shape and the position of the specific pattern, the position of the format information, and a candidate position (an address) where a cord word is disposed are determined for each model number in advance. When model number information specifying the model number is disposed at a determined position (a reserved region) determined inside the code area, it may be possible that the read apparatus recognizes the number of rows and columns of cells in the information code 100, the shape and the position of the specific pattern, the position of the format information, and the candidate position (the address) of the code word, based on the model number information. Incidentally, the manner is not limited to this method, and another method may be used as long as the read apparatus enables to recognize them.

The free space 110 corresponds to a region where data is not stored by the cell 102 and an error correction is not performed by an error correction code. The free space 110 having a size larger than a size of a single cell 102 is provided inside the code area at a position other than the specific pattern region, the data recording region, and the error correction code recording region. In the examples of FIG. 1, FIG. 5A, FIG. 5B, or the like, the data recording region and the error correction code recording region are disposed along a peripheral border of the code area in a circular and rectangular shape. The free space 110 is provided at a lower right position from a central part (a predetermined region including a center of the code area) in the code area. Incidentally, a region where data is not stored by the cell 102 corresponds to a region where a code word such as a data code word and an error code word is not stored and the format information is not stored. And, a region where the error correction is not performed with the error correction code corresponds to a region where the error correction using the error correction code stored in the error correction code recording region is not performed. Therefore, even when something is displayed on the free space 110, the error correction code of the error correction code recording region existing around the free space 110 does not perform error correction for the displayed something.

In the following explanations, it is supposed that a configuration corresponding to the predetermined model number as described in a right portion in FIG. 5A is associated with another configuration with a different model number (Ver. number) whose size is smaller than the predetermined model number as described in a left portion in FIG. 5A, and it is supposed that a position of each code word of the information code 100 in the right portion in FIG. 5A is associated with a position of each code word of a different type code 120 in the left portion in FIG. 5A by an arrangement conversion table in FIG. 5B. This example will be referred to as a representative example. In this example, when the amount of data corresponds to the amount of data which can be stored by a different type code 120 of the left portion in FIG. 5A, the data may be shown in the information code 100 as described in the right portion with providing the free space 110. It is configured that, when the information code 100 in the right portion in FIG. 5A is read, each code word in the information code 100 is read as a code word of the different type code 120 described in the left portion in FIG. 5A. Incidentally, with respect to the right portion and the left portion in the drawings, it is assumed that a sheet is disposed in a horizontal direction and the drawings are viewed.

In the right portion of FIG. 5A, a region of each code disposed around the free space 110 is conceptually indicated by a broken line frame or the like. Incidentally, in the right portion of FIG. 5A, only a partial region of the code word is conceptually illustrated, and an illustration of the residual region of the cord word is omitted. Another code word can be disposed so as to fill a region around the free space 110. A region (a predetermined position 105) storing the format information is conceptually illustrated by a predetermined kind of hatching. Incidentally, in the right portion of FIG. 5A, in the region storing the format information or the region storing the code word, only a box is illustrated, and a specific arrangement of the bright color cell and the dark color cell is omitted. In addition, in the example of the right portion of FIG. 5A, a box is illustrated inside the free space 110 (the central region of the code area) for making correspondence with a cell arrangement. It should be noted that the configuration of the free space 110 is not limited to this case, and any other configuration may be applied.

Figure 6:
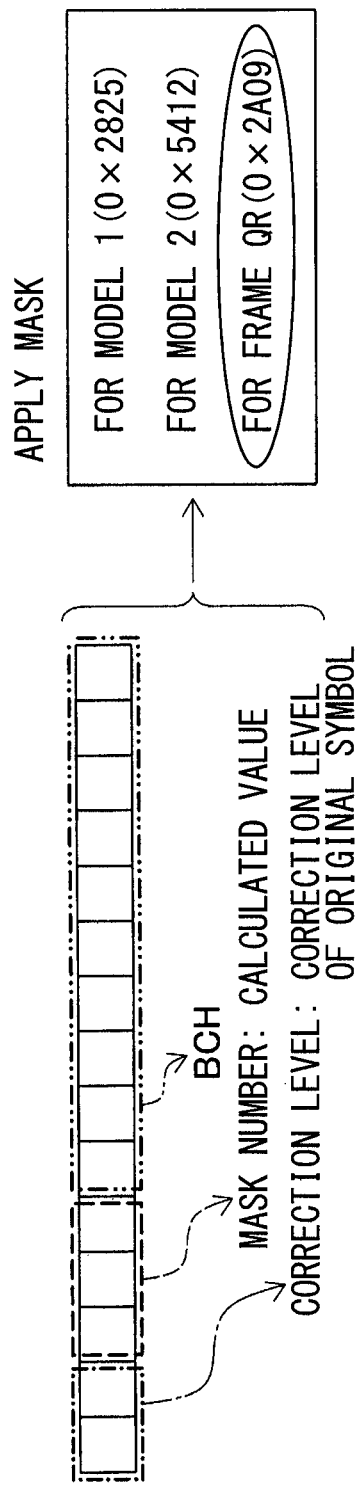
FIG. 6 is a diagram schematically explaining a format data of the information code used in the information code use system in FIG. 1.

The format information (a form information) is constructed as described in FIG. 6, for example, and is stored to the predetermined position 105 in the information code 100 (a predetermined kind of a hatching position) with a specific formation configuration. The format information includes correction level information that identifies an error correction level, and mask number information that identifies a mask number. The correction level information corresponds to information specifying an error correction level used in the information code 100. For example, the correction level information may also correspond to an error correction level used in the different type code 120 when the information code 100 is converted to the different type code 120 to read it. The mask number corresponds to information specifying a mask classification by which the code word region (a region storing the data code word and the error correction code word) of the information code 100 is masked.

As described in FIG. 6, the format information is stored while reflecting a predetermined kind of a mask pattern (a specific mask). When a mask classification of the format information is identified by a method similar to a known QR code, a specific mask classification (a classification providing the free space 110) as described in the right portion of FIG. 5A is detected. In a known standardized QR code, for example, when the QR code is configured as a model 1, a data (a cell arrangement) shown at the time a mask for the model 1 is applied to the format information as described in FIG. 6 is stored in a predetermined position. When the QR code is configured as a model 2, data (a cell arrangement) shown at the time a mask for the model 2 is applied to the format information as described in FIG. 6 is stored in a predetermined position. By contrast, in the information code 100 (a special kind of a code having the free space 110) of the present configuration described in FIG. 5A and FIG. 5B, a data (a cell arrangement) shown at the time a specific mask (in FIG. 6, exemplified as a mask for a frame QR) is applied to the formation information as described in FIG. 6 is stored in a predetermined position 105. The specific mask is a different type of the model 1 and the model 2. In each case of the known model 1, the model 2 and the information code 100, the formation is configured by adding a check digit corresponding to the stored correction level (the correction level information) and the stored mask number (the mask number information). Then, a mask for each classification is applied. Specifically, a mask processing is performed for each classification by a known method with a mask pattern, and then, a bit pattern after the mask processing is stored in the predetermined position 105. Therefore, it is supposed that the specific mask (exemplified as a mask for a frame QR in FIG. 6) is applied to the format information such as the information code 100 and the data is stored to the predetermined position 105. When the information stored in the predetermined position 105 is decoded by releasing the mask processing based on the specific mask, the check digits are matched and it is possible to specify the classification of the information code 100. Since the check digits are not matched when the mask of the data at the predetermined position 105 is released based on the model 1 or the model 2, it is possible to specify that the known standardized model 1 and the model 2 are not applied.

In the information code 100, a specific pattern (a position detection pattern 104) is detected. A code area, a direction of the code, and a position of each cell are identified by a method similar to the known QR code. Then, the predetermined position 105 storing the format information is decoded by a method similar to the known QR code. It is possible to specify that an information code corresponds to the classification (a special kind having the free space 110) of the information code 100 according to the mask classification that can decode. According to the decoded format information, it is possible to specify the error correction level used in the information code 100, and it is possible to specify a mask classification that is applied to the code word region (the region where the data code word or the correction code word is stored with a cell) of the information code 100.

In addition, it is possible to display an image different from a cell arrangement inside the free space 110, as described in FIG. 1. Incidentally, in the examples of FIG. 1, FIG. 5A, FIG. 5B, or the like, a border 121 of the free space 110 (a display region) is illustrated with a symbol of "121", and a region inside the border 121 corresponds to the free space 110. Incidentally, a specific content and a specific use method of the free space 110 (the display region) will be described later.

Figure 3:
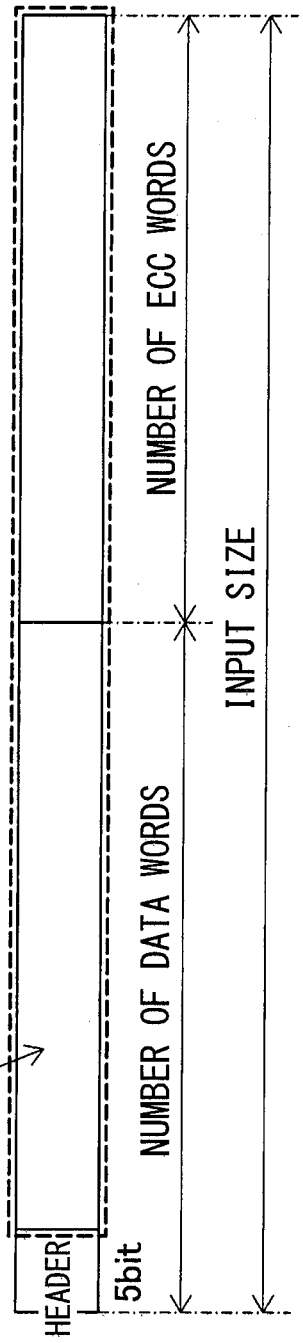
FIG. 3A is a diagram schematically explaining a data configuration of an information code used in the information code use system in FIG. 1.
FIG. 3B is a diagram schematically explaining a data configuration of the information code used in the information code use system in FIG. 1.
FIG. 3C is a diagram schematically explaining a data configuration of the information code used in the information code use system in FIG. 1.

A content stored in the information code 100 has a configuration as described in FIG. 3A, FIG. 3B, and FIG. 3C, for example. A header data (a header for a frame QR) is set at a start portion of a data array and an input data (a decode target data) follows the header data. In the examples of FIG. 3A, FIG. 3B, and FIG. 3C, the input data (the decode target data) is compressed by, for example, a known method, and converted to a data word (a data code word). However, this compression may not be performed. Incidentally, the header data used in the information code 100 may also be referred to as a header for a frame QR. In the present application, the region storing the data word (the data code word) of the header data and the input data (the decode target data) and the region storing the format information correspond to a data recording region. In the examples in FIG. 3A, FIG. 3B, and FIG. 3C, information that identifies a classification (a model number) of the different type code 120 and identification information that identifies a format in the free space are stored as the header data (the header for the frame QR). The information that identifies the classification (the model number) of the different type code 120 is exemplified as Ver. number in FIG. 3B. The different type code 120 corresponds to a code classification used for decoding the information code 100 and associated with the information code 100 by the arrangement conversion table (FIG. 5B). Incidentally, in the examples of FIG. 3A, FIG. 3B, and FIG. 3C, as the header data, information (first information) specifying that a format of the free space 110 is a display format illustrated in FIG. 1, FIG. 5A, and FIG. 5B and information (a display region position information corresponding to second information) specifying a position (a display region portion) of the free space 110 (the display region) are stored in addition to a kind (Ver. number) of the different type code. The information specifying the position of the free space 110 corresponds to display region position information corresponding to second information. The information (the first information) specifying that the format of the free space 110 is the display format corresponds to an example of display region identification information, which indicates existence of the display region. The information (the second information) specifying the position (the display region position) of the free space 110 (the display region) corresponds to an example of a position data indicating the display region in the code area.

In the examples in FIG. 3A, FIG. 3B, FIG. 3C, FIG. 5A, and FIG. 5B, information specifying a row position and a column position of the free space 110 configuring the display region (the image display region) is stored as the display region position information (the position data). More specifically, a combination of an upper left row position and an upper left column position of the free space 110 and a combination of a lower right row position and a lower right column position of the free space 110 when the information code 100 configured in a rectangular shape as described in FIG. 5A and FIG. 5B is divided into multiple rows and multiple columns in a lattice shape are stored as the display region position information (the position data). Incidentally, a width of each row and each column when the information code 100 is divided in the lattice shape as described in FIG. 5A and FIG. 5B corresponds to a width of a row direction and a width of a column direction in a single cell, respectively.

In the data configuration described in FIG. 3A, FIG. 3B, and FIG. 3C, the input data (a data word corresponding to a decode target data) is followed by the error correction code word (ECC word) which corresponds to an error correction code. In the information code 100, a region storing the error correction code corresponds to the error correction code recording region. Incidentally, a method by which the error correction code (the error correction code word) is generated based on a data word (the header data and the input data in the example from FIG. 3A to FIG. 3C) can be a method determined by a standard of a known two dimensional code (the QR code or the like). The input data corresponds to the decode target data. For example, as the method generating the error correction code word based on the data word (the data code word), a generation method (JISX0510:2004, 8.5 error correction) of an error correction code word standardized in JISX0510:2004 may be used. Incidentally, the generation method of the error correction code word is not limited to this, and it may be possible to use a known various methods.

In addition, in the information code 100, each data word (the data code word) showing the decode target data and the error correction code word are disposed in the code area based on a predetermined arrangement position information. In the present configuration, as described in FIG. 5A and FIG. 5B, an arrangement candidate position of each code word in the code area of the information code 100 is predetermined, and a number (an address) is assigned to each arrangement candidate position. The arrangement position information identifies that each code word configuring a record content illustrated from FIG. 3A to FIG. 3C is disposed to which arrangement candidate position respectively. Incidentally, in the example of the right portion of FIG. 5A, arrangement candidate positions of No. 1 to No. 25 are schematically exemplified. At each arrangement candidate position, numbers are added and described at a start bit and a final bit. In addition, in the right portion of FIG. 5A, arrangement candidate positions of No. 26 or later are omitted.

Specifically, in the model number (the model number of the different type code 120 identified by a header data described in from FIG. 3A to FIG. 3C) of the different type code 120 (the known QR code), the known standard determines a position where a code word in each order is disposed in the different type code 120. When the different code 120 is decoded, a code word in each order is decoded based on the predetermined arrangement. For example, in the example of the different type code 120 described in the left portion of FIG. 5A, a code word of No. 0 is disposed to a lower right position, a code word of No. 1 is disposed above the position of No. 0, and a code word of No. 2 is disposed above the position No. 1. An arrangement position of each code word is predetermined. Therefore, when the different type code 120 is decoded, based on the determined arrangement, a code word of No. 0, a code word of No. 1, a code word of No. 2, a code word of No. 3, or the like will be decoded in a sequence.

On the contrary, in the arrangement position information (the arrangement conversion table) described in FIG. 5B, the number of each arrangement position (the arrangement position of the code word in each order) predetermined by the different type code 120 is associated to a number of a candidate position (an arrangement candidate position of each code word) predetermined by the information code 100. Specifically, information that the arrangement position of the code word of No. 1 in the different type code 120 corresponds to the arrangement candidate position of No. 1 of the information code 100, the arrangement position of the code word of No. 2 in the different type code 120 corresponds to the arrangement candidate position of No. 2 in the information code 100, and the arrangement position of the code word of No. 3 in the different code type 120 corresponds to the arrangement candidate position of No. 3 in the information code 100 is stored as, for example, a table data, respectively. The arrangement position of the code word of each number in the different type code 120 is associated to each arrangement candidate position in the information code 100. Therefore, when the information code 100 is decoded, the code word (the code word of each address) in each arrangement candidate position in the code area is re-disposed to each arrangement position of the different type code 120 that is associated with the arrangement position information (the arrangement conversion). For example, when the information code 100 is decoded by the arrangement conversion table described in FIG. 5B, the code word in the arrangement candidate position of No. 1 in the information code 100 is disposed to the arrangement position of the code word of No. 1 in the different type code 120, the code word in the arrangement candidate position of No. 2 in the information code 100 is disposed to the arrangement position of the code word of No. 2 in the different type code 120, the code word in the arrangement candidate position of No. "N" in the information code 100 is disposed to the arrangement position of the code word of No. "M" in the different type code 120, the code word of No. "M" being associated to the arrangement candidate position of No. "N", for example. After re-arrangement, the different type code (the QR code) is decoded by a known method. Incidentally, with respect to the arrangement position information (the arrangement conversion table), it may be preferable that a common data (a common arrangement conversion table) is provided to the information code generation apparatus 2 that generates the information code 100 and the information code read apparatus 10 that reads the information code 100.

Figure 7:
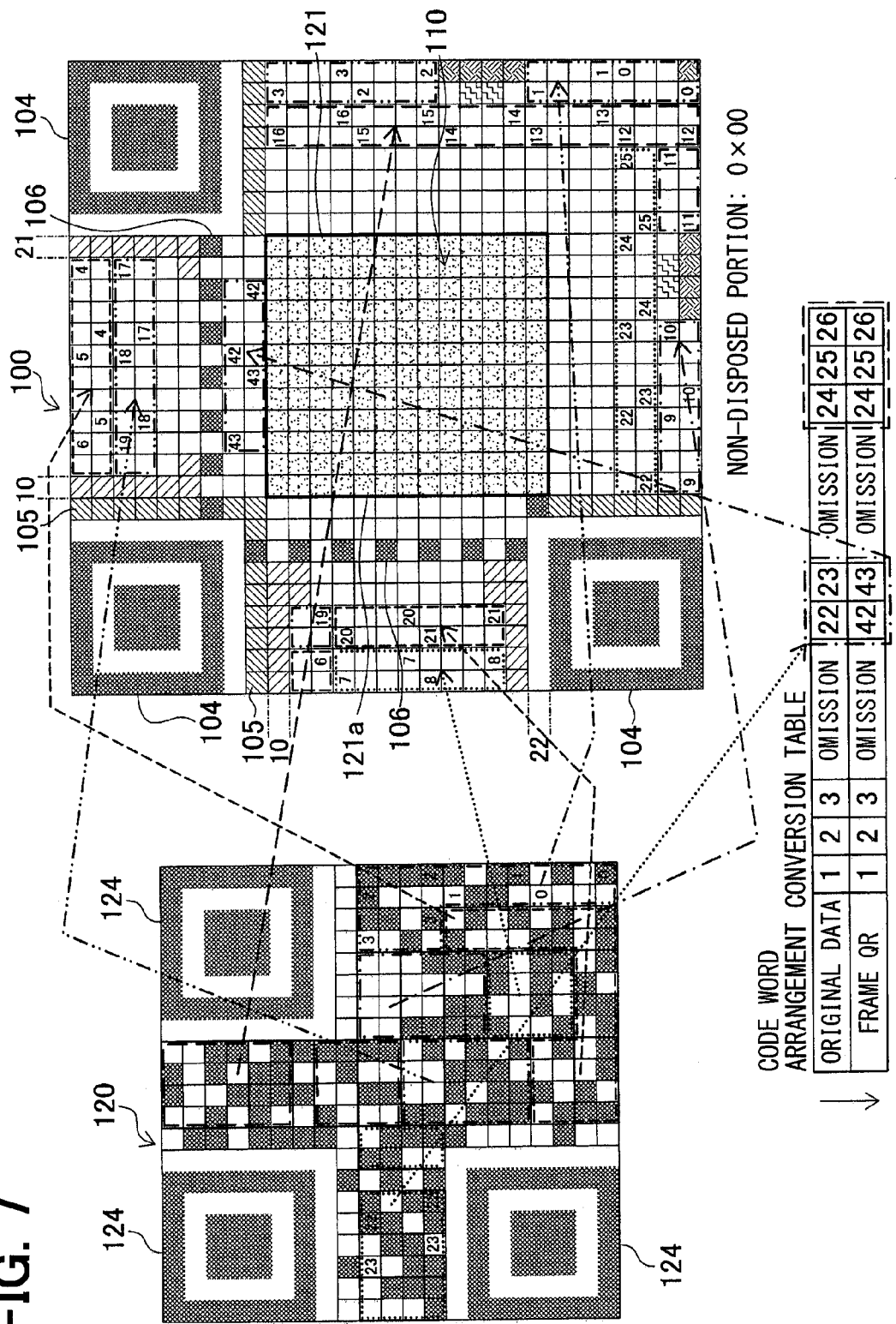
FIG. 7 is a diagram explaining a correspondence relation between an arrangement of each data word in the information code generated in the information code generation apparatus configuring the information code use system in FIG. 1 and an arrangement of each data word in the different type of the code, and illustrating a correspondence relation different from the correspondence relation in FIG. 5A and FIG. 5B.

Incidentally, a correspondence relation in the arrangement conversion table as set in FIG. 5A and FIG. 5B may be changed arbitrarily as FIG. 7. For example, when the arrangement conversion table set in the information code generation apparatus 2 and the information code read apparatus 10 as FIG. 5A and FIG. 5B is changed to an arrangement conversion table as FIG. 7, the arrangement of the code word of No. 22 to No. 26 is changed from the arrangement (the arrangement stored arrangement candidate positions of No. 42 to No. 46) of the right portion of FIG. 5A to an arrangement (an arrangement stored at arrangement candidate positions of No. 42 to No. 46) of a right portion of FIG. 7 in the information code 100 to be generated, and accordingly, a position and a shape of the free space 110 may be changed. According to this configuration, it is possible to adjust the position and the shape of the free space 110 by adjusting the arrangement conversion table, and it is possible to improve freedom when the free space is provided.

(Configuration of Classification Design)

Followingly, a classification design, which is one of features of the present configuration, will be explained.

In the present configuration, as described above, when the information code generation apparatus 2 generates the information code 100, the specific pattern region where the specific pattern having a predetermined shape is disposed and the data recording region that stores data by the multiple kinds of cells 102 are provided inside the code area. As described in FIG. 9, the free space 110 where the decode target data is not stored by the cell 102 is provided inside the code area with a size larger than a size of a single cell at a position other than the specific pattern region and the data recording region. The free space 110 functions as the display region (the image display region), so that a predetermined display target D, which is different from the cell and the specific pattern, is shown.

Figure 9:
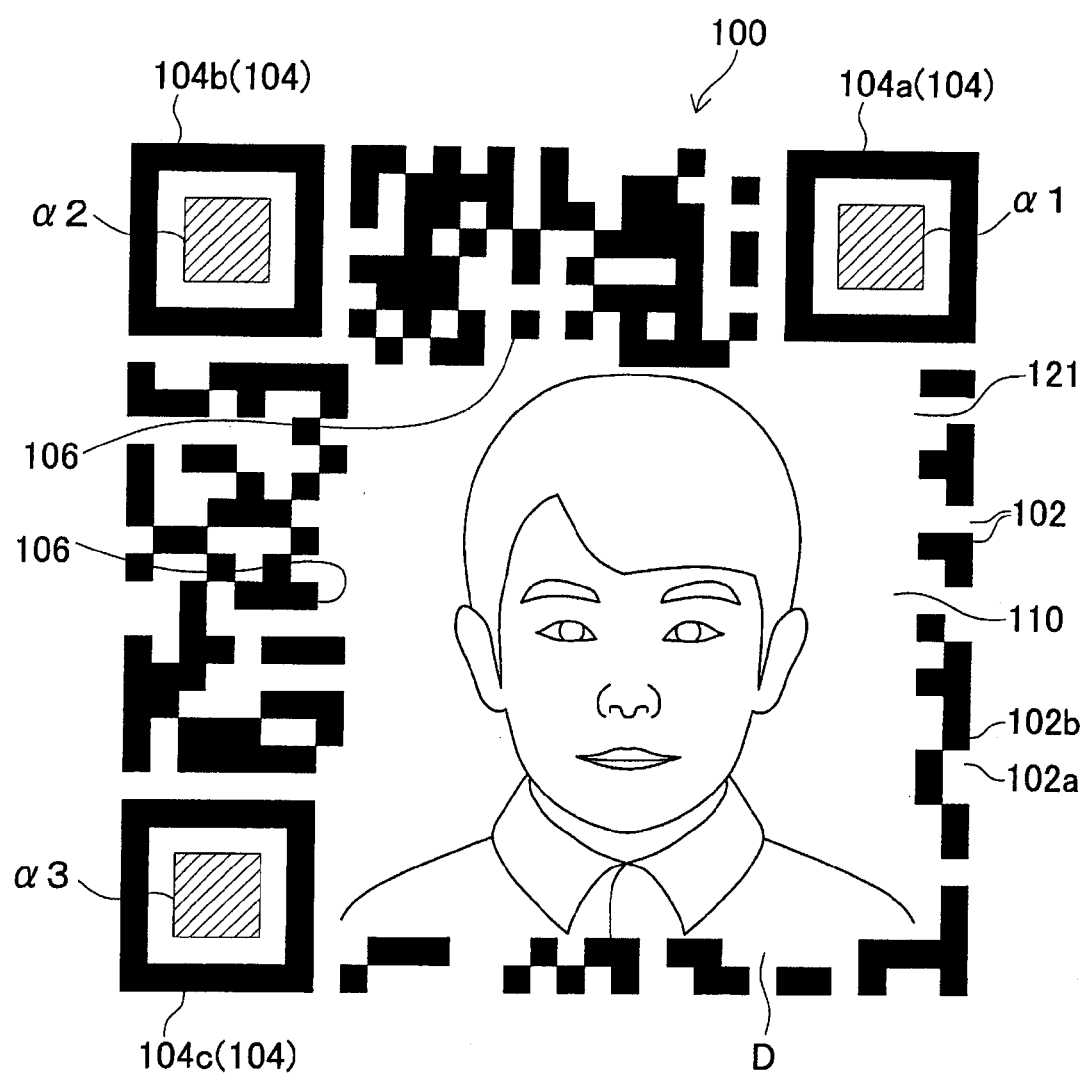
FIG. 9 is a diagram illustrating an example of the information code generated by the information code generation apparatus in the information code use system in FIG. 1.
Figure 10A:
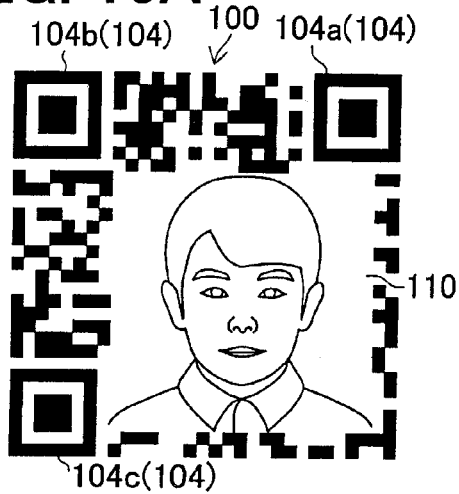
FIG. 10A is a diagram illustrating an example for each classification of the information code generated in the information code use system in FIG. 1.
Figure 10B:
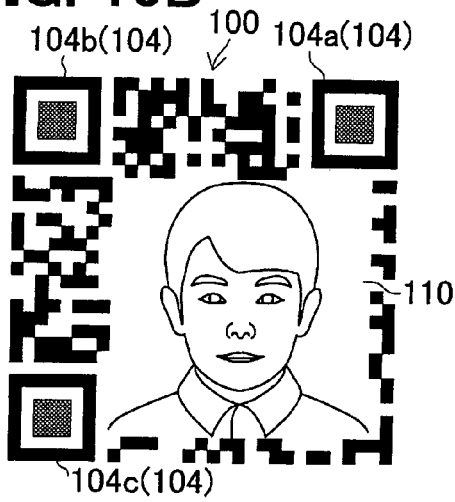
FIG. 10B is a diagram illustrating an example for each classification of the information code generated in the information code use system in FIG. 1.
Figure 10C:
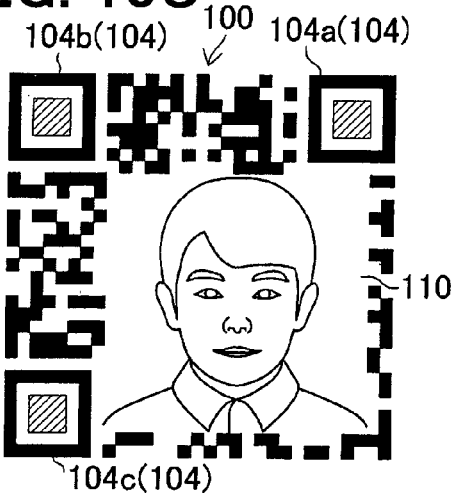
FIG. 10C is a diagram illustrating an example for each classification of the information code generated in the information code use system in FIG. 1.
Figure 10D:
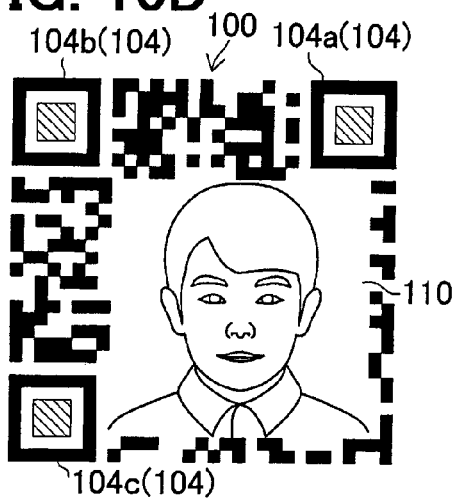
FIG. 10D is a diagram illustrating an example for each classification of the information code generated in the information code use system in FIG. 1.
Figure 10E:
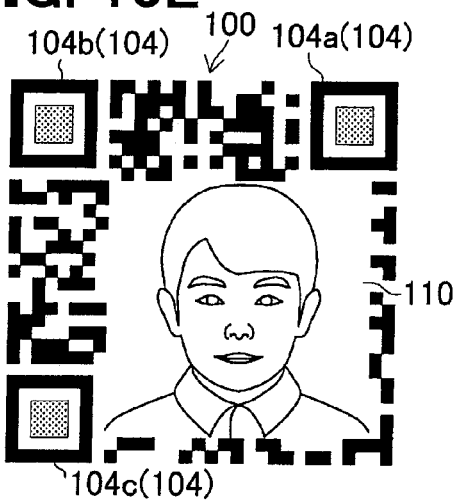
FIG. 10E is a diagram illustrating an example for each classification of the information code generated in the information code use system in FIG. 1.
Figure 10F:
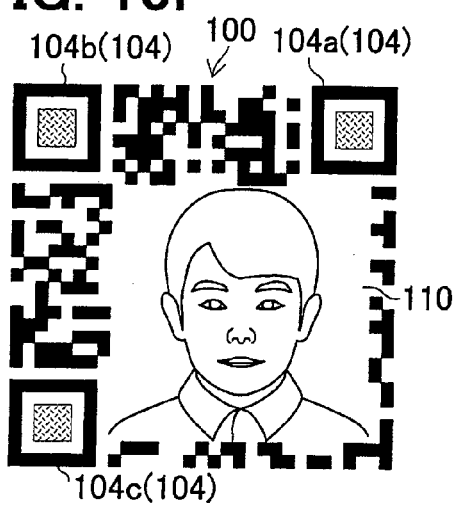
FIG. 10F is a diagram illustrating an example for each classification of the information code generated in the information code use system in FIG. 1.

In the examples of FIG. 1, FIG. 9, from FIG. 10A to FIG. 10F, or the like, the display target D displayed in the free space 110 is a person, and specifically, an image (a personal image) including a facial image of a specific person is shown as the display target D. The personal image D may be any image that can specify the person, and may be a photograph of the person and may be a portrait of the person. Incidentally, when the personal image corresponds to a photograph of the person or a portrait, it may be preferable to include a facial picture or a portrait of a face of the person. The personal image D may be various personal specific information such as a personal name or another name (a name different from a real name) like a stage name, a pseudonym, a pen name, an abbreviated name or the like used by the person as long as the person can be identified. Alternatively, the personal specific information and the personal picture or the personal portrait may be displayed.

In the examples in FIG. 9, from FIG. 10A to FIG. 10F, or the like, it is possible to store the personal information regarding the person shown by the free space 110 (the display region) in the data recording region in the information code 100, for example. For example, it is possible to store data of the personal information such as a personal e-mail address, a URL of a site storing information with respect to the person, a phone number with respect to the person (a home phone number, a portable phone number, a corporate phone number to which the person belongs), information of a location with respect to the person (a residence address, an corporate address to which the person belongs), a personal identification information specifically assigned to the person. Accordingly, the display content in the information code 100 is associated to the record content.

In the information code 100, furthermore, at least a portion of the code area is shown by a design (a shape, a pattern, color, or a combination of them) specifying a classification with respect to the code content (at least either the record content stored in the code area or the display content shown in the code area). For example, as described from FIG. 10A to FIG. 10F, multiple display patterns are prepared as the design showing the portion of the code area. Specifically, a color of a specific portion (as FIG. 9, regions α1, α2, α3 disposed in the central portion of the position detection pattern 104) corresponds to a color specifying a classification of the display target (in the examples of from FIG. 10A to FIG. 10F, a person) shown in the free space 110 (the display region). Incidentally, in the examples of from FIG. 10A to FIG. 10F, the classification is shown by a color of the specific portion (in a square shape, the region α1, α2, and α3 configured as the dark color rectangular region in FIG. 9) which is a part of the position detection pattern 104. An example displaying the classification in the position detection pattern 104 is not limited to the examples. For example, a whole region configured as the dark color in the position detection pattern 104 may be shown with a color according to a classification. A whole region configured as the bright color in the position detection pattern 104 may be shown by color according to a classification.

In the examples from FIG. 10A to FIG. 10F, the specific pattern showing the classification corresponds to the position detection pattern 104. The specific pattern showing the classification may be another fixed pattern such as a timing pattern, an alignment pattern or the like similar to a timing pattern and an alignment pattern used in the QR code (a registered trademark). In this case, a specific portion (for example, a position to be illustrated as the dark color portion) of the timing pattern or the alignment pattern may be shown with color according to a classification of the person shown in the free space 110. Alternatively, whole or part of the cell arrangement region other than a characteristic pattern region may be shown with color according to the classification of the person shown in the free space 110. For example, whole or part of the data recording region, or whole or part of the error correction data recording region, or whole or part of the recording region of the fill up code word may be shown with color according to a classification of a person shown in the free space 110.

Incidentally, hereinafter, as described from FIG. 10A to FIG. 10F, it is supposed that all central portions (the dark color rectangular region in the center) of the three position detection patterns 104a, 104b, 104c are shown with color according to a classification, as an example. In the examples of from FIG. 10A to FIG. 10F, for example, when a person shown in the free space 110 (the display region) belongs to a classification 1, as described in FIG. 10A, the rectangular region of the center portion of the position detection pattern 104 is shown as a black region. When the person shown in the free space 110 (the display region) belongs to a classification 2, as described in FIG. 10B, the rectangular region of the central portion of the position detection pattern 104 is shown as a red region. When the person shown in the free space 110 (the display region) belongs to a classification 3, as described in FIG. 10C, the rectangular region of the central portion of the position detection pattern 104 is shown as a brown region. When the person shown in the free space 110 (the display region) belongs to a classification 4, as described in FIG. 10D, the rectangular region of the central portion of the position detection pattern 104 is shown as a silver region. When the person shown in the free space 110 (the display region) belongs to a classification 5, as described in FIG. 10E, the rectangular region of the central portion of the position detection pattern 104 is shown as a gold region. When the person shown in the free space 110 (the display region) belongs to a classification 6, as described in FIG. 10C, the rectangular region of the central portion of the position detection pattern 104 is shown as a hologram region.

An application example of the information code 100 will be explained.

Figures 11, 12:
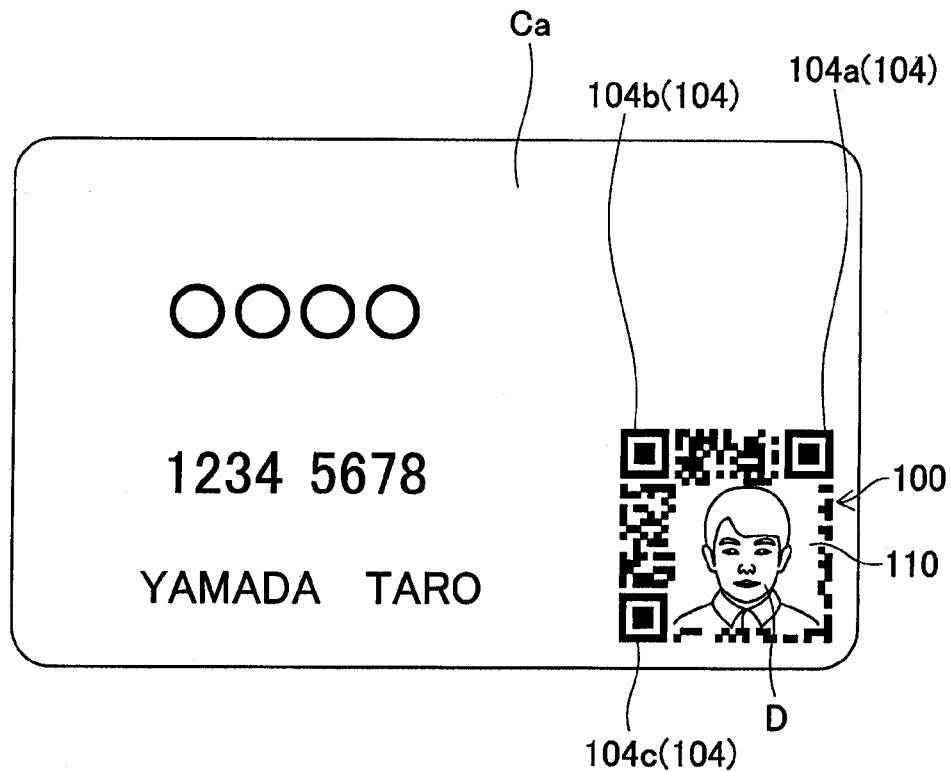
FIG. 11 is a diagram illustrating a use example of the information code generated by the information code use system in FIG. 1.
FIG. 12 is a diagram schematically explaining an example of data registered in a memory portion of the generation apparatus in the information code use system in FIG. 1.

The information code 100 can be used in various mediums as described in FIG. 11 as long as the various mediums may display a classification of a person. That is, a medium used in a service in which multiple persons are divided into multiple classifications with a certain category may use the information code 100 as described in FIG. 11. The medium may include a medium (a student card, an employee ID card, a membership card, and another ID card, a point card, a credit card, a debit card, an digital money card, and another settlement medium) used by a person in, for example, a shop, an educational organization (a various schools, a calligraphy lesson, an abacus class, a gymnastic exercise class, a swim school, or the like), a company, another private business, a national organization, a local public agency, another public organization, or the like For example, when a medium Ca described in FIG. 11 is a point card given to a person, an entity (an operating body of a shop or the like) providing the point card may prepare the generation apparatus 2 in FIG. 1 and another management apparatus. The entity may store and associate a personal image, classification information, and personal information for each person as described in FIG. 12 and manage them. The personal information of each person may have a point held by each person, and the memory portion may manage the personal information by allocating a classification (a status) according to an accumulated point for each person. A point card as described in FIG. 11 may be issued, for example, each time the classification (the status) of the person is changed. A color showing the classification of the person (a person whose personal image is shown in the information code 100 in the point card) at the time of issue may be shown at a specific portion in the position detection pattern 104 in the information code 100.

In a case where the medium described in FIG. 11 is a point card, it is possible to apply the medium to any service using a point classification. As an example, the service may include a point service in which a point is given according a usage condition (for example, a purchase frequency of a product, a service, or the like, or a period of registration as a membership) in a specific shop, a shop group, a company, a company group, another corporation and organization. For example, the service may be a service in which a fixed point is given for each time when visiting a store, a service in which a point according to a purchase amount is given, a service in which a fixed point is given regularly to a registered user, and a service in which the multiple point providing systems are used.

It is supposed that the medium Ca described in FIG. 11 is a point card. In this case, for example, a rank 1 shows a case where an accumulation point is 0-999 points. When the information code 100 of a person belongs to the rank 1, as described in FIG. 10A, the specific portion (a rectangular region of the central portion) of the position detection pattern 104 in the information code 100 is shown in black. A rank 2 shows a case where the accumulation point is 1000-2999 points. In this case, when the information code 100 of a person belonging to the rank 2 is generated, as described in FIG. 10B, the specific portion (the rectangular region in the central portion) in the position detection pattern 104 in the information code 100 is shown in red. A rank 3 shows a case where the accumulation point is 3000-4999 points. In this case, when the information code 100 of a person belonging to the rank 3 is generated, as described in FIG. 10C, the specific portion (the rectangular region in the central portion) in the position detection pattern 104 in the information code 100 is shown in brown. A rank 4 shows a case where the accumulation point is 5000-6999 points. In this case, when the information code 100 of a person belonging to the rank 4 is generated, as described in FIG. 10D, the specific portion (the rectangular region in the central portion) in the position detection pattern 104 in the information code 100 is shown in silver. A rank 5 shows a case where the accumulation point is 7000-9999 points. In this case, when the information code 100 of a person belonging to the rank 5 is generated, as described in FIG. 10E, the specific portion (the rectangular region in the central portion) in the position detection pattern 104 in the information code 100 is shown in gold. A rank 6 shows a case where the accumulation point is equal to or more than 10000 points. In this case, when the information code 100 of a person belonging to the rank 6 is generated, as described in FIG. 10F, the specific portion (the rectangular region in the central portion) in the position detection pattern 104 in the information code 100 is shown in hologram.

It is supposed that the information code 100 is applied to a point card or a membership card provided by a shop. In this case, when a shop staff, a user, and a third person looks at the information code, it is possible to immediately recognize an attribution of a person associated to the information code 100 without reading. For example, when a shop staff is shown with the medium Ca or receives the medium Ca, it is possible to quickly perform identity verification and an attribution confirmation concurrently without reading and it is possible to efficiently and quickly act suitable for confirmation and attribution.

Incidentally, an example of the point service is not limited to an example of a commercial transaction and may be a service in which a point is given according to a degree of an action performed by a target person. For example, the point service may be a point service in which a point is given according to a degree that a target person (a registered person) performs a social contribution activity and an ecological activity, and a point service (for example, a service in which a fixed point is given each time radio gymnastics is performed, and a service in which a fixed point is given each time learning is performed) in which a point is given according to a degree that a target person (a registered person) performs another predetermined action that is beneficial for the target person oneself or another person, In a case where a points service in which a point is given according to a degree that the target person (the registered person) performs a social contribution activity is operated, a specific management organization (a private organization, a public organization, or the like) may use a management apparatus that registers and manages multiple volunteers (multiple persons). In this case, a memory portion in the management apparatus stores register information as described in FIG. 12. An accumulation point obtained by each volunteer (each person) may be included in each personal information stored with associating each volunteer (each person). For example, a classification 1 (a rank 1) may be allocated to the classification for the person at the time when a volunteer (a person) is initially registered, and as an initial point, zero point or a fixed point may be given. And, each time the volunteer (the person) performs a volunteer activity, a point according to a kind of a volunteer activity, activity content, a total number of times, or the like is given and accumulated. As a system to provide a point, a point may be provided according to the number of times such as a provision of one point in each time each person performs a single volunteer activity. The number of provided points may be determined according to each volunteer classification, and the point corresponding to the kind of the volunteer activity may be provided in each time each person performs a volunteer activity. Alternatively, another system to provide the point may be used. For example, a point may be provided according to the number of days each person performs the volunteer activity. In this case, one point is provided per day.

It is possible to categorize the classification in the example of the social contribution activity similar to the commercial transaction. For example, a rank 1 shows a case where the accumulation point is 0-9 points. In this case, when the information code 100 of a person belonging to the rank 1 is generated, as described in FIG. 10A, the specific portion (the rectangular region in the central portion) in the position detection pattern 104 in the information code 100 is shown in black. A rank 2 shows a case where the accumulation point is 10-19 points. In this case, when the information code 100 of a person belonging to the rank 2 is generated, as described in FIG. 10B, the specific portion (the rectangular region in the central portion) in the position detection pattern 104 in the information code 100 is shown in red. A rank 3 shows a case where the accumulation point is 20-29 points. In this case, when the information code 100 of a person belonging to the rank 3 is generated, as described in FIG. 10C, the specific portion (the rectangular region in the central portion) in the position detection pattern 104 in the information code 100 is shown in brown. A rank 4 shows a case where the accumulation point is 30-39 points. In this case, when the information code 100 of a person belonging to the rank 4 is generated, as described in FIG. 10D, the specific portion (the rectangular region in the central portion) in the position detection pattern 104 in the information code 100 is shown in silver. A rank 5 shows a case where the accumulation point is 40-49 points. In this case, when the information code 100 of a person belonging to the rank 5 is generated, as described in FIG. 10E, the specific portion (the rectangular region in the central portion) in the position detection pattern 104 in the information code 100 is shown in gold. A rank 6 shows a case where the accumulation point is equal to or more than 50 points. In this case, when the information code 100 of a person belonging to the rank 6 is generated, as described in FIG. 10F, the specific portion (the rectangular region in the central portion) in the position detection pattern 104 in the information code 100 is shown in hologram.

Accordingly, in an activity in which a point can be provided according to a degree of an activity performed by a person, when the information code 100 is used in the medium Ca such as a personal card, a name tag, a business card, or the like, it is possible that a target person performing the activity (a volunteer activity or the like) visually recognizes an achievement or a progress status of oneself, and it is possible to easily recognize an activity objectively and easily obtain satisfaction and a sense of fulfillment. In addition, it is possible that an operation side managing the activity (the volunteer or the like) immediately grasps a degree of achievement of the target person when looking at the information code 100 added to a personal card or a name tag. Therefore, it is possible to quickly persuade to perform a suitable work suitable for the achievement and to efficiently perform an operation.

An example showing the personal image and a design of the classification of the person in the information code 100 with adding the information code 100 to the medium Ca allocated to the person, as described in FIG. 11 may include a personal card in the various classes such as an abacus class or a calligraphy lesson and various schools. For example, it is supposed that the information code 100 is applied to a personal card (a membership card) used in a calligraphy lesson. In this case, the information code 100 of the personal card is transferred or lent to each person, the free space 110 may show a facial image of the person (a target person of the personal card), and the central rectangular region in the position detection pattern 104 may show a design (for example, a color representing the degree) that represents a degree of calligraphy of the person. When the information code 100 is applied to an abacus class, in the information code 100 of a personal card that is transferred to or rent to a person, a facial image of the person (a target person the personal card) may be displayed on the free space 110 and the central rectangular region of the positional detection pattern 104 may be shown by a design (for example, color representing a degree) expression a degree of an abacus skill of the person. According to this configuration, a level of the person having the card at the current time point may be immediately recognized and a suitable response suitable for the level may be performed. In addition, for a person having the card, the level of the person may be easily recognized by one self by a visual sense objectively and, in order to obtain a design that is assigned to a high degree, the person may practice, for example.

As an example that the information code 100 is added to the medium Ca allocated to a person as described in FIG. 11 and the information code 100 shows a design of a classification to which a personal image and the person, identification papers such as a student card, an employee ID card, a driving license card, a citizen identification card may be given. For example, it is supposed that the information code 100 is applied to an employee ID card. In this case, in the information code 100 of the employee ID card transferred or lent to each person, the free space 110 may show a facial image of the person (a target person the employee ID card) and the central rectangular region of the position detection pattern 104 may show a design (for example, a color of gold in a case of a manager, and a color of brown in case of a section chief) showing an office organization of the person, for example. It is supposed that the information code 100 is applied to the driving license card. In this case, in the information code 100 of the driving license card transferred to or lent to each person, the free space 110 may show a facial image of a person (a target person of the employee ID card) and the central rectangular region in the position detection pattern 104 may show a design (for example, a color of gold in a case of a motorcycles limitation, and a color of gold in a case of large-sized special motor) expression a classification of a driving license of the person, for example.

It is supposed that the medium Ca illustrated in FIG. 11 is applied to a medium such as an identification card and a name tag used in a party for a marriage hunting activity (so-called, a marriage hunting party), another personal activity, and an economic activity. In this case, in the information code 100 added to the medium Ca transferred to or lent to each person, the free space 110 may show a facial image of a person (a user of the medium Ca) and the central rectangular region in the position detection pattern 104 may show a design (for example, a color of red in a case of a public servant, and a color of silver in a case of a medical doctor) showing a job of the person. In the information code 100, the free space 110 may show the facial image of the person and the central rectangular region of the position detection pattern 104 may show a design showing an annual salary ranking of the person.

As an example in which the information code 100 is added to the medium Ca assigned to a person as described in FIG. 11 and the information code 100 shows a design of a classification to which the personal image and the person belongs, a settlement medium such as a credit card, a debit card, and an electronic money card may be given. For example, in a case where the medium Ca illustrated in FIG. 11 is a personal credit card, in the information code 100 added to the credit card, the free space 110 may show a facial image of the person and the central rectangular region of the position detection pattern 104 may show a design showing an annual salary ranking of the person. For example, a case of less than 3,000,000 yen of an annual salary may be defined as a rank 1 and the specific portion (the rectangular region of the central portion) in the position detection pattern 104 of the information code 100 may be shown in black as described in FIG. 10A. A case of the annual salary of from equal to or more than 3,000,000 yen to less than 5,000,000 yen may be defined as a rank 2 and the specific portion (the rectangular region of the central portion) in the position detection pattern 104 of the information code 100 may be shown in red as described in FIG. 10B. A case of the annual salary of from equal to or more than 5,000,000 yen to less than 7,000,000 yen may be defined as a rank 3 and the specific portion (the rectangular region of the central portion) in the position detection pattern 104 of the information code 100 may be shown in brown as described in FIG. 10C. The specific portion may be shown by a design according to an annual salary range to which a person belongs. Although the example of ranking depending on the annual salary is presented, the ranking may be separated by the amount of money of asset held or the ranking may be separated by a combination of an annual salary and an asset held.

(Generation Processing of Information Code)

With referring FIG. 8A, FIG. 8B, or the like, a flow of the information code generation processing will be explained. Hereinafter, as an example, it is supposed that the different type code 120 as described in FIG. 5A and FIG. 5B corresponds to the QR code (a registered trademark) and the information code 100 has a specific pattern similar to the QR code. Incidentally, in the example, the information code 100 having the free space 110 may also be referred to as a frame QR.

Figure 8A:
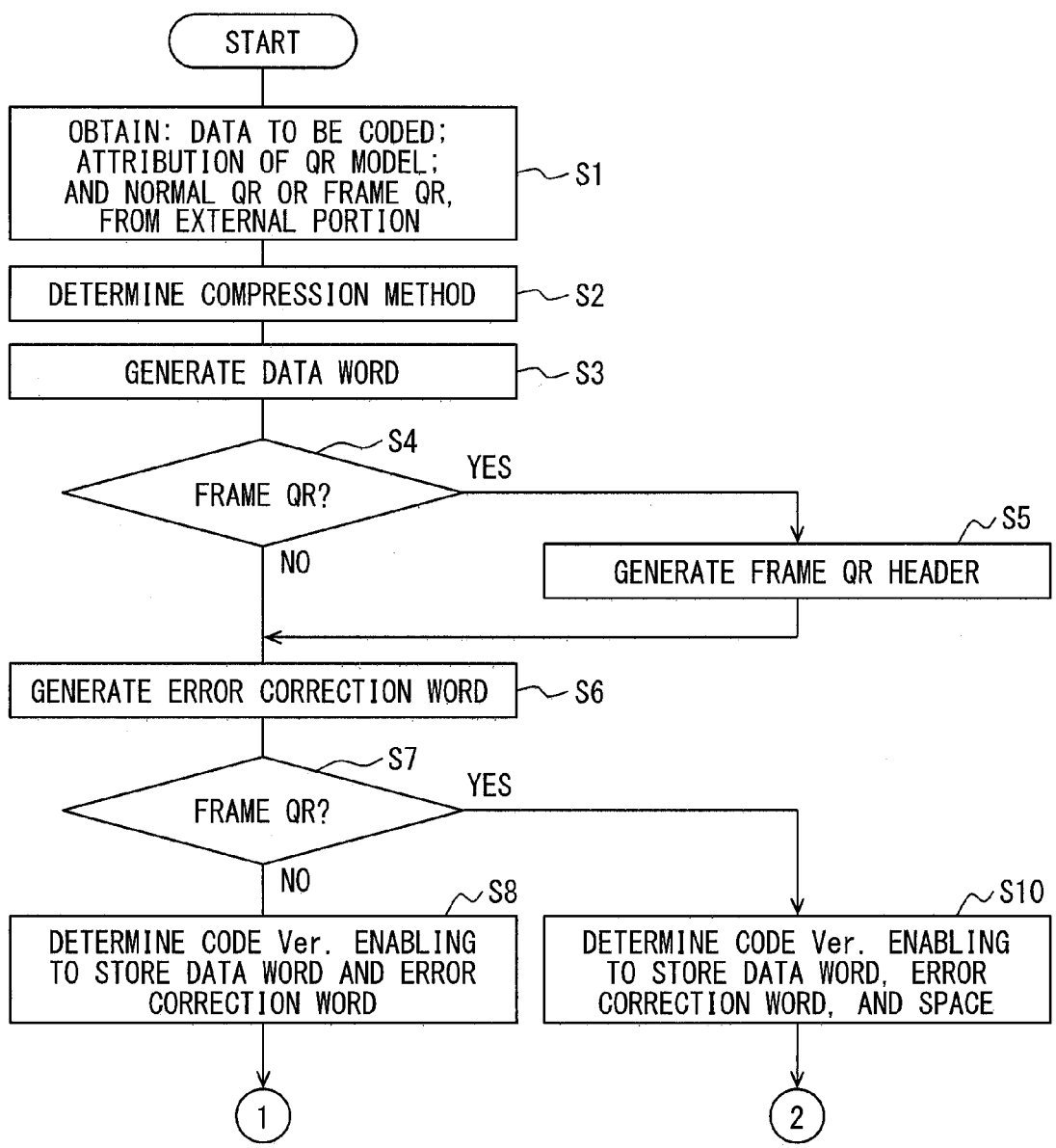
FIG. 8A is a flowchart exemplifying a flow of generation of the information code in the information code generation apparatus in the information code use system in FIG. 1.
Figure 8B:
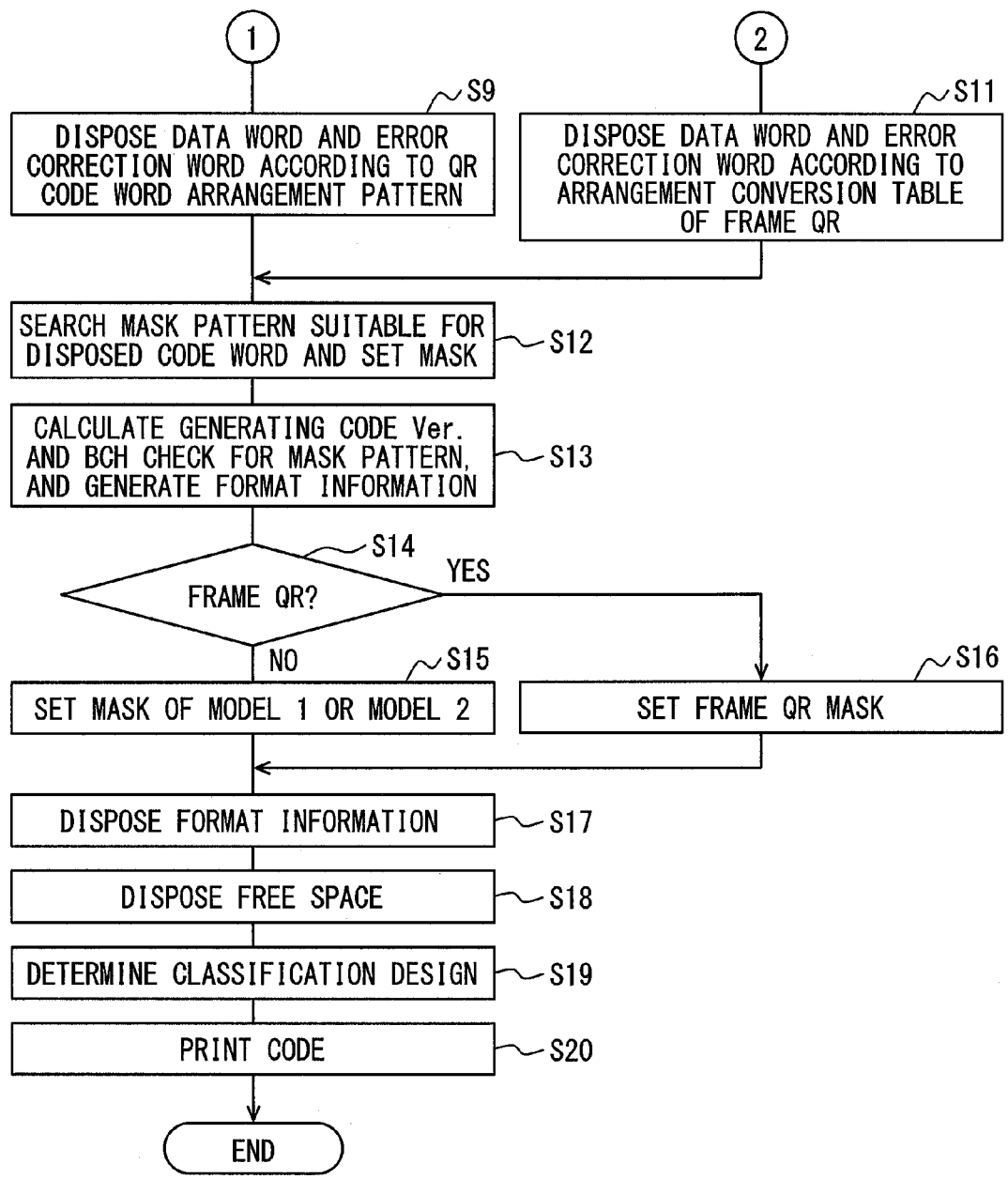
FIG. 8B is a flowchart exemplifying a flow of generation of the information code in the information code generation apparatus in the information code use system in FIG. 1.

The information code generation processing in FIG. 8A and FIG. 8B is performed by the information code generation apparatus 2. The information code generation processing is executed by a predetermined operation in an operation portion 4. In the processing, initially, a data (an encode target data) to be coded, an attribution data, and a code classification data (a data specifying whether the information code 100 is generated or a general two dimensional code (for example, a general QR code) is generated) are obtained from an external portion (S1). It is supposed that the information code 100 as described in FIG. 9 is generated. For example, according to an input specifying a person from an external portion, a personal image corresponding to the person and information of a classification to which the person belongs may be obtained from a registration data as described in FIG. 12. In a case where personal information (for example, URL, an e-mail address, or the like) on the person is stored to the data recording region, the personal information corresponding to the designated person is obtained from the registration data as described in FIG. 12.

After data is obtained at S1, a method compressing the obtained data is determined by a known method (S2), and the data (the encode target data) obtained by compressing the input data is shown by multiple data words (a data code word) (S3). After S3, it is determined whether the code classification data obtained at S2 is a classification (the frame QR) of the information code 100 having the free space 110. When the code classification data obtained at S1 is the classification (the frame QR) of the information code 100 having the free space 110, the processing proceeds to Yes at S4 and a specific header data (as described above) used in the classification (the frame QR) of the information code 100 having the free space 110 is generated. The specific header data is set to the start portion of the data array including multiple data words as described in FIG. 3A, FIG. 3B, and FIG. 3C (S5). In the header data of FIG. 3A, FIG. 3B, and FIG. 3C, as described above, information (version number information or the like) that identifies a classification (a model number) of the different type code 120 illustrated in the right portion of FIG. 5A, information (first information) specifying that a format of the free space 110 is a display format, and information (display region position information corresponding to second information) specifying a position of the free space 110 (the display region) are stored. When the code classification data obtained at S1 is not the classification (the frame QR) of the information code 100 having the free space 110 (a data (for example, a data selecting the model 1 or the model 2) selecting a general two dimensional code), the processing proceeds to No at S4.

When the processing shifts to No at S4, the error correction code is generated by a known method based on a configuration of the data word (the data code word) generated at S3, and multiple error correction words (the error correction code word) showing the error correction code are generated (S6). In a case where the processing shifts from S5 to S4, the error correction code is generated by a known method based on a configuration of the final data word (multiple data code words showing the header data and the input data) generated at S3 and S5, and multiple error correction words (error correction code words) showing the error correction code is generated (S6).

After S6, it is determined whether the code classification data obtained at S1 is a classification (the frame QR) of the information code 100 having the free space 110 (S7). When the code classification data obtained at S1 is not the classification (the frame QR) of the information code 100 having the free space 110, the processing shifts to No at S7. A two dimensional code (for example, a QR code) will be generated by a known method. In a case where the processing shifts to No at S7, a model number of a two dimensional code that enables to store the data word generated at S3 and the error correction word generated at S6 is determined. In this example, the model number corresponds to a model number having a size that enables to store the data word generated at S3 and the error correction word generated at S6 among multiple model numbers of a standardized known QR codes. The data word generated at S3 and the error correction word generated at S6 are disposed according to an arrangement pattern predetermined based on the model number (S9).

When the code classification data obtained at S1 is the classification (the frame QR) of the information code 100 having the free space 110, the processing shifts to Yes at S7, and a model number of the information code 100 that enables to store the data words (the data code words) generated at S3 and S5, an error correction word (the error correction code word) generated at S6, and a free space are determined (S10). Incidentally, a size of the free space may be a predetermined fixed size or may be a size that a user identifies with an input in a previous step before S10. The size of the free space may be identified by the number of rows and columns, and may be identified by information indicating corresponding to the number of words or the number of cells. In the examples of FIG. 5A, FIG. 5B, FIG. 8A, and FIG. 8B, a model number of a size that enables to store the data words (the data code words) generated at S3 and S5, the error correction word (the error correction code word) generated at S6, and the free space is determined from the multiple model numbers (sizes) that is predetermined in classifications of the information code 100, for example. Incidentally, when multiple model numbers may be available in the classification of the information code 100, the number of rows and columns, the shape and the arrangement of the specific pattern, the arrangement of the format data, and the arrangement candidate position of each code word may be determined for each model number. In each model number, the arrangement candidate position of each code word is determined in a sequence from an outer peripheral side as described in the right portion in FIG. 5A. The arrangement candidate position of each code word is determined in an outer side as the number of the arrangement candidate position is earlier. With respect to a portion (that is, a portion not used) where the code word is not disposed in the prepared arrangement candidate position, it is possible to easily secure a larger free space in the central portion when the portion not used is used as the free space. When there are multiple model numbers of the size that enables to store the date words (the data code word) generated at S3 and S5, the error correction word (the error correction code word) generated at S6, and the free space, a smaller model number (size) may be determined from the multiple model numbers or a user may determine one model number (size) from the multiple model numbers. At the time of generating the information code 100, the size (the number of the rows and columns) predetermined in the model number, an arrangement of the specific pattern, and each arrangement candidate position of the code word are used, and a specific arrangement position of each code word is determined according to the arrangement conversion table. Incidentally, hereinafter, it is supposed that a model number as described in the right portion of FIG. 5A is determined at S10, as an example. In this case, the example will be explained in detail.

Figure 4:
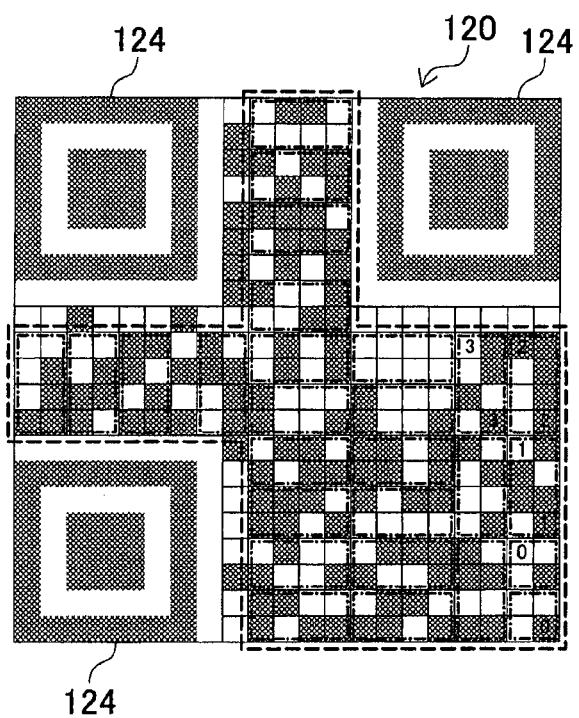
FIG. 4 is a diagram explaining a different type of a code corresponding to the information code used in the information code use system in FIG. 1.

After S10, the data words (the data code words) generated at S3 and S5 and the error correction word (the error correction code word) generated at S6 are disposed based the arrangement position information (the arrangement conversion table). In the information code generation apparatus 2, the memory portion 5 stores the arrangement position information (the arrangement conversion table). In the arrangement conversion table, each arrangement position (an arrangement position of a code word in each sequence) determined in the different type code 120 corresponds to each candidate position (an arrangement candidate position of each code word) predetermined in the information code 100. At S11, an arrangement position of each code word (a code word in each sequence) at the time when an arrangement position of each code word to be stored (the data words (the data code words) generated at S3 and S5, and the error correction word (the error correction code word) generated at S6) is shown by the different type code 120 (a two dimensional code having a size smaller than the information code 100 and a size storing the data words generated at S3 and S5 and the error correction word generated at S6) illustrated in the left portion of FIG. 4 and FIG. 5A is identified. The code word in each order is disposed to each arrangement candidate position in the information code 100, which is associated to the arrangement position of the code word in each sequence by the arrangement position information (the arrangement conversion table). For example, in the arrangement position information (the arrangement conversion table) in FIG. 5B, since the arrangement position of the code word at the first position in the different type code 120 corresponds to the arrangement candidate position at the first position in the information code 100, a code word at the first position in the code word (the data words generated at S3 and S5 and the error correction word generated at S6) among the code word to be stored is disposed to the first position of the arrangement candidate position in the information code 100. In addition, since the arrangement position of the code word at the second position in the different type code 120 corresponds to the arrangement candidate position at the second position in the information code 100, a code word at the second position in the code word to be stored is disposed to the arrangement candidate position at the second position in the information code 100. As described above, when an arrangement position (an arrangement position of a code word at the N-th position), in the different type code 120, disposing a code word at the N-th position in the code word to be stored is associated to an arrangement candidate position at the M-th position in the information code 100, the code word at the N-th position in the code word to be stored is disposed to the arrangement candidate position at the M-th position in the information code 100.

That is, when the code word to be stored includes only the data words generated at S3 and S5 and only the error correction word generated at S6, it is possible to show with a different type code 120 (a known QR code), which is smaller than the information code 100. When the data words generated at S3 and S5, the error correction word generated at S6, and the free space 110 are stored, it is necessary to show with an information code 100 larger than this. In the present embodiment, a correspondence relation between each arrangement of the code word in a case where the date words generated at S3 and S5, the error correction word generated at S6 and the free space 110 are shown by the information code 100, which is larger than the different type code 120, and the date words generated at S3 and S5 and the error correction word generated at S6 is shown by the different type code 120 (the known QR code) and each arrangement of the code word in a case where the data word, the error correction word, and the free space 100 is stored in an information code larger the above information code is identified by a predetermined arrangement conversion table.

Incidentally, in the present configuration, the arrangement conversion table in FIG. 5B corresponds to an example of arrangement position information specifying each arrangement position at the time when multiple data words showing a decode target data are disposed to a code area. The arrangement conversion table (the arrangement position information) associates each data words in each order when the decode target data is shown by multiple data words and each arrangement position in the code area of the data word in each order. The memory portion 5 corresponds to an example of the arrangement position information store portion, and stores a data (the arrangement position information) of the arrangement conversion table. Incidentally, the data of the arrangement conversion table is provided to the read apparatus 10, which is supposed to read the information code 100.

After S9 or S11, a mask pattern that is applied to the code word whose arrangement position is determined at S9 or S11 is determined by a known method (for example, a known method used in the QR code), and the determined mask pattern is applied to the code word whose arrangement position is determined at S9 or S11 by a known mask processing method (S12). A check digit is calculated based on information (a mask number) of the mask pattern set at S12 and information of the error correction level, and format information is generated (S13). The format information includes the error correction level, the mask number, and the check digit as described in FIG. 6. Incidentally, data such as the mask number and the error correction level stored as the format information may be input at S1.

When the code classification data obtained at S1 is the classification (the frame QR) of the information code 100 having the free space 110, the processing shifts to Yes at S14, and a mask processing is performed (with referring to FIG. 6). In the mask processing, the specific mask (the frame QR mask) is applied to the format information generated at S13. When the code classification data obtained at S1 is not the classification (the frame QR) of the information code 100 having the free space 110, the processing shifts to No at S14, and a mask (a mask in the model 1 or a mask in the model 2) of a mask pattern different from a mask pattern set at S16. After applying the mask to the format information at S15 or S16, the format information after the mask processing is disposed to the predetermined position 105 in the code area (S17).

Accordingly, after configuring the specific pattern region, the data recording region, and the error correction region, a configuration element of the free space 110 (the display region) is disposed (S18). In the examples as described in FIG. 3A, FIG. 3B, FIG. 3C, FIG. 5A, FIG. 5B or the like, for example, an outer peripheral portion of the free space 110 (the display region) is determined as a rectangular shape. At S18, the free space 110 (the display region) is set so that each of the upper left position and the lower right position of the determined outer peripheral portion corresponds to each position designated by the header data. An image (for example, a unique image of a subject) to be inserted is disposed to the designated position.

After generating the information code 100 or another two dimensional code, a design format of the specific portion is determined (S19). Incidentally, when the processing shifts to No at S14 (that is, in a case of generation of a general two dimensional code), the processing of S19 may be omitted. When the processing shifts to Yes at S14 and the information code 100 as described from FIG. 10A to FIG. 10F is generated (for example, in FIG. 1, in a case where a person is designated and there is an instruction that a design formation of the specific portion according to a classification to which the person belongs is set), a design at the predetermined specific portion (in the examples from FIG. 10A to FIG. 10F, the dark color rectangular region of the central portion in three position detection pattern 104) is changed to a design corresponding to the classification to which the person designated at S1 belongs.

After generating the information code 100 or another two dimensional code, the code is printed by, for example, a print portion 8 (S20). Incidentally, at S20, any known method other than printing may be used for generating the information code as long as the information code is generated to a medium. Data of the information code 100 generated by the processing before S19 may be transmitted to an external apparatus (for example, an information apparatus such as a portable terminal, a computer, or the like).

(Read Processing of Information Code)

Figure 13:
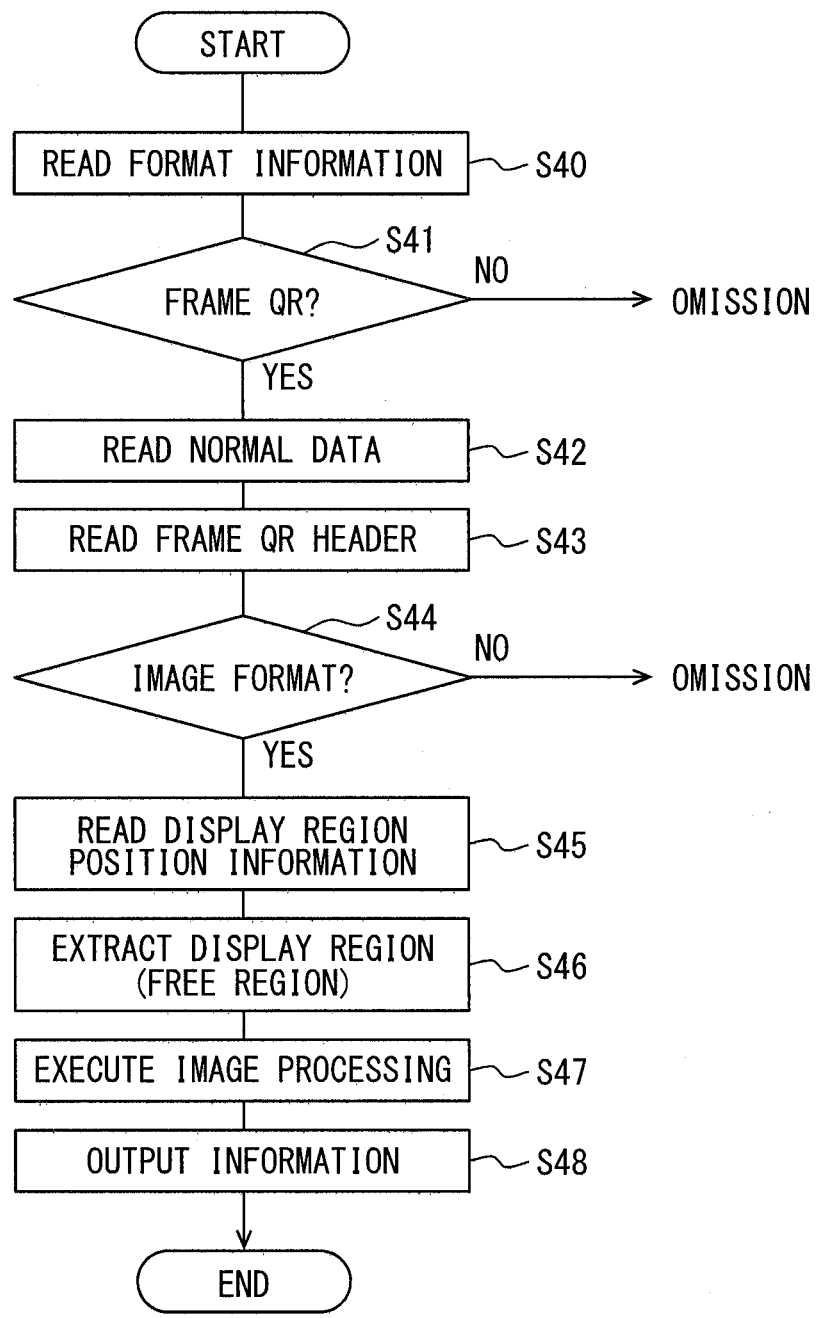
FIG. 13 is a flowchart exemplifying a flow of read processing of the information code performed in the information code read apparatus in the information code use system in FIG. 1.

An example in which the information code 100 illustrated from FIG. 10A to FIG. 10F, FIG. 11, or the like is read by the information code read apparatus 10 as described in FIG. 2 or the like will be explained with referring to FIG. 13 or the like. The read processing in FIG. 13 is executed when, for example, a user performs a predetermined operation (for example, an operation or the like of the operation switch 42). Initially, as described in S40 of FIG. 13, a two dimensional code in the image area of the light reception sensor 23 is imaged so that a captured image of the two dimensional code is obtained and a shape of the two dimensional code is detected. Specifically, a recognition of the position detection pattern 104 and a detection of an outer shape of the two dimensional code are performed by a known method. For example, a known method detecting a waveform of 1:1:3:1:1 performed in a QR code (a registered trademark) detects the position detection pattern 104. By a known method performed in the QR code (a registered trademark), the outer shape of the captured two-dimensional code is detected. When the information code 100 is imaged at S40, the outer shape of the information code 100 is detected. Incidentally, the processing method at S40 may be another method as long as the shape of the specific pattern and the outer shape of the two dimensional code are detected.

In the present configuration, the light reception sensor 23 corresponds to an example of the imaging portion. The light reception sensor 23 images the information code 100 generated by the information code generation apparatus 2.

After S40, information (the format information) of the predetermined position 105 in the information code 100 is decoded, and a classification and a mask correction level of the imaged information code are obtained. Specifically, for example, the information stored in the predetermined position 105 is tried to be decoded by releasing a mask processing based on the specific mask (the frame QR mask). When the mask processing is released by a method that enables to unmask the specific mask and the check digit is matched (that is, when a check digit calculated based on a data of a correction level and a data of a mask number at the time of decoding the predetermined position 105 is matched with a check digit stored in the predetermined position 105), it is possible that the two dimensional code is the classification (a classification having the free space 110) of the information code 100 and also, it is possible to obtain the error correction level and the mask number included in the format information. Therefore, when the mask processing is released based on the specific mask (that is, when the classification (the frame QR) of the information code 100 is confirmed), the processing shifts to Yes at S41. When the mask processing is released by another mask other than the specific mask (the frame QR mask) such as the mask for the model 1 and the model 2, the processing shifts to No at S41. In a case where the mask processing is released by another mask, since the two dimensional code imaged at S40 is a case of a known QR code (a registered trademark), the QR code is decoded by a known method and a decode result is output when the processing shifts to No at S41. Incidentally, processing in a case where the processing shifts to No at S41 is omitted in FIG. 13.

When the processing shifts to Yes at S41, data stored in the data recording region is decoded (S42). Specifically, the mask of the whole code (specifically, a region of the code word) is released based on the mask number included in the format information obtained at S40. An original code size (a model number and a format of the different type code 120) is identified based on the header data (the frame QR header) provided to the start portion of the data word. According to an arrangement conversion table similar to FIG. 5B, an arrangement of the information code 100 as illustrated in the right portion in FIG. 5A is changed to an arrangement of an original code (the different type code 120) as illustrated in the left portion in FIG. 5A. Specifically, the code word (the data code word and the error correction code word) in each arrangement candidate position in the information code 100 is re-disposed to an arrangement position in the different type code 120 associated to each arrangement candidate position in the arrangement conversion table. According to the arrangement conversion, the different type code 120 including the data code word and the error correction code word disposed in the information code 100 is obtained. The different type code 120 is a known QR code. Data in the different type code 120 is decoded by a method similar to a known QR code (that is, based on the error correction code word, an error correction calculation is performed by a known method and a data code word is decoded).

After decoding data in the data recording region at S42, the format information included in the header data (the frame QR header) is read. When the format information is format information representing the display format, the processing shifts to Yes at S44. When the format information is another format, the processing shifts to No at S44. Incidentally, in FIG. 9, processing in a case where the processing shifts to No at S44 is omitted.

When the processing shifts to Yes at S44 (that is, a case where the format information included in the header data (the frame QR header) is the format information representing the display format), the display region position information (a position data) included in the header data is read (S45). The free space 110 (the display region) in the information code 100 is identified. An image of the identified free space 110 (the display region) is extracted from a whole code (S47). A predetermined image processing is performed for the extracted image of the free space 110 (the display region) (S47). Incidentally, the image processing at S47 may be various, and for example, the image of the extracted free space 110 may be transmitted to an external server, or the image of the extracted free space 110 may be analyzed and a characteristic point may be extracted. It may be determined whether the image of the extracted free space 110 corresponds to a predetermined authorized image (for example, it is evaluated whether a facial image of the extracted free space 110 corresponds to a registered facial image by an evaluation method such as a pattern matching). Incidentally, the processing at S47 may be omitted. After the processing of S47, the decode data (data decoded at S47) that is obtained by decoding the data recording region is output (S48). The output of the decode data may be output to the liquid crystal display 46 for displaying. Any output method in which the decode data is transmitted to an external apparatus (a management server and a portable terminal) may be applied.

(Example of Effect of Present Configuration)

According to the present configuration, in the generated information code 100, it is possible to show at least a part of the code area using a shape, a pattern, a color, or a combination of them specifying a classification regarding the code content (at least either a record content stored in the code area or a display content shown in the code area). According to the information code 100, it is possible that a user and a third person recognizes a classification of a target shown by the information code without reading, and that a new use method is performed. The new use method cannot be performed with a conventional information code. For example, it is supposed that the method in the present configuration is not used and an image of a person or a corporation is simply shown in the information code. In this case, even when the shown person or the corporation is famous, it may be difficult to intuitively and correctly recognize a status of the person or the corporation from the image. However, according to the present configuration, irrespective of a famousness of a person or a corporation, it is possible to correctly and immediately recognize a classification (an attribution or the like).

According to the present configuration, it is possible to provide the display region (the free space 110) where a predetermined display target is shown inside the code area. It is possible to improve a design property. In addition, since a display target and a design (a shape, a pattern, a color, or a combination of them) specifying the classification of the display target are shown in the identical code area, it is possible to provide a novel method of use in which, when a user and a third person looks at the information code, it is caused to immediately recognize the display target and a classification of the display target through an visual association.

In the present configuration, as illustrated in FIG. 1, FIG. 9, or the like, the display target includes a personal image D illustrating at least a part of a person. At least a part of the code area shows the design (the shape, the pattern, the color, or the combination of them) specifying the classification regarding the person who is identified by the personal image. Accordingly, it is possible to show the information code while associating with a person, and a characteristic and a novel use method in which the classification of the person displayed on the information code is immediately recognized may be possible.

In the present configuration, it is possible to secure a region (the free space 110) where the decode target data is not stored by a cell, at a position other than the data recording region and the specific pattern region inside the code area. In addition, it is possible to generate the information code 100 in which the free space 110 is used as the display region so as to display a target other than the cell. Since, in the free space 110, the decode target data is not stored by the cell, the display region may be hardly influenced by the cell and the display region may be configured more freely.

In the present configuration, the specific portion configuring at least a part of the specific pattern region is shown using the shape, the pattern, the color, and the combination of them. The shape, the pattern, the color, and the combination of them specify a classification regarding code content. Accordingly, when the specific portion in the specific pattern region is used as the display region of the design (the shape, the pattern, the color, or the combination of them) specifying the classification, it is possible to prevent the display content of the data recording region from changing by being influenced by the design. That is, it is possible to perform a classification display, and to assure a stability of a display of the data recording region, so that it is possible to effectively prevent read defect.

In the present configuration, the three position detection patterns 104 are disposed at the specific pattern region. The specific portion that configures at least a part of the position detection pattern 104 is shown by the design (the shape, the pattern, the color, or the combination of them) specifying the classification with respect to the code content. When the design specifying the classification is added to the position detection pattern 104, which is conspicuous, a user and a third person that looks at the information code 100 may recognize the classification associated with the code content more surely.

Incidentally, in any above described examples or in any examples described below, identification information may be stored to the data recording region. The identification information illustrates that a part of the code area is shown by the design (the shape, the pattern, the color, or the combination of them) specifying the classification with respect to the code content. The identification information may be, for example, an identifier (an identification display identifier) including a predetermined character string or the like. According to this configuration, it is possible to determine based on the record content of the data recording region at the time of reading whether an information code is a normal information code without showing a classification or a characteristic information code with showing the classification in the code area. For example, when the information code read apparatus 10 reads the information code, the identification information may be checked and a response after reading may be changed depending on presence of the identification information. For example, when there is the identification information (that is, a case where the read code is the information code 100 categorized by the classification as described from FIG. 10A to FIG. 10F), predetermined first processing (for example, processing in which a read result is transmitted to a predetermined external apparatus) may be executed. When there is not the identification information, second processing (for example, processing in which the liquid crystal display 46 displays the read result without transmitting to the external apparatus) different from the first processing may be executed.

In the above described examples or in examples described below, it is possible to store display mode identification information to the data recording region. The display mode identification information identifies the display mode, which is displayed by the design (the shape, the pattern, the color, or the combination of them) specifying the classification. It is possible to recognize a classification to which the code content belongs from content of the data recording region and from appearance of the code. For example, as described in FIG. 10B, when the specific portion in the position detection pattern 104 is painted in red, information of red is stored to the data recording region as the display mode identification information. As described in FIG. 10C, when the specific portion in the position detection pattern 104 is painted in brown, information of brown is stored to the data recording region as the display mode identification information. Accordingly, not only the information code 100 is checked by a visual sense, it is possible to recognize the classification of the display target in the read apparatus 10 in a case where the information code 100 is read.

In this case, when the read apparatus 10 reads the information code 100, the read apparatus 10 may recognize the display mode identification information stored to the data recording region and the design (the shape, the pattern, the color, or the combination of them specifying the classification of the display target) shown in the information code 100, and may perform an authenticity determination whether the correspondence relation is authentic. For example, the read apparatus 10 may recognize color of a predetermined specific portion (the rectangular region of the central portion in the position detection pattern in examples from FIG. 10A to FIG. 10F) in the captured image at the time the read apparatus 10 images the information code 100. The read apparatus 10 may determine whether the recognized color is matched with the display mode identification information stored in the data recording region in the information code (that is, whether the specific portion has color indicated by the display mode identification information). The read apparatus 10 may determine the information code is authentic in a case where the color is matched with the display mode identification information and may determine the information code is wrong in a case where the color is not matched with the display mode identification information. According to this configuration, when a design showing the classification may be changed to a wrong design, it is possible to find a wrong act in the read apparatus 10.

First Modified Example in First Embodiment

The representative example in the first embodiment shows the classification with respect to the code content (at least either the record content or the display content shown in the information code) by the color. In the examples described above and in examples described below, the classification with respect to the code content (at least either the record content or the display content shown in the information code) may be shown by the pattern of the specific portion as described from FIG. 14A to FIG. 14F. Incidentally, examples from FIG. 14A to FIG. 14F is different from the first embodiment only in the display method of the classification, and example from FIG. 14A to FIG. 14F is identical to the representative example in the first embodiment with respect to the above point. For example, a method to categorize a person into a classification may be either of the representative examples. An application of the information code to a service may be either of the examples.

Figure 14A:
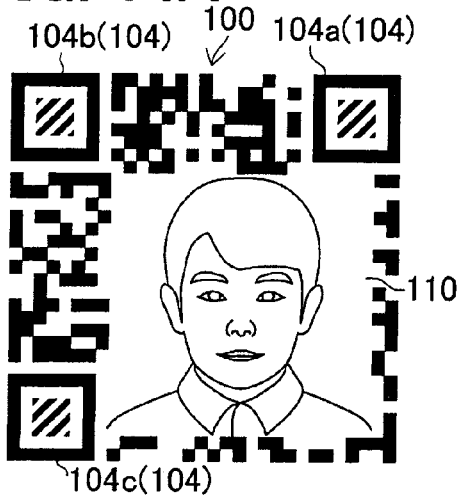
FIG. 14A is a diagram illustrating an example for each classification of the information code generated in the information code use system according to a first modified example of the first embodiment.
Figure 14B:
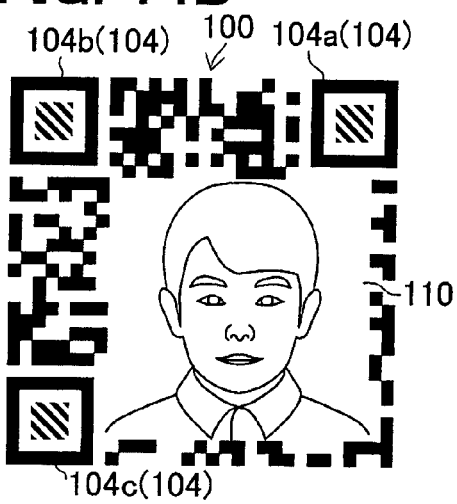
FIG. 14B is a diagram illustrating an example for each classification of the information code generated in the information code use system according to the first modified example of the first embodiment.
Figure 14C:
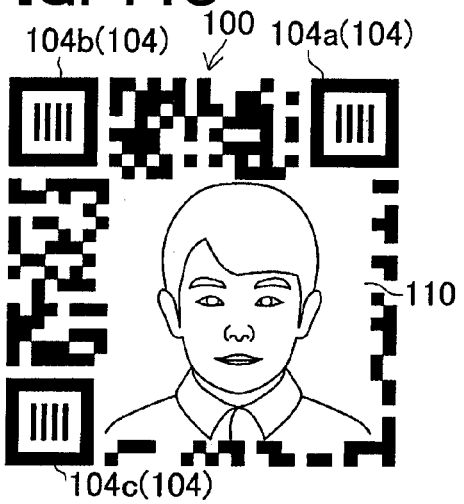
FIG. 14C is a diagram illustrating an example for each classification of the information code generated in the information code use system according to the first modified example of the first embodiment.
Figure 14D:
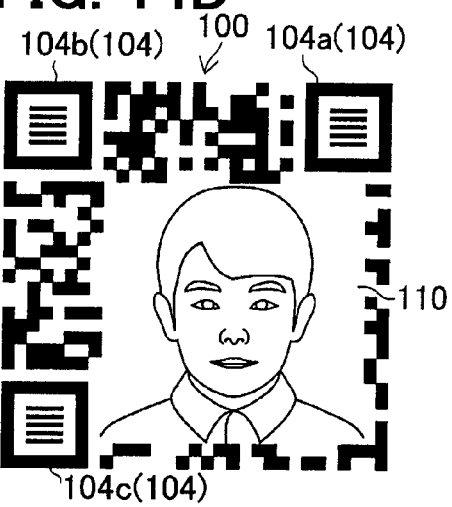
FIG. 14D is a diagram illustrating an example for each classification of the information code generated in the information code use system according to the first modified example of the first embodiment.
Figure 14E:
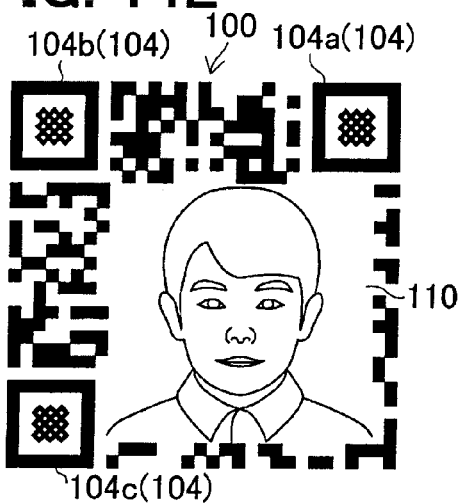
FIG. 14E is a diagram illustrating an example for each classification of the information code generated in the information code use system according to the first modified example of the first embodiment.
Figure 14F:
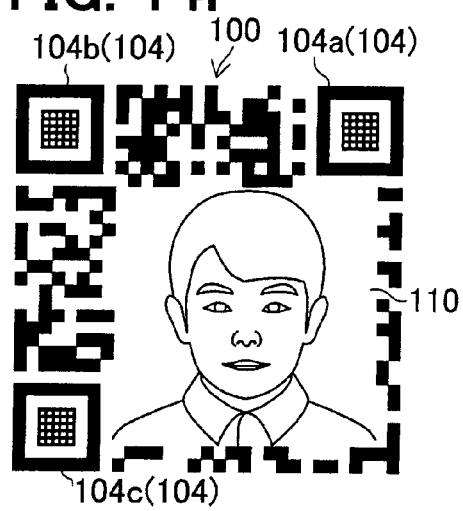
FIG. 14F is a diagram illustrating an example for each classification of the information code generated in the information code use system according to a first modified example of the first embodiment.

In examples from FIG. 14A to FIG. 14F, when a person displayed on the free space 110 (the display region) belongs to a classification 1, the information code 100 showing the person to the display region is configured as described in FIG. 14A and a classification is shown by a pattern of the central rectangular region in the position detection pattern 104. When the person displayed on the free space 110 (the display region) belongs to a classification 2, the information code 100 showing the person to the display region is configured as described in FIG. 14B, and the classification is shown by a pattern of the central rectangular region in the position detection pattern 104. When the person displayed on the free space 110 (the display region) belongs to a classification 3, the information code 100 showing the person to the display region is configured as described in FIG. 14C, and the classification is shown by a pattern of the central rectangular region in the position detection pattern 104. Cases of classifications 4, 5, 6 are similar to the above examples. Each classification is shown by a central pattern in each position detection pattern 104 in each of FIG. 14D, FIG. 14E, and FIG. 14F. In the example, effects similar to the first embodiment will be obtained.

Second Modified Example in First Embodiment

The representative example in the first embodiment displays the personal image specifying a person as the display target. The display target displayed on the free space 110 (the display region) may include a corporation specific image illustrating content specifying a corporation as described in FIG. 15. The content of the corporation specific image may be various, and as described in FIG. 15, the content may be an official name or an abbreviated name of a corporation or may be an image of a building of the corporation. The content of the corporation specific image may be an image of a mark used by the corporation or registered, or may be an image such as a product and a service provided by the corporation. Incidentally, hereinafter, as described in FIG. 15, it is supposed that an abbreviation of an imaginary corporation, which ABCD corporation, is shown on the free space 110 (the display region) as the corporation specific image. In this case, an example will be explained.

Figure 15:
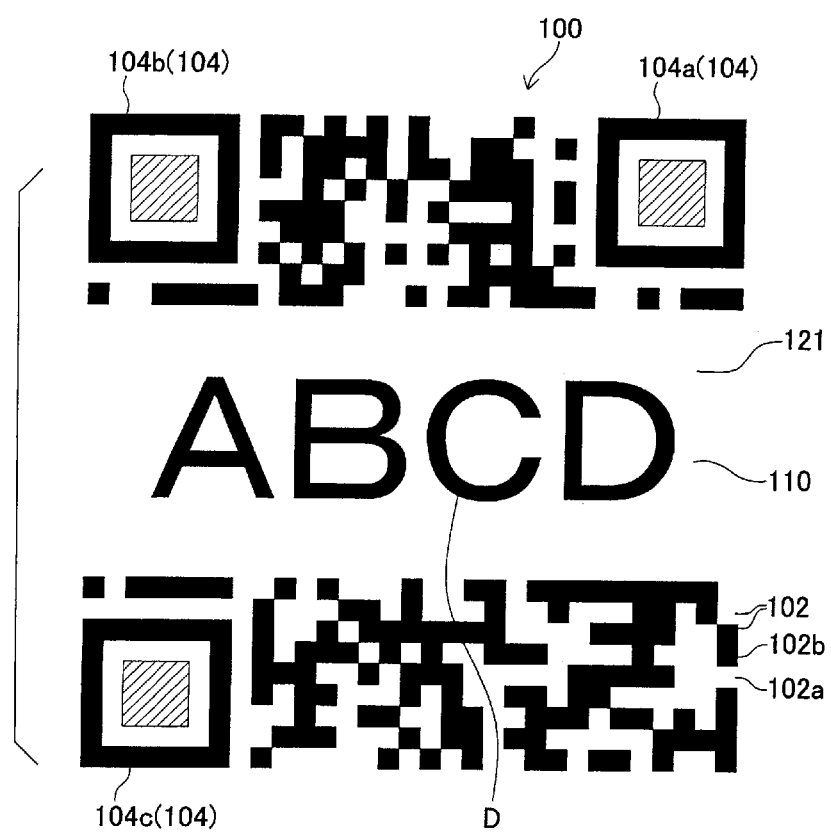
FIG. 15 is a diagram illustrating an example for the information code generated by the information code use system according to a second modified example in the first embodiment.
Figure 16A:
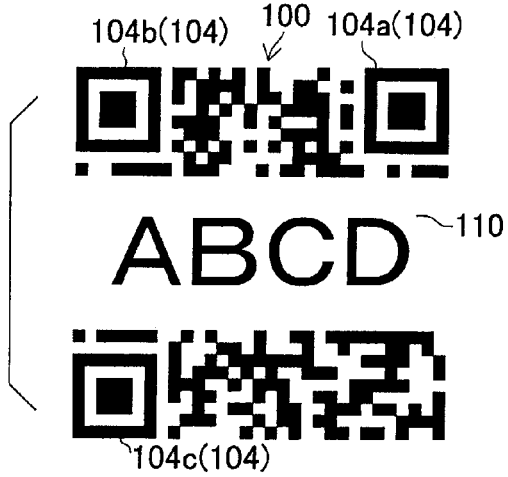
FIG. 16A is a diagram illustrating an example for each classification of the information code generated by the information code use system according to the second example of the first embodiment.
Figure 16B:
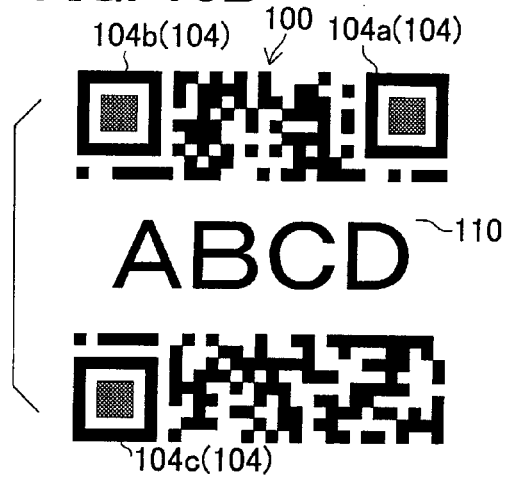
FIG. 16B is a diagram illustrating an example for each classification of the information code generated by the information code use system according to the second example of the first embodiment.
Figure 16C:
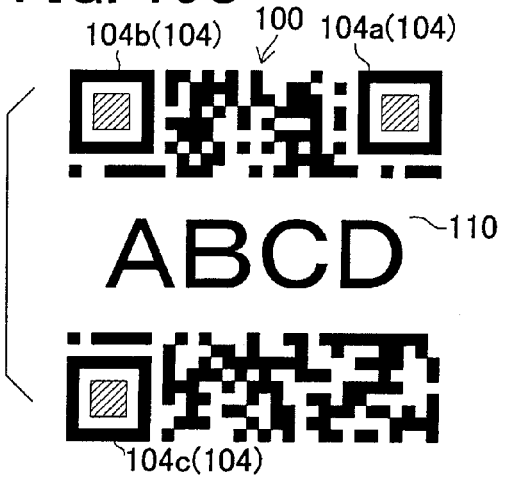
FIG. 16C is a diagram illustrating an example for each classification of the information code generated by the information code use system according to the second example of the first embodiment.
Figure 16D:
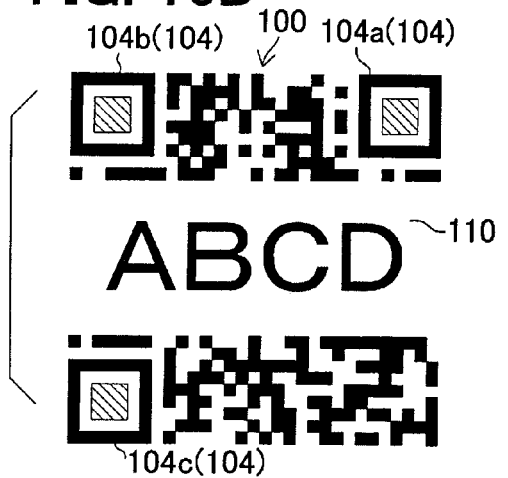
FIG. 16D is a diagram illustrating an example for each classification of the information code generated by the information code use system according to the second example of the first embodiment.
Figure 16E:
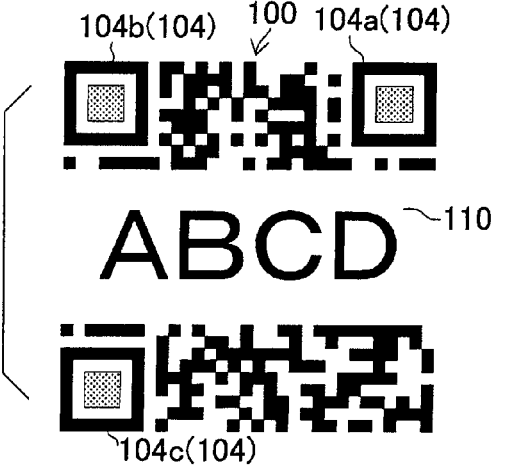
FIG. 16E is a diagram illustrating an example for each classification of the information code generated by the information code use system according to the second example of the first embodiment.
Figure 16F:
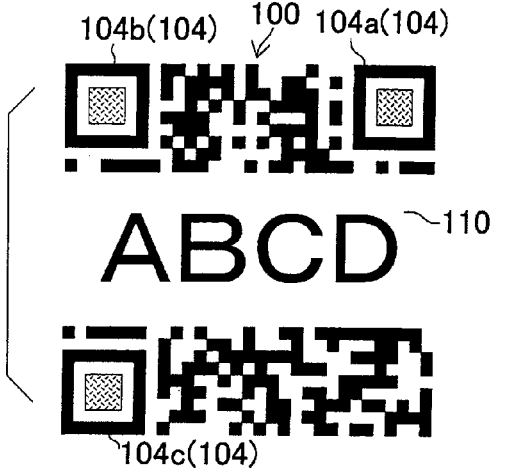
FIG. 16F is a diagram illustrating an example for each classification of the information code generated by the information code use system according to the second example of the first embodiment.

The information code 100 illustrating content associated with a corporation as described in FIG. 15 may be used and displayed on various medium as long as a medium can display a classification to which the corporation belongs. Especially, in a service or the like in which it is preferable that multiple corporations are categorized into multiple classifications in certain categories, when a classification is identified and displayed as described from FIG. 16A to FIG. 16F, it is possible to immediately and intuitively recognize the classification of the corporation by a user.

The information code may be applied to a company evaluation service used in, for example, a bank, a broker house, an investing company, another banking establishment, job information providing company, a consultancy firm. For example, when multiple corporations are categorized into multiple classifications in the service, it is possible to generate the information code with respect to each corporation as described from FIG. 16A to FIG. 16F. Specifically, as described from FIG. 16A to FIG. 16F, an image illustrating a corporation may be displayed on the free space 110. The design illustrating the classification of the corporation may be displayed at the specific portion in the position detection pattern 104 in a manner similar to the representative example in the first embodiment.

For example, evaluations of multiple corporations may be scored and shown in a form of addition or reduction with respect to a business performance, a capital composition, a scale, a gain and loss, a status of fund, a business manager, business vitality, and another element based on a rating of credit research report and a company outline data. Based on the score (the evaluation) got by each corporation, each corporation may be categorized in each score range. For example, it is supposed that a rank 1 is a case where the score (a total evaluation) is 0-35 points. In this case, when the information code 100 of a corporation belonging to the rank 1 is generated, as described in FIG. 16A, the specific portion (the rectangular region of the central portion) in the position detection pattern 104 in the information code 100 is shown in black. It is supposed that a rank 2 is a case where the score is 35-50 points. In this case, when the information code 100 of a corporation belonging to the rank 2 is generated, as described in FIG. 16B, the specific portion (the rectangular region of the central portion) of the position detection pattern 104 in the information code 100 is shown in red. It is supposed that a rank 3 is a case where the score is 51-65 points. In this case, when the information code 100 of a corporation belonging to the rank 3 is generated, as described in FIG. 16C, the specific portion (the rectangular region of the central portion) of the position detection pattern 104 in the information code 100 is shown in brown. It is supposed that a rank 4 is a case where the score is 66-85 points. In this case, when the information code 100 of a corporation belonging to the rank 3 is generated, as described in FIG. 16D, the specific portion (the rectangular region of the central portion) of the position detection pattern 104 in the information code 100 is shown in silver. It is supposed that a rank 5 is a case where the score is 86-95 points. In this case, when the information code 100 of a corporation belonging to the rank 3 is generated, as described in FIG. 16E, the specific portion (the rectangular region of the central portion) of the position detection pattern 104 in the information code 100 is shown in gold. A rank 6 shows a case where the score is equal to or more than 96 points. In this case, when the information code 100 of a corporation belonging to the rank 6, as described in FIG. 10F, the specific portion (the rectangular region in the central portion) in the position detection pattern 104 in the information code 100 is shown in hologram. Incidentally, the example of classification described here is merely an example. For example, a rank may be categorized by a social contribution degree, reliability, or the like. An information code 100 of a corporation categorized by a rank may be displayed and used in a side and an information magazine, describing evaluation content of each corporation. The image data of the generated information code 100 may be transmitted to a terminal of a receiver who wants to receive the service.

In the second modified example, the display target includes the corporation specific image illustrating content for specifying the corporation. The at least part of the code area is shown by the design (the shape, the pattern, the color, or the combination of them) specifying the classification of the corporation, which is identified by the corporation specific image. According to this configuration, it is possible to display the information code while associating a corporation, and a characteristic and a novel method of use in which the classification of the person displayed on the information code is immediately recognized may be possible.

Third Modified Example of First Embodiment

Figure 17:
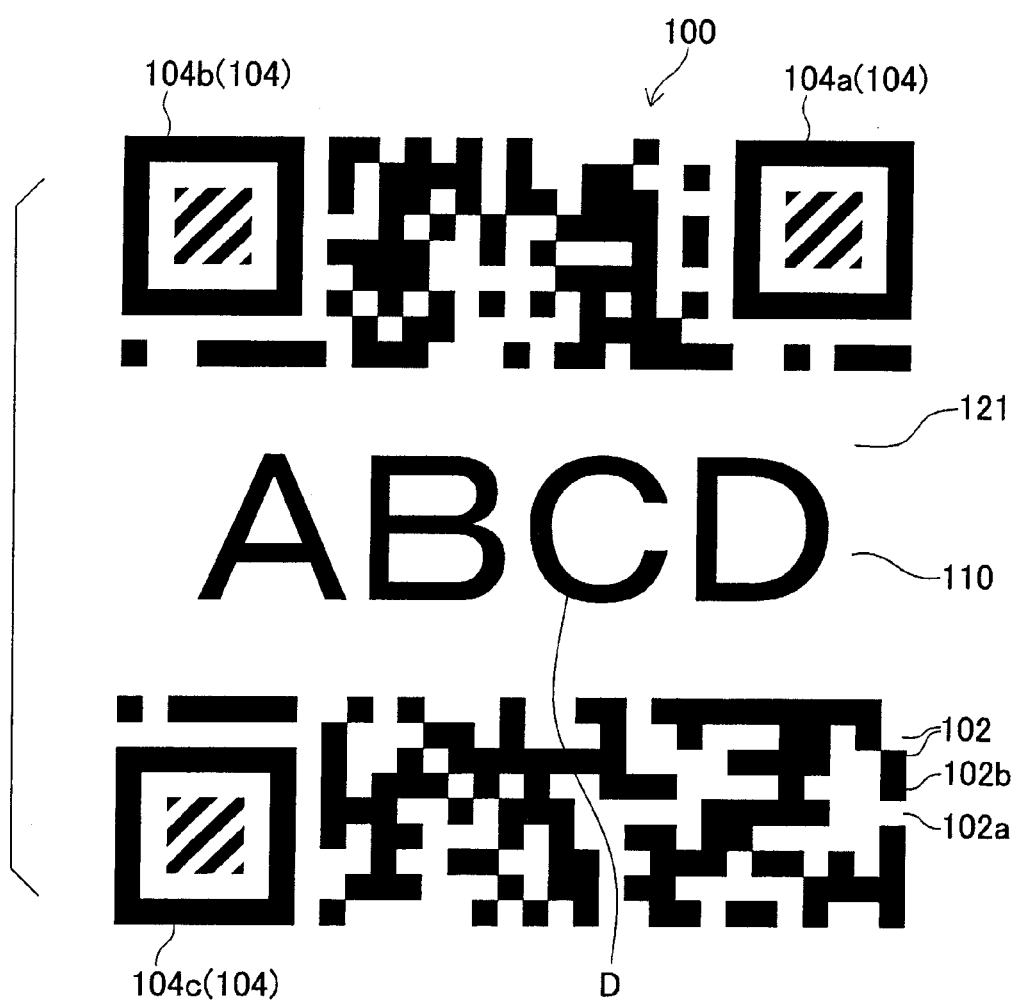
FIG. 17 is a diagram illustrating an example of the information code generated by the information code use system according to a third modified example of the first embodiment.

The second modified example shows a classification of a code content (at least either the record content or the display content shown in the information code), with respect to the information code 100 of a corporation, with color. In an example of the information code 100 associating with a corporation, a classification of the code content (at least either the record content or the display content shown in the information code) may be shown by a pattern of the specific portion as described in FIG. 17, and from FIG. 18A to FIG. 18F. Incidentally, examples in FIG. 17 and from FIG. 18A to FIG. 18F is different from FIG. 15 and from FIG. 16A to FIG. 16F in the second modified example only in a point of the display method of the classification. Regarding a point other than the display method of the classification, the examples in FIG. 17 and from FIG. 18A to FIG. 18F are identical to the second modified example. For example, regarding a method to categorize a classification of a corporation and a service applying the information code 100, the content of the second modified example may be used.

Figure 18A:
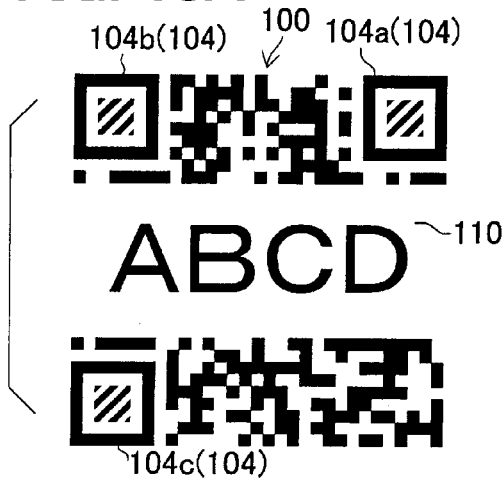
FIG. 18A is a diagram illustrating an example for each classification of the information code generated by the information code use system according to the third modified example of the first embodiment.
Figure 18B:
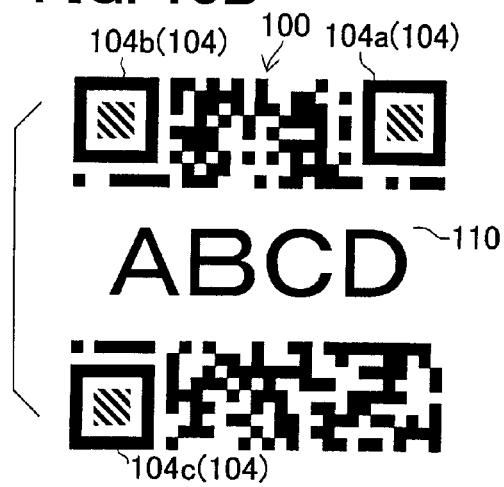
FIG. 18B is a diagram illustrating an example for each classification of the information code generated by the information code use system according to the third modified example of the first embodiment.
Figure 18C:
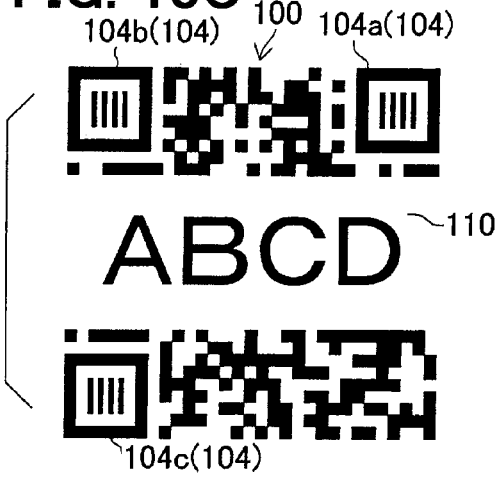
FIG. 18C is a diagram illustrating an example for each classification of the information code generated by the information code use system according to the third modified example of the first embodiment.
Figure 18D:
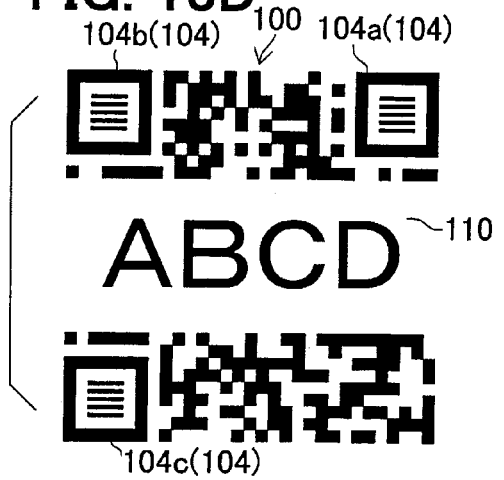
FIG. 18D is a diagram illustrating an example for each classification of the information code generated by the information code use system according to the third modified example of the first embodiment.
Figure 18E:
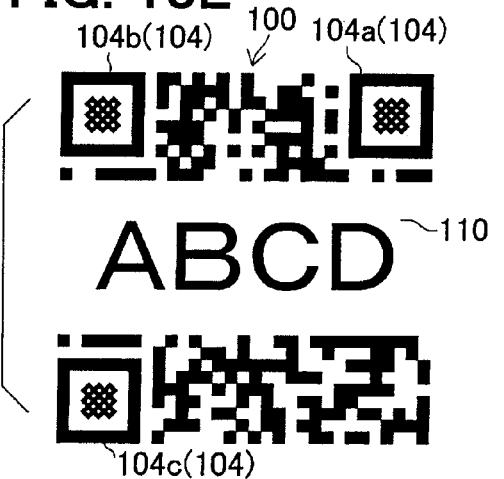
FIG. 18E is a diagram illustrating an example for each classification of the information code generated by the information code use system according to the third modified example of the first embodiment.
Figure 18F:
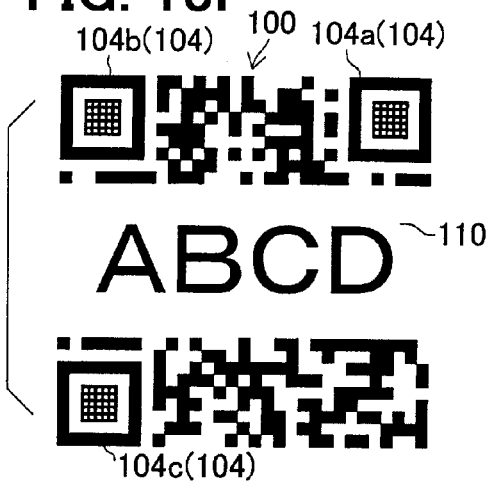
FIG. 18F is a diagram illustrating an example for each classification of the information code generated by the information code use system according to the third modified example of the first embodiment.

In the examples from FIG. 18A to FIG. 18F, when a corporation displayed on the free space 110 (the display region) belongs to a classification 1, the information code 100 showing the corporation on the display region is configured as described in FIG. 18A and the classification is shown by a pattern of the central rectangular region in the position detection pattern 104. Similarly, when a corporation displayed on the free space 110 (the display region) belongs to a classification 2, the information code 100 showing the corporation on the display region is configured as described in FIG. 18B and the classification is shown by a pattern of the central rectangular region in the position detection pattern 104. When a corporation displayed on the free space 110 (the display region) belongs to a classification 3, the information code 100 showing the corporation on the display region is configured as described in FIG. 18C and the classification is shown by a pattern of the central rectangular region in the position detection pattern 104. Cases of classifications 4, 5, 6 are similar to the above examples. Each classification is shown by a central pattern in each position detection pattern 104 in each of FIG. 18D, FIG. 18E, and FIG. 18F. In the example, effects similar to the first embodiment will be obtained.

Forth Modified Example in First Embodiment

The representative example in the first embodiment displays the personal image specifying a person as the display target. The display target displayed on the free space 110 (the display region) may include a target specific image specifying at least one of a product, a predetermined item other than the product, a service, and a predetermined action other than a service, as described in FIG. 19 and from FIG. 20A to FIG. 20F. Incidentally, the product may include any kind of products used in a commercial transaction. The predetermined item other than the product may include various items not used in a commercial transaction. For example, the predetermined item other than the product may include a work such as a painting and sculpture provided by a person. A classification may be a grade such a golden award, a silver award, a bronze award. Any things may be used as long as a certain article can be categorized in multiple classifications. The service may be various labor or benefits provided by a business operator. The predetermined action other than the service may include a volunteer activity and a learning activity performed by a person. In this case, the display region may display arithmetic as a learning item. A part of the code area may show a design illustrating a skill level of the learning item. Any actions may be used as long as a certain action can be categorized in multiple kinds. The target specific image specifying at least one of the product, the predetermined item other than the product, the service, and the predetermined action other than the service may be character information that directly illustrates either of the product, the predetermined item other than the product, the service, and the predetermined action other than the service. The target specific image specifying at least one of the product, the predetermined item other than the product, the service, and the predetermined action other than the service may be a mark of the product and the service. The target specific image specifying at least one of the product, the predetermined item other than the product, the service, and the predetermined action other than the service may be a photograph either of the product, the predetermined item other than the product, the service, and the predetermined action other than the service and may be a picture resembling either of the product, the service, and the predetermined action other than the service. Incidentally, hereinafter, as the target specific image D, an example illustrating a photograph of the product (a vehicle) as described in FIG. 19 and from FIG. 20A to FIG. 20F will be explained.

Figure 19:
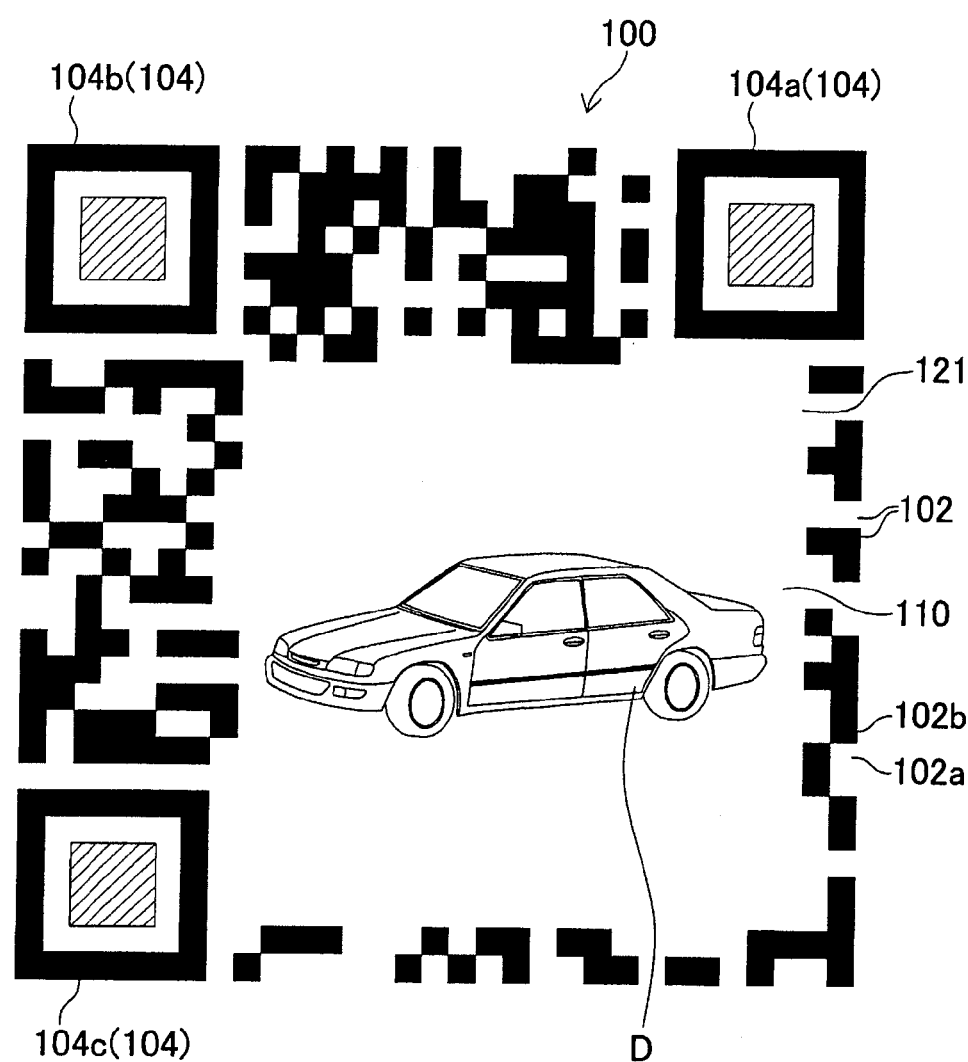
FIG. 19 is a diagram illustrating an example of the information code generated by the information code use system according to a fourth modified example of the first embodiment.
Figure 20A:
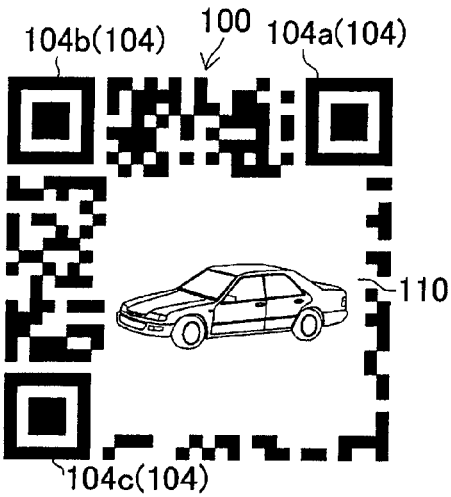
FIG. 20A is a diagram illustrating an example for each classification of the information code generated by the information code use system according to the fourth example of the first embodiment.
Figure 20B:
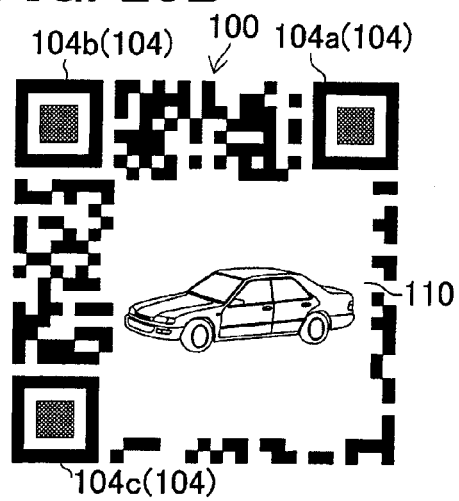
FIG. 20B is a diagram illustrating an example for each classification of the information code generated by the information code use system according to the fourth modified example of the first embodiment.
Figure 20C:
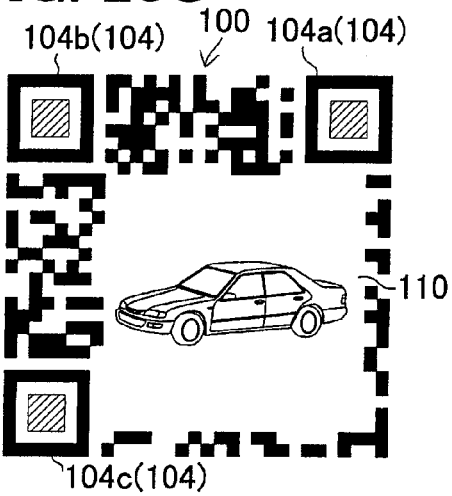
FIG. 20C is a diagram illustrating an example for each classification of the information code generated by the information code use system according to the fourth example of the first embodiment.
Figure 20D:
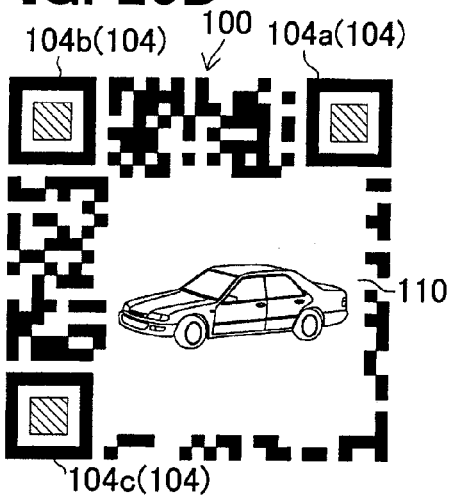
FIG. 20D is a diagram illustrating an example for each classification of the information code generated by the information code use system according to the fourth example of the first embodiment.
Figure 20E:
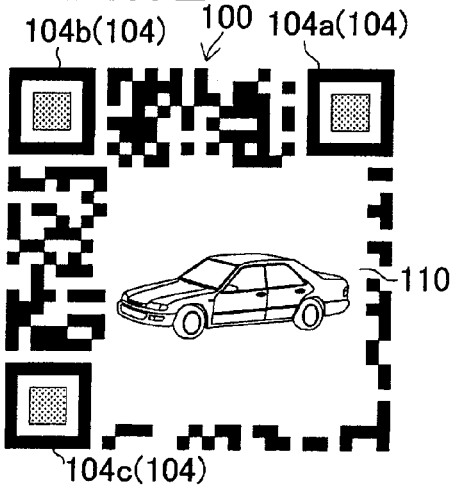
FIG. 20E is a diagram illustrating an example for each classification of the information code generated by the information code use system according to the fourth example of the first embodiment.
Figure 20F:
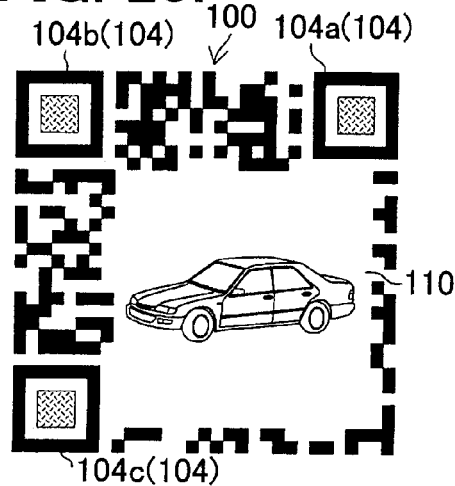
FIG. 20F is a diagram illustrating an example for each classification of the information code generated by the information code use system according to the fourth example of the first embodiment.

The information code 100 illustrating a content associating the product as described in FIG. 19 may be displayed and used in various medium as long as a medium can display a classification to which the product belongs. Especially, in a service or the like in which it is preferable that multiple products are categorized into multiple classifications in certain categories, when a classification is identified and displayed as described from FIG. 20A to FIG. 20F, it is possible to immediately and intuitively recognize the classification of the product by a user.

A category of the product may be applied to, for example, a product evaluation side, a product evaluation magazine, a guidebook, a competitive show. The category of the product may be applied to a case where a company displays a product of the company while categorizing the product in multiple classifications. When multiple products are categorized into multiple classifications regarding the service, the information code regarding each product may be generated as described from FIG. 20A to FIG. 20F. Specifically, as described from FIG. 20A to FIG. 20F, an image D illustrating a product may be displayed on the free space 110, a design illustrating a classification of the product may be shown at the specific portion in the position detection pattern 104 in a manner similar to the representative example in the first example.

As described above, in the fourth modified example, the display target includes the target specific image (for example, the image D illustrated n FIG. 19) specifying at least one of the product, the predetermined item other than the product, the service, the predetermined action other than the service. An at least a part of the code area is shown using the shape, the pattern, the color or the combination of them, specifying a classification regarding either of the product, the predetermined item other than the product, the service, and the predetermined action other than the service that are identified by the target specific image. According to this configuration, it is possible to display the information code while associating with a displayed target (the product or the like), and a characteristic and a novel method of use in which the classification of the target (the product or the like) displayed on the information code is immediately recognized may be possible.

Fifth Modified Example in First Embodiment

The representative example in the first embodiment categorizes a person shown in the information code 100 in either of categorization systems, and a classification to which the person belongs at the time the person is classified in the categorization system is shown in the identical color (color showing the classification of the display target) at the specific portion in the three position detection patterns 104. It is not limited to this example. For example, a combination of color applied to the three position detection patterns 104 may specify the classification. For example, as described in FIG. 21, a classification 1 may be defined as a case where a position detection pattern 104a has a color of brown, a position detection pattern 104b has a color of blue, and a position detection pattern 104c has a color of dark blue. A classification 2 may be defined as a case where the position detection pattern 104a has a color of black, the position detection pattern 104b has a color of green, and the position detection pattern 104c has a color of brown. According to a pattern of colors, a classification may be identified.

Figure 21:
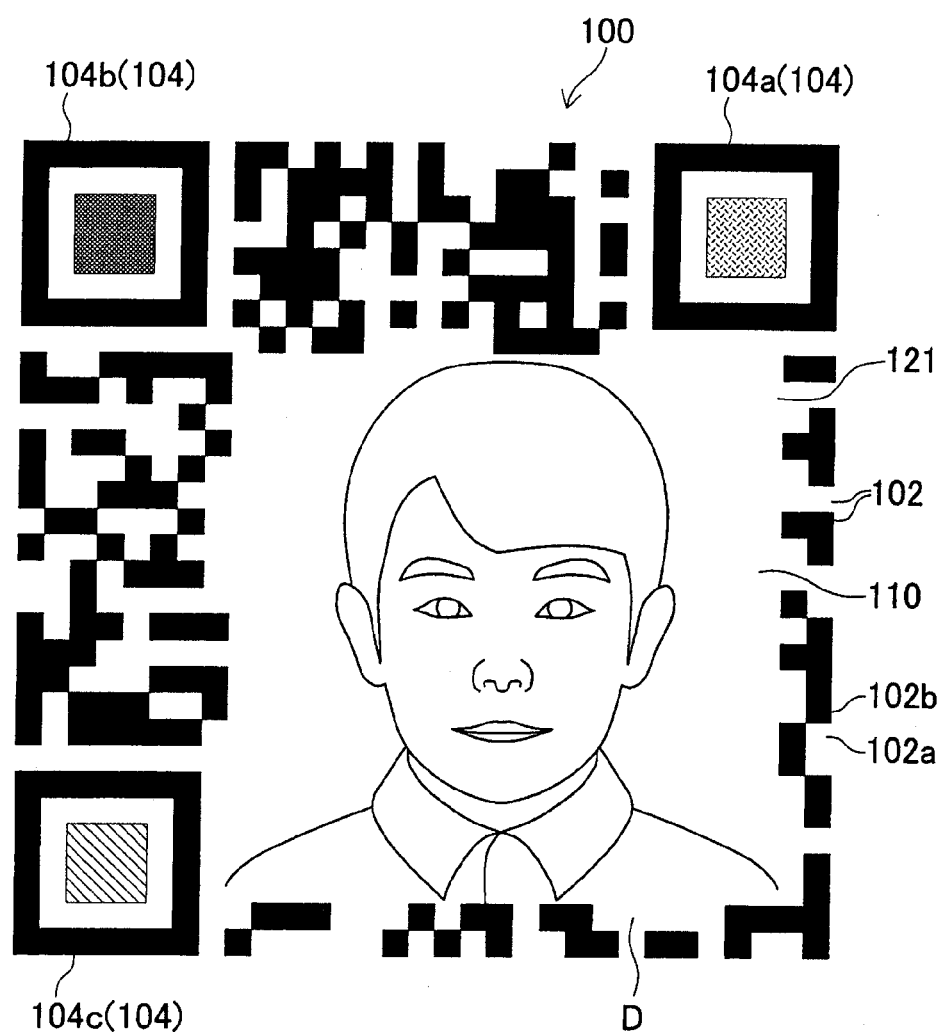
FIG. 21 is a diagram illustrating an example of the information code generated by the information code use system according to a fifth modified example of the first embodiment.

Alternatively, a person displayed on the information code 100 may be categorized in multiple categorization systems, and as described in FIG. 21, the classification in each categorization system for the person may be shown in each of the position detection patterns 104a, 104b, 104c. For example, in the central rectangular region in the position detection pattern 104a, a rank of a social contribution degree of the person displayed on the information code 100 may be shown by color, in the central rectangular region in the position detection pattern 104b, a rank of an economic power (for example, an annual salary) of the person displayed on the information code 100 may be shown by color, and, in the central rectangular region in the position detection pattern 104c, a rank of a point that the person displayed on the information code 100 has may be shown by color.

Sixth Modified Example in First Embodiment

The second modified example categorizes the corporation displayed on the information code 100 in either of the categorization systems, and a classification to which the corporation belong at the time when the corporation is categorized by a categorization system is shown in the identical color (color showing a classification of a display target) at the specific portion in the three position detection pattern 104. It is not limited to this example. For example, a combination of color applied to the three position detection patterns 104 may specify the classification. For example, as described in FIG. 22, a classification 1 may be defined as a case where a position detection pattern 104a has a color of brown, a position detection pattern 104b has a color of blue, and a position detection pattern 104c has a color of dark blue. A classification 2 may be defined as a case where the position detection pattern 104a has a color of black, the position detection pattern 104b has a color of green, and the position detection pattern 104c has a color of brown. According to a pattern of colors, a classification of the corporation may be identified.

Figure 22:
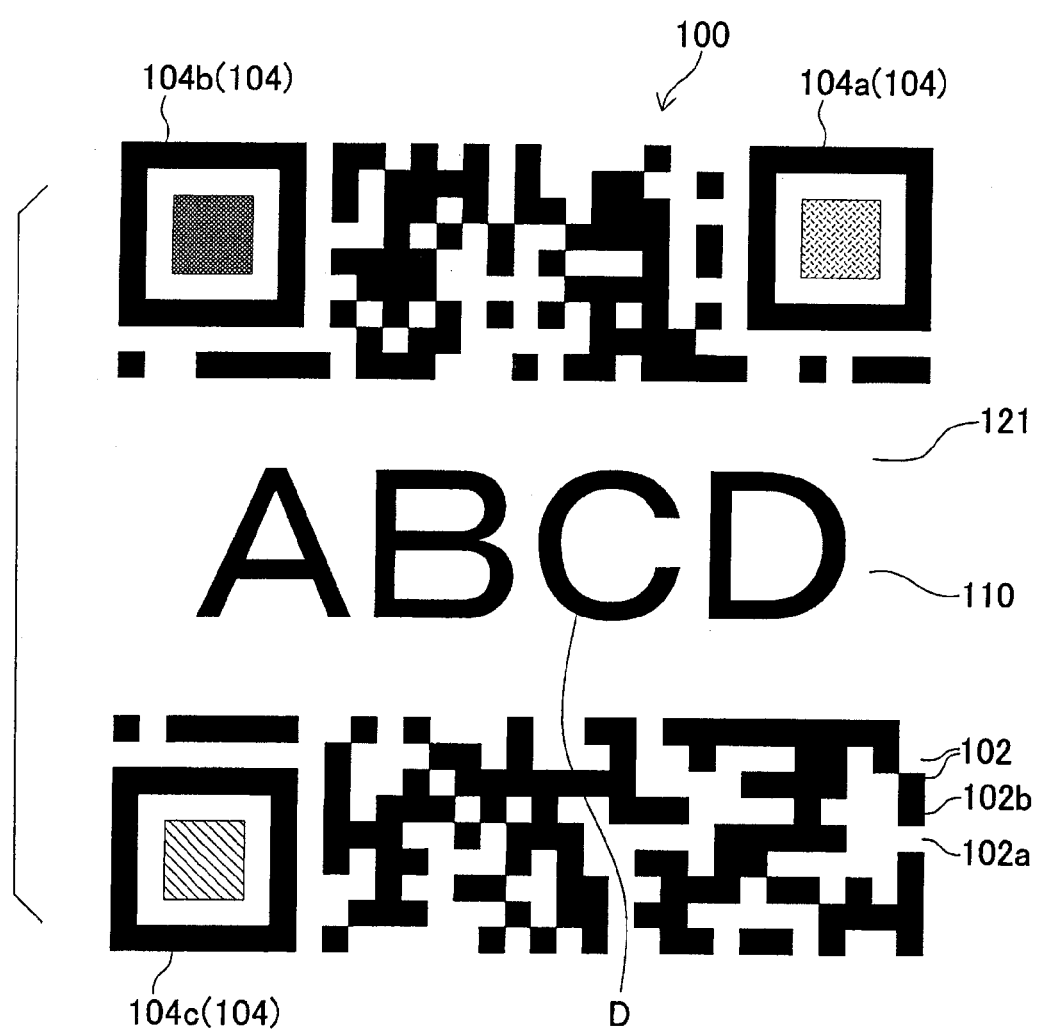
FIG. 22 is a diagram illustrating an example of the information code generated by the information code use system according to the fifth modified example of the first embodiment.

Alternatively, a corporation displayed on the information code 100 may be categorized in multiple categorization systems, and as described in FIG. 22, the classification in each categorization system for the corporation may be shown in each of the position detection patterns 104a, 104b, 104c. For example, in the central rectangular region in the position detection pattern 104a, a rank of a credibility of the corporation displayed on the information code 100 may be shown by color, in the central rectangular region in the position detection pattern 104b, a rank of a scale (the number of employees or the like) of the corporation of the person displayed on the information code 100 may be shown by color, and, in the central rectangular region in the position detection pattern 104c, a rank of a gain and loss of the corporation displayed on the information code 100 has may be shown by color.

Seventh Modified Example in First Embodiment

Figure 23A:
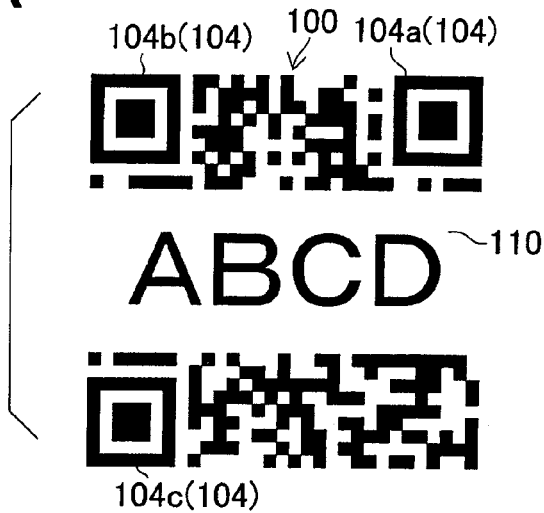
FIG. 23A is a diagram illustrating an example for each classification of the information code generated by the information code use system according to a seventh modified example of the first embodiment.
Figure 23B:
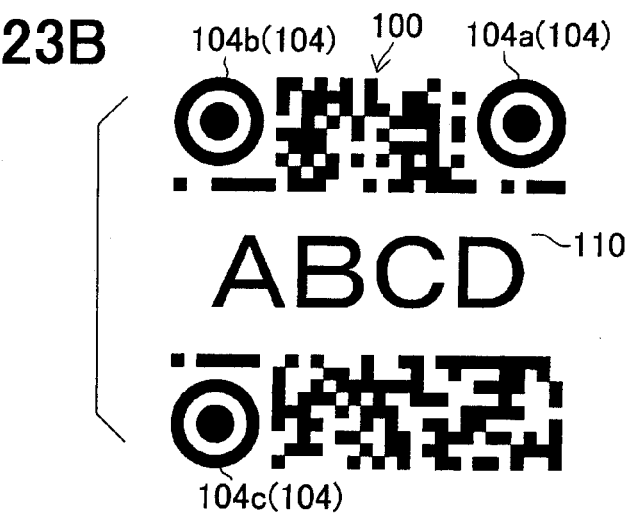
FIG. 23B is a diagram illustrating an example for each classification of the information code generated by the information code use system according to the seventh modified example of the first embodiment.
Figure 23C:
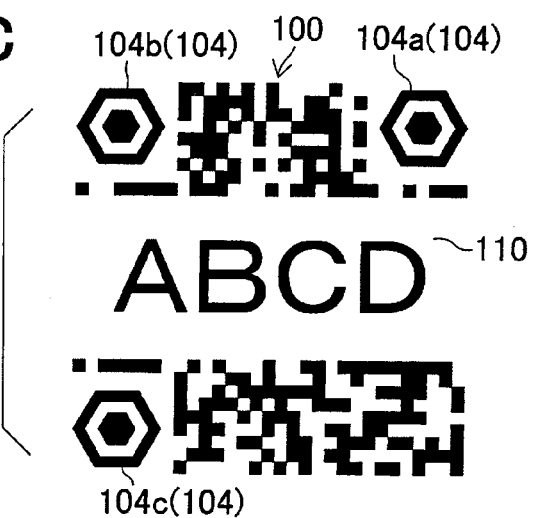
FIG. 23C is a diagram illustrating an example for each classification of the information code generated by the information code use system according to the seventh modified example of the first embodiment.

The representative example and modified examples in the first embodiment shows the classification with respect to the code content (at least either the record content or the display content shown in the information code) by the color and the pattern. In the examples described above and in examples described below, the classification with respect to the code content (at least either the record content or the display content shown in the information code) may be shown using a shape of the specific portion as described from FIG. 23A to FIG. 23C. Incidentally, examples from FIG. 23A and from FIG. 23A to FIG. 23C are different from the second modified example only in a point of the display method of the classification. Regarding a point other than the display method of the classification, the examples from FIG. 23A to FIG. 23C are identical to the second modified example. For example, regarding a method to categorize a classification of a corporation and a service applying the information code 100, the content of the second modified example may be used.

In the examples from FIG. 23A to FIG. 23C, when a corporation displayed on the free space 110 (the display region) belongs to the classification 1, the information code 100 showing the corporation on the display region is configured as described in FIG. 23A and the classification is shown using a shape of the position detection pattern 104. Similarly, when a corporation displayed on the free space 110 (the display region) belongs to the classification 2, the information code 100 showing the corporation on the display region is configured as described in FIG. 23B and the classification is shown using the shape of the position detection pattern 104. When a corporation displayed on the free space 110 (the display region) belongs to the classification 3, the information code 100 showing the corporation on the display region is configured as described in FIG. 23C and the classification is shown using the shape of the position detection pattern 104. In the example, effects similar to the first embodiment and the modified examples will be obtained.

Eighth Modified Example in First Embodiment

The eighth modified example in the first embodiment will be explained.

Incidentally, in the eighth modified example, a feature that a medium displaying the information code 100 is a portable terminal 90 is added, and, with respect to a point other than the feature, any example exemplified in the representative example and the modified examples in the first embodiment may be applied to this modified example. Hereinafter, it is supposed that, in the representative example in the first embodiment, the medium showing the information code 100 is the portable terminal 90.

A system 1 according to the present configuration includes all system configurations in the representative example. As described in FIG. 24 and FIG. 25, the system 1 includes the generation apparatus 2 and the read apparatus 10 similar to the representative example. The generation apparatus 2 and the read apparatus 10 function similar to the representative example. For example, the generation apparatus 2 corresponds to an example of an information code generation portion and a generation system. The generation apparatus 2 functions similar to the representative example and generates the information code 100 illustrated in FIG. 9 or the like. The portable terminal 90 corresponds to an example of an information code display portion, and displays the information code generated by the information code generation portion.

Figure 24:
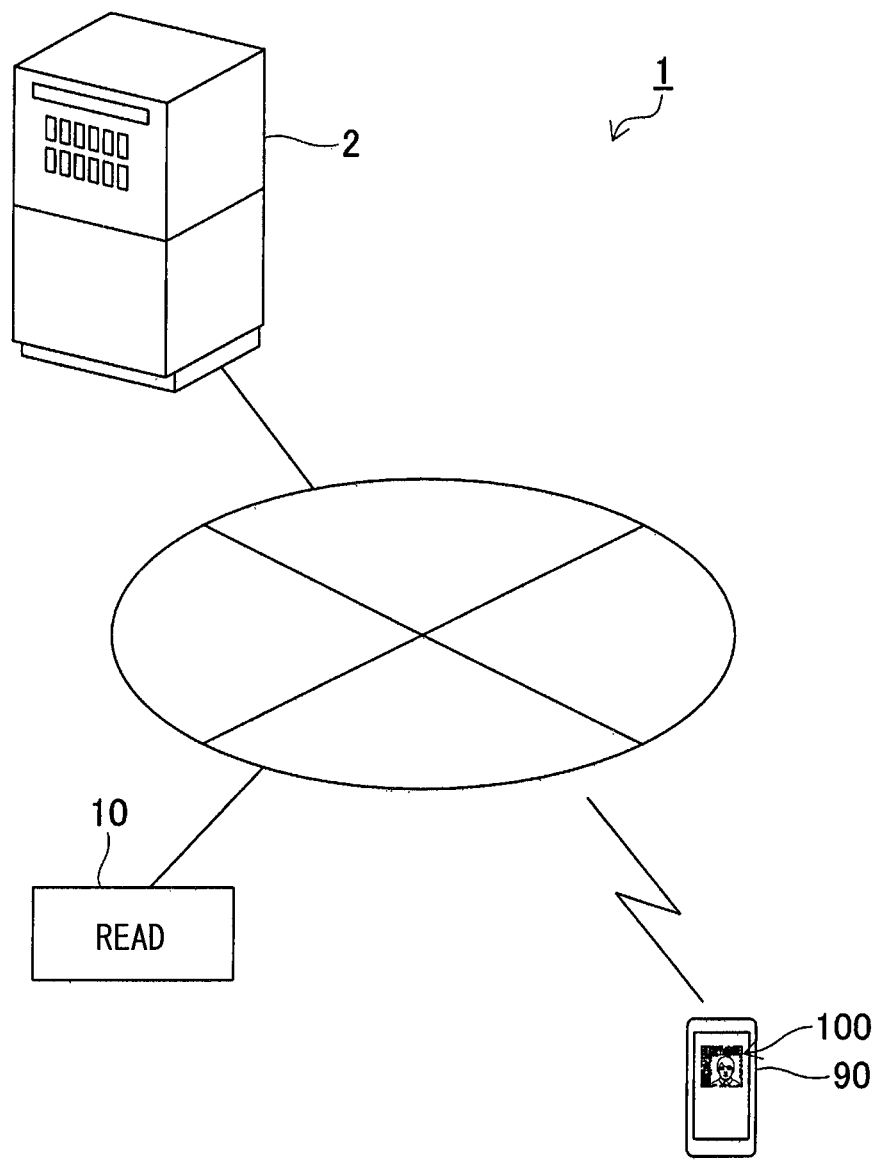
FIG. 24 is a diagram conceptually explaining a system configuration of the information code use system according to an eighth modified example of the first embodiment.
Figure 25:
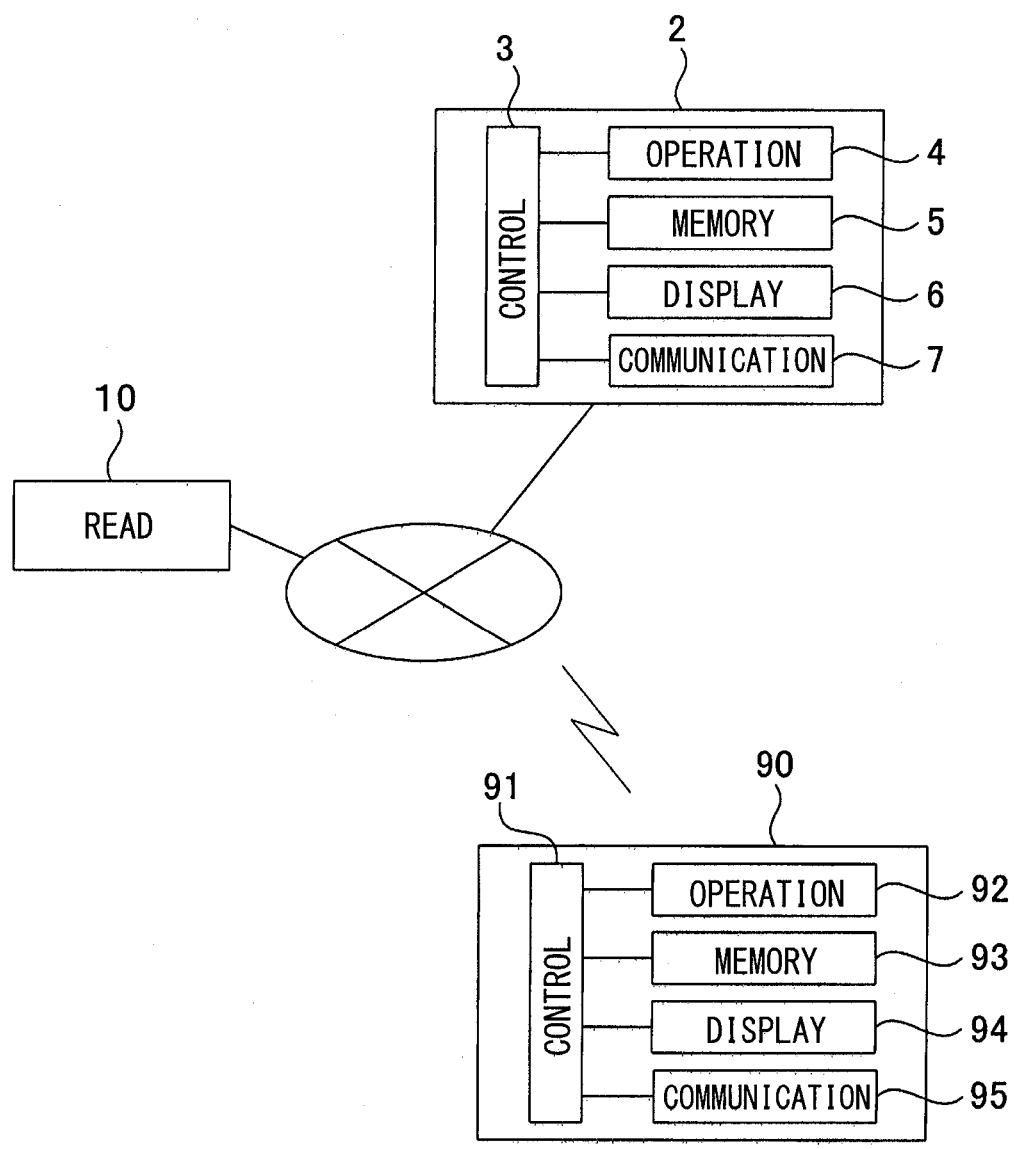
FIG. 25 is a block diagram schematically illustrating electric configuration of each apparatus exemplified in FIG. 24.

The portable terminal 90 as described in FIG. 24 and FIG. 25 is a terminal apparatus that is used by a person and a corporation who want to register. The portable terminal 90 is configured from an information processing apparatus such as a portable telephone machine, a smartphone, a portable personal computer, another portable device. The portable terminal 90 includes a control portion 91 having a CPU or the like, an operation portion 92 having an operation button, a touch panel, another input device, a memory portion 93 having a ROM, a RAM, a memory device such as a non-volatile memory, a display portion 94 having a known display device (a liquid crystal display, an organic EL display, another display device), and a communication portion 95 performing a wire communication or a wireless communication with an external apparatus as a communication interface.

In the present configuration, in the memory portion 5 of the generation apparatus 2, a registration data of each display target (a person in an example of FIG. 12) is stored as described in FIG. 12. That is, in the memory portion 5, either of a subject (for example, a person and a corporation) or an object is a registration target (the display target in the information code 100). When multiple registration targets are associated with classification information, the memory portion 5 stores each registration data (for example, a personal image and personal information in a case where a person is the registration target, a corporation specific image and corporation information in a case where a corporation is the registration target, and a product image and product information in a case where a product is the registration target) with respect to multiple registration targets. Data input from a predetermined operation in the operation portion 4 and the external portion corresponds to a generation command of the information code. When designation information designating a registration target is received from the external portion of the generation apparatus 2, the control portion 3 obtains the input information, searches the memory portion 5 based on the obtained designation information, and reads the registration data with respect to the registration target designated by the designated information. For example, when either of persons is designated, the personal image and the personal information associated with the person who is designated are read in the memory portion 5.

Incidentally, in the present configuration, the memory portion 5 corresponds to an example of a memory portion. The memory portion has a registration target that is either of an object and a subject, associates classification information with multiple registration targets respectively, and stores registration data regarding multiple registration targets. The control portion 3 corresponds to an example of an acquisition portion. The control portion 3 reads input information when designation information designating either of the registration targets is received from the external portion of the generation apparatus 2 (the information code generation portion). Furthermore, the control portion 3 corresponds to an example of a read portion. The control portion 3 as the read portion searches the memory portion 5 based on the designation information obtained by the acquisition portion and reads the registration data with respect to the registration target designated by the designation information. The control portion 3 corresponds to an example of a generation processing portion. The control portion 3 generates a code image data so as to display the information code 100 based on the read registration data of the registration target. Specifically, based on the read registration data of the registration target, content with respect to the read registration target is at least stored to the data recording region or shown in the code area. And, the information code 100 is generated. In the information code 100, a classification identified by the classification information associated with the registration target and stored in the memory portion 5 is shown using the shape, the pattern, the color, or the combination of them.

For example, it is supposed that a data as described in FIG. 12 is stored in the memory portion 5 and the information code 100 is generated. In this case, when either of persons is designated by an input from the external portion to the generation apparatus 2, as described in FIG. 9, a specific pattern region where a specific pattern having a predetermined shape is disposed, a data recording region storing a data by multiple kinds of cells, and a free space 110 (a display region), which is different from the cell and the specific pattern, in which a predetermined display target is at least displayed are provided inside the code area. And, in the free space 110, a personal image D (a personal image stored in the memory portion 5 and associated with the person) associated with a person designated by an external input is shown so that the information code 100 is generated. At the time of generation, at least a part (for example, as described in FIG. 9 and from FIG. 10A to FIG. 10F, specific portions α1, α2, α3 in each position detection pattern 104) of the code area is shown by a design (a shape, a pattern, a color, or a combination of them) that identifies a classification of a person identified by the personal image D in the free space 110 (the display region), so that the information code 100 is generated. More specifically, a code image data (for example, an electronic data such as an image file having a predetermined format) that can display the information code 100 configuring as described in FIG. 9 on a display screen is generated.

In the present modified example, the code image data (the electronic data such as the image file) of the information code 100 generated by the generation apparatus 2 is transmitted from the generation apparatus 2 to the portable terminal 90, according to a predetermined transmission condition. For example, when the portable terminal 90 that either of persons has makes a transmission request of the information code 100 (an information code displaying the person on the display region and showing a design illustrating a classification of the person at the specific portion) regarding the person to the generation apparatus 2, in response to the transmission request, the generation apparatus 2 transmits the code image data of the information code 100 with respect to the person to the portable terminal 90 that makes the transmission request. Alternatively, when, in the operation portion 4 of the generation apparatus 2, a predetermined input operation that instructs to transmit the information code 100 of either of persons to the portable terminal 90 of the person, the generation apparatus 2 may transmit the code image data of the information code 100 (the information code displaying the person on the display region and showing a design illustrating a classification of the person at the specific portion) with respect to the person to the portable terminal 90. Incidentally, in the present configuration, the communication portion 7 of the generation apparatus 2 corresponds to an example of a transmission portion, and the communication portion 7 transmits the code image data, which is generated by the generation processing portion.

The portable terminal 90 configured as a portable terminal apparatus receives the code image data transmitted from the generation apparatus 2, and the display portion 94 displays the information code 100 that can be shown by the code image data. Incidentally, in the present configuration, the communication portion 95 of the portable terminal 90 corresponds to an example of a receiver portion, and receives the code image data that is transmitted from a transmission portion of the generation apparatus 2 (an information code generation portion, and a generation system). The control portion 91 corresponds to an example of a display control portion, and causes the display portion 94 (the display device) to display the information code 100 based on the code image data received by the receiver portion.

The portable terminal 90 may be used instead of any of the medium (a medium being used and displaying the information code 100) exemplified in the representative example. For example, the portable terminal 90 may be used as a medium (a student card, an employee ID card, a membership card, and another ID card, a point card, a credit card, a debit card, an digital money card, and another settlement medium) used by a person to be a user in various subjects such as a shop, an educational organization (a various schools, a calligraphy lesson, an abacus class, a gymnastic exercise class, a swim school, or the like), a company, another private business, a national organization, a local public agency, another public organization.

The control portion 3 of the generation apparatus 2 functions as an update portion. When a change command changing a classification content of either of registered targets is received, the control portion 3 updates the classification information corresponding to the registration target stored in the memory portion 5 to the content designated by the change command. For example, when, by an external operation to the operation portion 4, the change command for changing the classification information of a person 1 in FIG. 12 from a classification 1 to a classification 2 is input, the control portion 3 changes a content of the memory portion 5 and changes the classification information of the person 1 to the classification 2. When the classification information of each registration target is made renewable, for example, when the information code 100 regarding the person 1 is transmitted to the portable terminal 90 of the person 1, it is possible to always transmit the information code 100 reflecting the latest classification information. At the portable terminal 90 downloading the information code 100 from the generation apparatus 2, in the information code 100 to be displayed, the latest classification information is displayed as a design always.

Ninth Modified Example of First Embodiment

The eighth modified example is configured from the information code generation portion and the information code display portion as separate apparatuses. The information code generation portion and the information code display portion may be provided to an identical portable terminal. For example, the portable terminal 90 may include all functions of the generation apparatus 2 and may generate the information code 100 at the portable terminal 90, so that the information code 100 may be displayed at the display portion 94 in the portable terminal 90.

Second Embodiment

The second embodiment will be explained.

Figure 2:
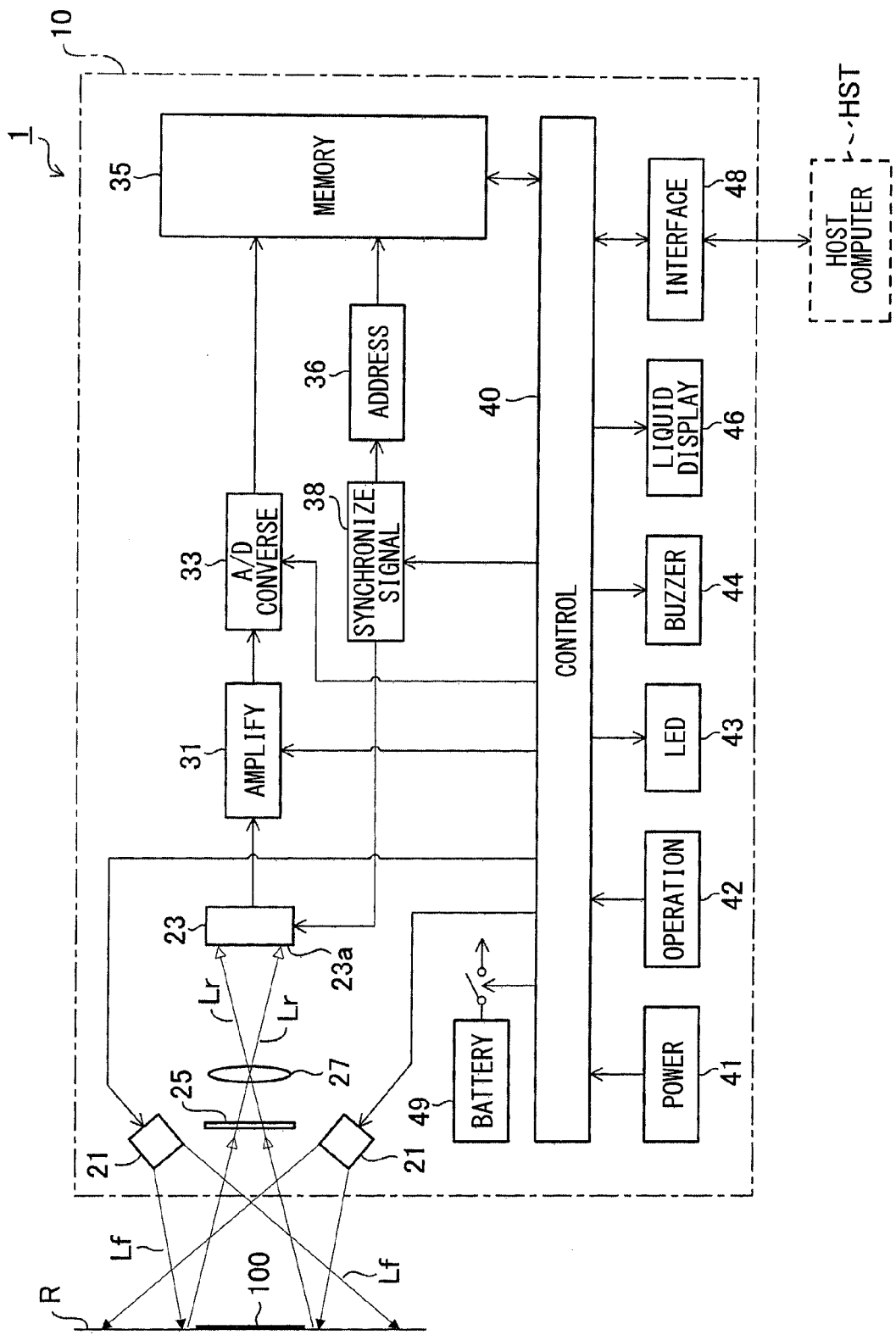
FIG. 2 is a block diagram schematically exemplifying an electric configuration of an information code read apparatus configuring the information code use system described in FIG. 1.

The information code use system in the second embodiment has the hardware configuration identical to the first embodiment, and the configuration as described in FIG. 1 and FIG. 2 is used.

Figure 26A:
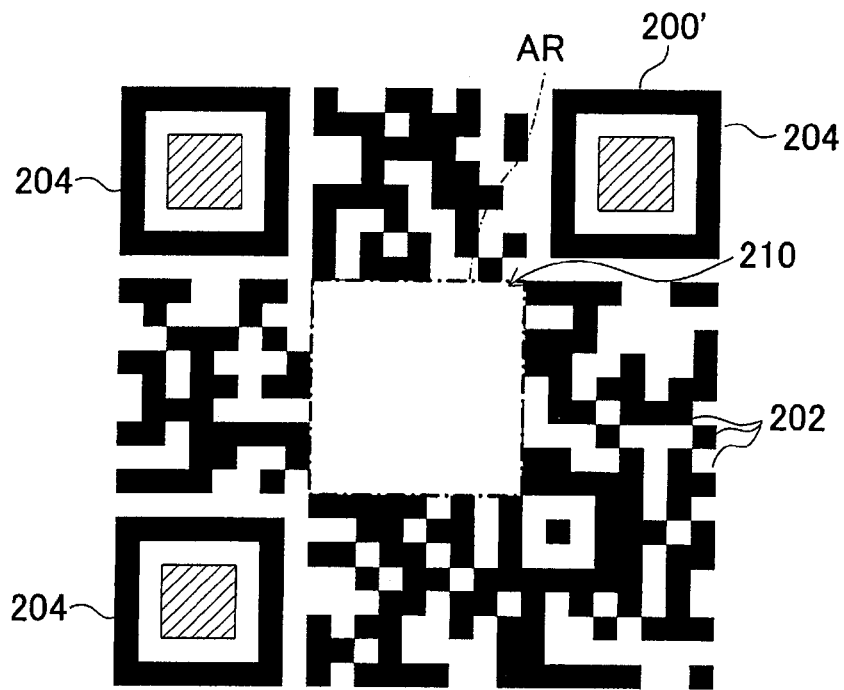
FIG. 26A is a diagram explaining the information code used in the information code use system according to a second embodiment and illustrating a case where a free space is blank.
Figure 26B:
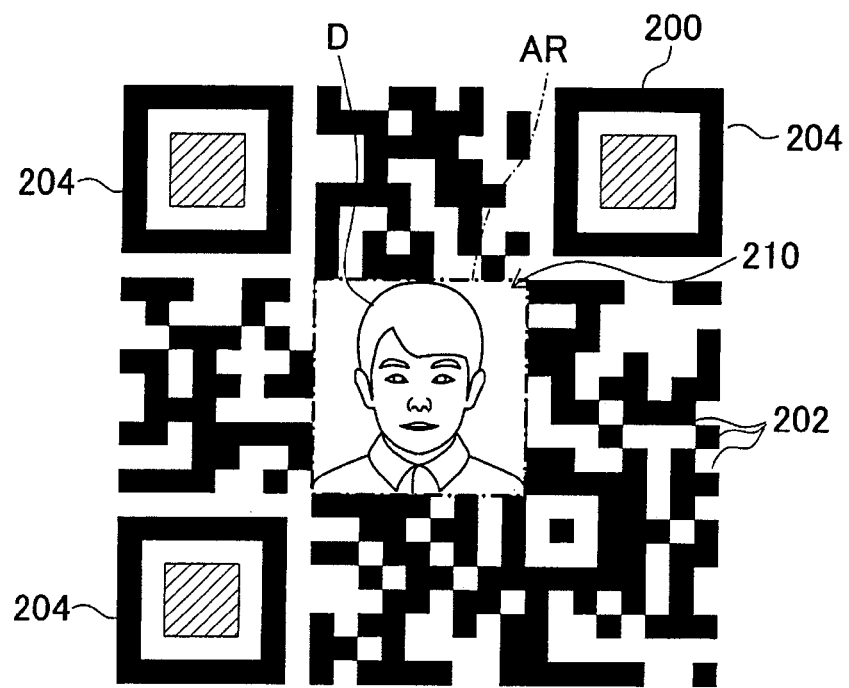
FIG. 26B is a diagram illustrating a status where a specific image is positioned to the free space.

In the information code use system of the second embodiment, the information code generation apparatus 2 (referring to FIG. 1 or the like) generates an information code 200 as described in FIG. 26B. In this configuration, the specific pattern region where a specific pattern 204 having a predetermined shape is disposed and a data recording region storing a data by a multiple kinds of cells are provided to the inside of the code area. In the code area, at a position other than the specific pattern region, by a manner different from a manner storing a data to the data recording region, a free space 210 (a display region) that enables to store the data or to display a design is provided with a predetermined size larger than a size of a single cell.

In this configuration, the configuration other than the free space 210 is configured as a known QR code (a registered trademark). As described in FIG. 26A, in the code area, the specific pattern region, the data recording region, and the error correction code recording region storing the error correction code by the multiple kinds of cells are provided. Incidentally, a record method of a data code word in the data recording region and a record method of the error correction code word in the error correction code recording region are similar to the known QR code (a registered trademark). For example, an arrangement of a position detection pattern (a specific pattern 204) in the code area, an arrangement of the data code word in the data recording region, and an arrangement of the error correction code word in the error correction code recording region are determined by a system determined by JISX0510.

Incidentally, as described in FIG. 26A, an information code 200' is generated. In the information code 200', the code word in a partial region includes a code word shown only by a white cell (a data code word configured only by a white cell, a fill up code word, or the like). A region AR shown only by the white cell is defined as the free space 210. As described in FIG. 26B, at least one of a design including a figure, a pattern, a color, or a combination of them, and information shown by one or more symbols is displayed inside the free space 210. When the free space 210 displays the design D as described in FIG. 26B, although a configuration is different from an original data display as described in FIG. 26A, an error of a data in the free space 210 may be corrected by a known error correction using the error correction code recorded in the error correction code recording region.

In the information code 200 as described in FIG. 26B, since a position of the free space 210 is identified in advance, an error position in the display is recognized in advance in a case where a design and information are added and displayed inside the free space 210. Therefore, it is possible to configure the error correction code of the error correction code recording region so as to perform an erasure correction by defining a position of the free space 210 as an error position. In this case, by recording information indicating a position of the free space 210 to the data recording region in advance or by recording the information to the read apparatus 10 in advance (FIG. 1), it is possible that the read apparatus 10 identifies the position (that is, a position of the data code word having an error) of the free space 210 at the time of reading. So that the read apparatus 10 corrects the data code word existing in the free space 210 whose position is identified, the erasure correction may be performed with the error correction code recorded in the error correction code recording region.

According to this configuration, among data recorded in the data recording region, a data code word showing a data (a decode target data that is an output target) disposed before a terminal indicating a termination of a decode target data may be disposed at an outside of the free space 210, and a region of a fill up code word (a data that is not decoded) disposed after the termination may be the free space 210. Alternatively, so that a cell in the free space 210 corresponds to a white cell, a data code word may be configured and disposed inside the free space 210.

In the free space 210 of the information code 200, the personal image D illustrates at least a part of the person as described in FIG. 26B, a design (a shape, a pattern, a color, or a combination of them) specifying the classification regarding the person identified by the personal image D in the display region shows the specific portion (for example, the specific portion of the position detection pattern 104) in the code area. Incidentally, in this example, although the personal image D is illustrated in the free space 110, the display target may be the corporation specific image or may be the target specific image. In either case, a design (a shape, a pattern, a color, or a combination of them) specifying a classification regarding the display target may be shown at the specific portion in the code area.

Third Embodiment

The third embodiment will be explained.
The information code use system in the third embodiment has the hardware configuration identical to the first embodiment, and the configuration as described in FIG. 1 and FIG. 2 is used.

Figure 27A:
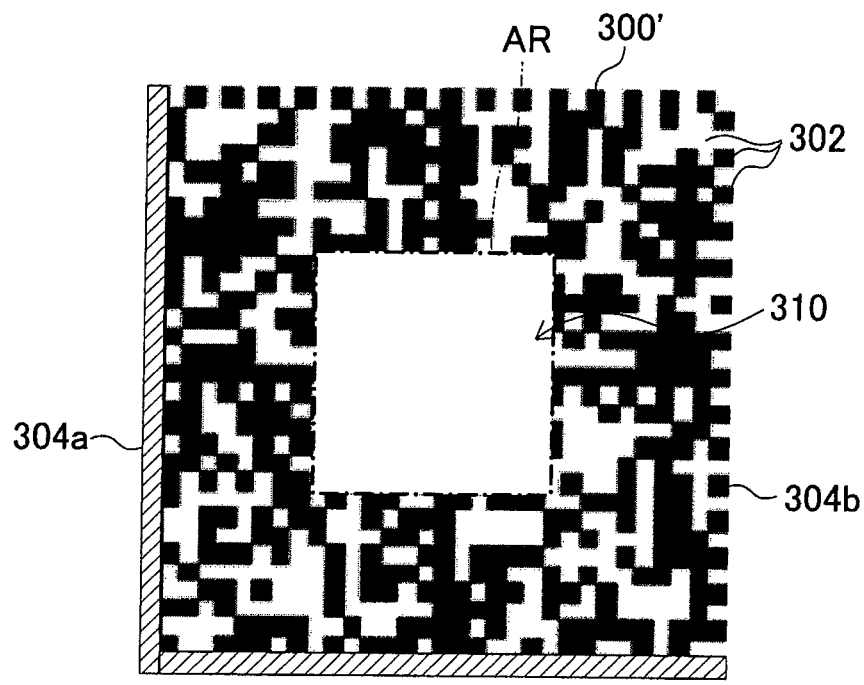
FIG. 27A is a diagram explaining the information code used in the information code use system according to a third embodiment and illustrating a status where a free space is blank.
Figure 27B:
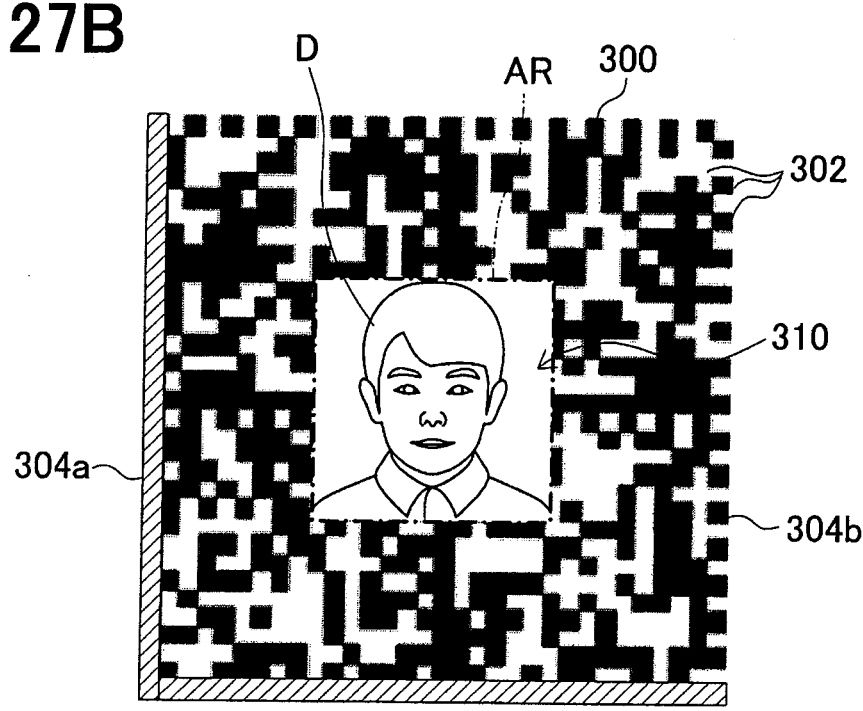
FIG. 27B is a diagram illustrating a status where a specific image is disposed to the free space.
Figure 28:
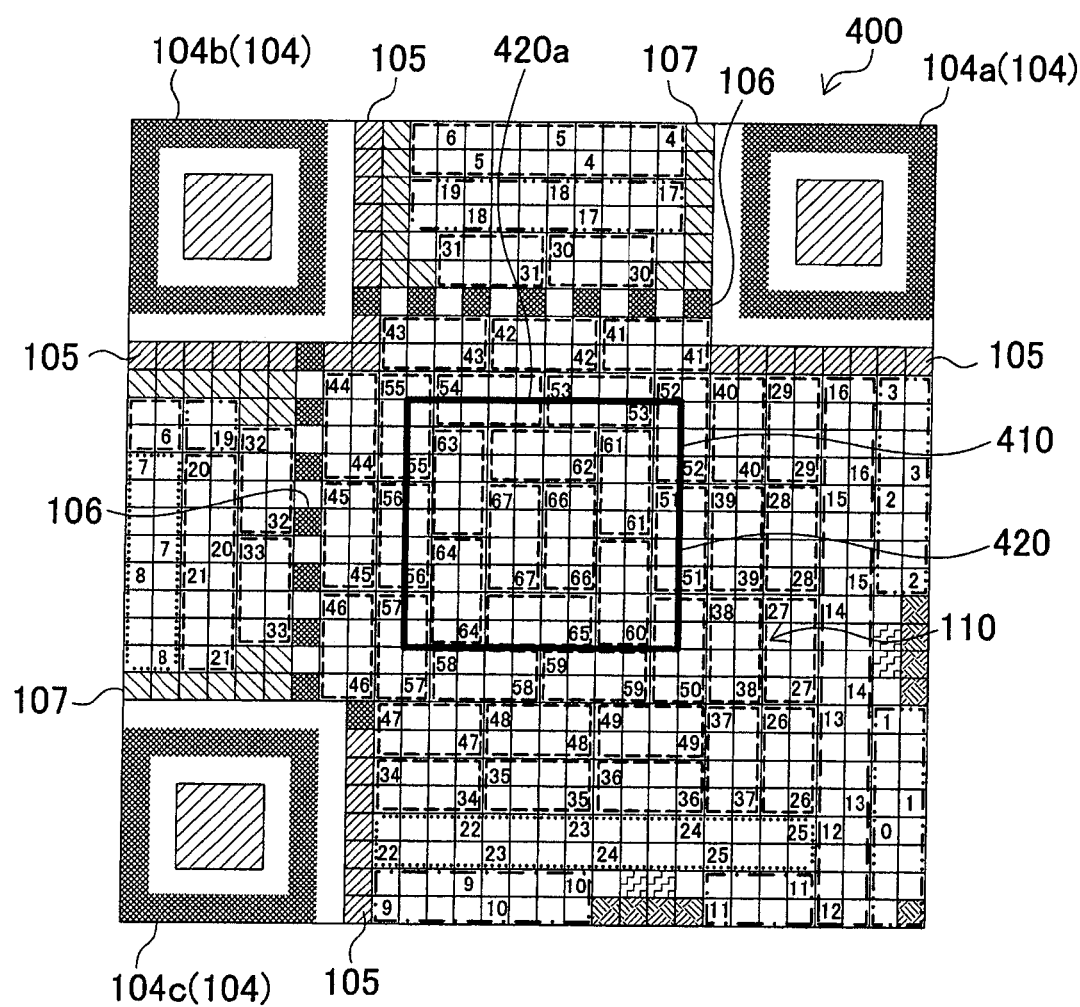
FIG. 28 is a diagram explaining the information code used by the information code use system according to a fourth embodiment.

In the information code use system of the third embodiment, the information code generation apparatus 2 (referring to FIG. 1 or the like) generates an information code 300 as described in FIG. 27B. In this configuration, the specific pattern region where a specific pattern (an alignment pattern 304a in a L-shape, and a timing cell 304b having a bright color cell and a dark color cell alternately in a single cell and configuring a L-shape region along a border of the code area) having a predetermined shape, and a data recording region storing a data by a multiple kinds of cells are provided in the code area. In the code area, at a position other than the specific pattern region, by a manner different from a manner storing a data to the data recording region, a free space 310 that enables to record the data or to display a design is provided with a predetermined size larger than a size of a single cell.

In this configuration, the configuration other than the free space 310 is configured as a known data matrix code. As described in FIG. 27A, in the code area, the specific pattern region, the data recording region, and the error correction recording region storing the error correction code by the multiple kinds of cells are provided. Incidentally, a record method of a data code word in the data recording region and a record method of the error correction code word in the error correction code recording region are similar to the known data matrix code. An arrangement of the alignment pattern 340a and the timing cell 304b in the code area, an arrangement of the data code word in the data recording region, and an arrangement of the error correction code word in the error correction code recording region are determined in accordance with a system determined by ECC200 version, for example.

Incidentally, as described in FIG. 27A, an information code 300' is generated. In the information code 300', the code word in a partial region includes a code word shown only by a white cell. A region AR shown only by the white cell is defined as the free space 310. As described in FIG. 27B, at least one of a design including a figure, a pattern, a color, or a combination of them, and information shown by one or more symbols is displayed inside the free space 310. When the free space 310 displays the design D as described in FIG. 27B, although a configuration is different from an original data display as described in FIG. 27A, an error of a data in the free space 310 may be corrected by a known error correction using the error correction code recorded in the error correction code recording region.

In the information code 300 as described in FIG. 27B, since a position of the free space 310 is identified in advance, an error position in the display is recognized in advance in a case where a design and information are added and displayed inside the free space 310. Therefore, it is possible to configure the error correction code of the error correction code recording region so as to perform an erasure correction by defining a position of the free space 310 as an error position. In this case, by storing information indicating a position of the free space 310 to the data recording region in advance or by storing the information to the read apparatus 10 in advance (FIG. 1), it is possible that the read apparatus 10 identifies the position (that is, a position of the data code word having an error) of the free space 310 at the time of reading. So that the read apparatus 10 corrects the data code word existing in the free space 310 whose position is identified, the erasure correction may be performed with the error correction code recorded in the error correction code recording region.

In the free space 310 of the information code 300, the personal image D illustrating at least a part of the person as described in FIG. 27B is included. A design (a shape, a pattern, a color, or a combination of them) specifying the classification regarding the person identified by the personal image D in the display region shows the specific portion (for example, the alignment pattern 304a) in the code area. Incidentally, in this example, although the personal image D is illustrated in the free space 110, the display target may be the corporation specific image or may be the target specific image. In either case, a design (a shape, a pattern, a color, or a combination of them) specifying a classification regarding the display target may be shown at the specific portion in the code area.

Fourth Embodiment

The fourth embodiment will be explained.

Figure 29:
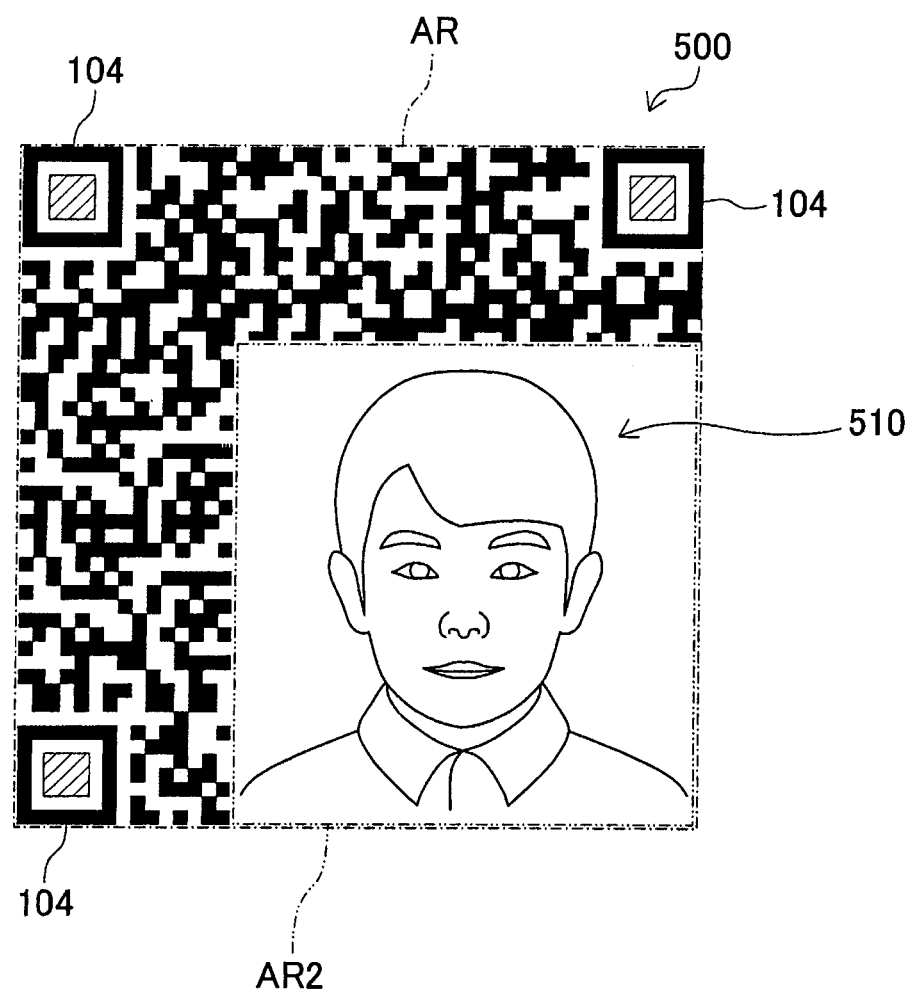
FIG. 29 is a diagram explaining the information code used by the information code use system according to another embodiment.

Although the fourth embodiment has a free space similar to the free space in the first embodiment, only a manner to specify the free space is different from the first embodiment. For example, multiple model numbers are prepared in a classification of an information code 400. The number of rows and columns of cells for each model number, a shape and a position of a specific pattern, a position of format information, and a candidate position (an address) of a cord word are determined in advance. When the generating device 2 generates the information code 400, a model number is disposed to a position (a reserved region 107 in the example of FIG. 29) determined in the code area. Therefore, when the read apparatus 10 reads the information code 400, the read apparatus 10 analyzes the code image of the information code 400, and reads the model number information disposed at a predetermined position. It is possible to recognize the number of rows and columns of cells in the information code 400, a shape and a position of the specific pattern, a position of the format information, and a candidate position (an address) of the code word.

When generating the information code 400, either of the model number is selected from multiple model numbers prepared in advance. Accordingly, a basic constitution (a position of the specific pattern 104, the number of rows and columns of cells, a candidate position of a code word) in a code area is determined. For example, in the model number of a configuration in FIG. 29, it is a cell arrangement having 29 rows and 29 columns. At predetermined three corners, the specific pattern 104 having a structure identical with a segment symbol of a QR code (a registered trademark). A region (a predetermined position 105) storing the format information is provided at a predetermined position close to the specific pattern 104. In the matrix region of 29 rows and 29 columns, the candidate position of the code word is predetermined at a position other than the specific pattern 104 and the predetermined position 105, and addresses of 0-67 is assigned to each candidate position. Thus, since a configuration in the code area is predetermined by a configuration corresponding to the model number, when the model number is identified, it is possible to specify that a position of a code word in a sequence order. Incidentally, the information on the determined model number is recorded on a predetermined fixed position in an arrangement in the model number. For example, in the example of FIG. 29, the information on the model number is recorded on the field 107 that is identified by predetermined kinds of hatchings.

And, after determining the model number and determining the basic configuration in the code area, the shape and the position of the free space are determined. A determination method of the shape of the free space may be any method described above. For example, the determination method of the shape of the free space may be determined by a system in which it is selected from multiple candidate shapes, which are prepared. Alternatively, the shape of the free space may be determined by a system in which the shape of the free space is set to a shape according to shape designation information that is input to the information code generation apparatus 2 from the external portion. In addition, the position of the free space may be determined to a predetermined fixed position, or may be determined to a position according to information that a user inputs for designating the position.

After determining the free space, the information code 400 is generated with a configuration in which each of a code word of the data recording region and the code word of the error correction code recording region is disposed to a candidate position of the code word separating from the position of the determined free space. For example, in the model number of the configuration in FIG. 29, the specific pattern 104 is disposed to the three corners, and candidate positions of 68 code words having the number of 0-67 is predetermined on the basis of the positions of the specific patterns 104. In this layout, when the free space 410 is determined as described in FIG. 29, the candidate position of the code word whose at least a part is included in the free space 410 is removed from the arrangement target position, a position of the removed code word is skipped, and the code word is disposed in order. For example, since the free space 410 is set up so as to get in the candidate position of the code words of No. 50, No. 51, No. 53, No. 54, and No. 60-67, the code word is not disposed to the candidate position of the code words of No. 50, No. 51, No. 53, No. 54 and No. 60-67. That is, after arranging the code word in order in the positions of No. 0-49, the positions of No. 50 and No. 51 is skipped and the code word is disposed in the position of No. 52 and the positions to No. 53 and No. 54 is skipped and the code word is disposed in order in the positions of No. 55-59. Accordingly, it is possible to surely arrange the data code word that is encoded the decode target data and the error correction code word that shows the error correcting code at the candidate position that is separated from the free space 410.

After determining the specific pattern region (regions of the specific pattern 104 and another specific pattern), the format region (the predetermined position 105), the model number field 107, and each code word region, the concrete content of the free space 410 is determined.

In the free space 410 of the information code 400, for example, the personal image D similar to the personal image in FIG. 9 or the like may be included, and a design (a shape, a pattern, a color, or a combination of them) specifying the classification regarding the person identified by the personal image in the display region shows the specific portion (for example, the position detection pattern 104) in the code area. Incidentally, the display target in the free space 110 may be the corporation specific image or may be the target specific image. In any cases, a design (a shape, a pattern, a color or a combination of them) specifying the classification regarding the display target may be shown in the specific portion of the code area.

Other Embodiment

The present disclosure is not limited to the embodiments described with the description and the drawings, and, for example, the following embodiment is also contained in the technical scope of the present disclosure.

In the embodiments, the classification to which the display content shown by the code area is shown by a design of the specific portion in the code area. The classification to which the record content of the code area belongs may be shown by a design of the specific portion in the code area. For example, when the data recording region stores information (a personal ID, a name, an appellation, an E-mail address, or the like) specifying a person, a classification to which the person belongs may be shown by a design of the specific portion in the code area. When the data recording region stores information (a corporation ID, a name, a URL, or the like) specifying the corporation, a classification to which the corporation belongs may be shown by a design of the specific portion in the code area.

Although the information code generation apparatus 2 and the information code read apparatus 10 are separately configured in the configuration of FIG. 1 or the like, the information code generation apparatus 2 may be configured as the information code read apparatus 10.

Figure 30:
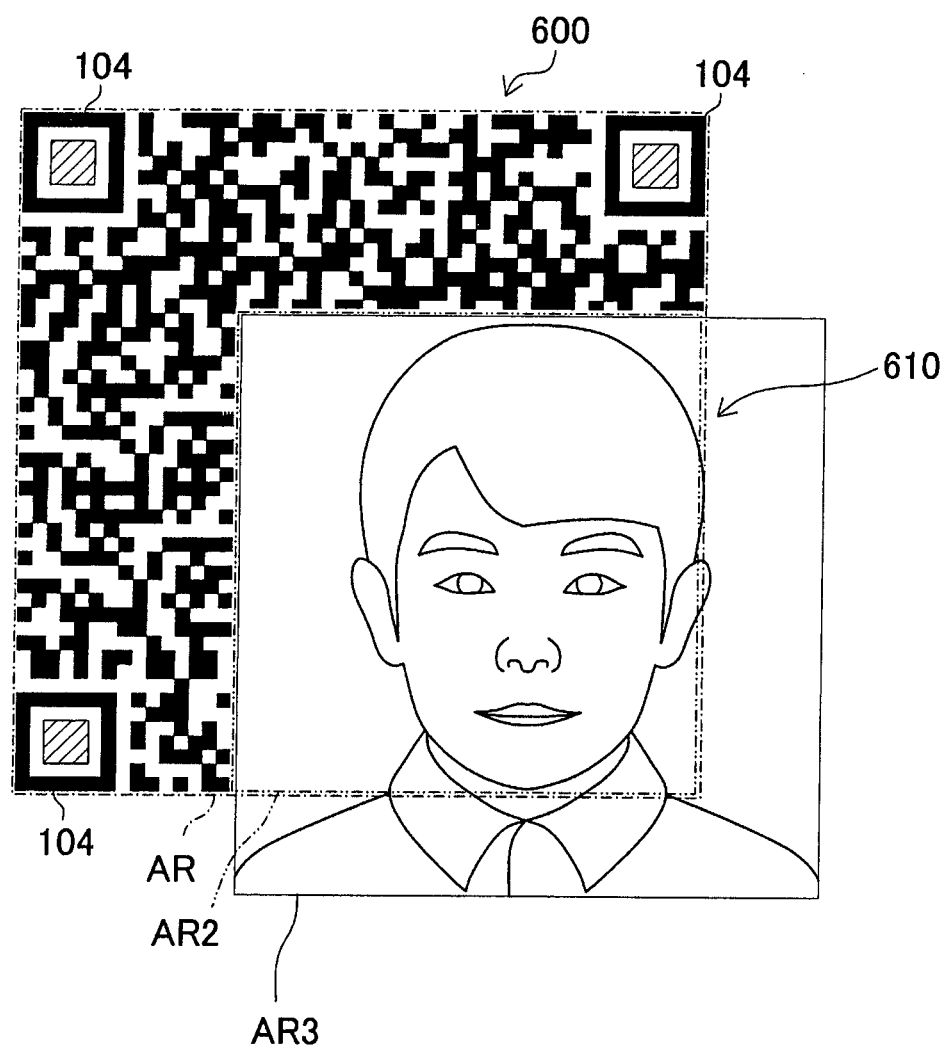
FIG. 30 is a diagram explaining another example of the information code used by the information code use system according to another embodiment.

According to the embodiments, although an example of the code area is illustrated, the code area may be a minimum square region or a rectangular region including all of multiple kinds of cells, which constitute an information code, and a cell may be disposed at a part of an inner edge portion of the code area. For example, the free space 510 may be provided adjacent to a peripheral portion of the code area such as an information code 500 of FIG. 29. In this case, the minimum square region or rectangular region containing all of multiple kinds of cells constituting the information code 500 is illustrated as a dashed dotted line AR, and the outer edge of the free space 510 may be illustrated by, for example, a two-dot chain line AR2. At least a part of the display region may exist in the code area, and a residual part of the display region may exist out of the code area as illustrated with a display region AR3 in an information code 600 of FIG. 30. Incidentally, an example of FIG. 30 illustrates a free space 610 similar to the free space 510 of FIG. 29, and the display region AR3 is larger than the free space 610. In an example such as the example of FIG. 30, it may be preferable that the data recording region stores information specifying a range of the image region AR3, in advance.

Although the information code generation apparatus 2 is configured as the information code generation portion in the embodiments, the information code generation portion may be a system including multiple apparatus that are communicable each other.

Although the information code read apparatus 10 corresponding to the information code read portion is configured as the portable terminal in the embodiments, the information code read apparatus may be a stationary apparatus. The information code read portion may be configured from multiple apparatus that are communicable each other.

In the embodiments, although the example in which a part of the code area is shown by a color specifying a classification regarding a code content of at least either the record content stored in the code area or the display content shown by the code area, the example shown by a pattern specifying a classification regarding the code content, and the example shown using a shape specifying a classification regarding the code content are described, a part of the code area may be shown by a combination of them. For example, a classification 1 may be defined in a case where the design of the specific site (for example, the center rectangular region in the position detection pattern 104) is a red hatching pattern, a classification 2 may be defined in a case where the design is a blue cross-hatching pattern, a classification 3 may be defined in a case where the design is green striped pattern, and a classification 4 may be defined in a case where the design is a red striped pattern. Thus, the classification regarding the code content may be shown by a combination of a color and a pattern. Alternatively, a classification 1 may be defined in a case where the design of the specific site (for example, the center rectangular region in the position detection pattern 104) is in red and the outer shape is a circular shape, a classification 2 may be defined in a case where the design is in blue and the outer shape is a box shape, a classification 3 may be defined in a case where the design is in brown and the outer shape is a hexagonal shape, and a classification 4 may be defined in a case where the design is in red and the outer shape is a triangular shape. Thus, the classification regarding the code content may be shown by a combination of a color and a shape. Alternatively, a classification 1 may be defined in a case where the design of the specific site (for example, the center rectangular region in the position detection pattern 104) has a cross-hatching pattern and the outer shape is a circular shape, a classification 2 may be defined in a case where the design has a hatching pattern and the outer shape is a box shape, a classification 3 may be defined in a case where the design has striped pattern and the outer shape is a hexagonal shape. Thus, the classification regarding the code content may be shown by a combination of a pattern and a shape. Alternatively, a classification 1 may be defined in a case where the design of the specific site (for example, the center rectangular region in the position detection pattern 104) has a red hatching pattern and the outer shape is a circular shape, a classification 2 may be defined in a case where the design has a red hatching pattern and the outer shape is a box shape, a classification 3 may be defined in a case where the design has a blue hatching pattern and the outer shape is a circular shape, and a classification 4 may be defined in a case where the design has a green striped pattern and the outer shape is a triangular shape. Thus, the classification regarding the code content may be shown by a combination of a color, a pattern and a shape.

The design of the specific portion (for example, the central rectangular region in the position detection pattern 104) may be a picture, a LOGO, and a company mark. A color of them may be changed.

According to a first aspect, the information code generation method generates the information code in which cells are arranged in a predetermined code area, using the information code generation apparatus. The cells function as a unit of information. In the information code generation method, the specific pattern region in which a specific pattern having a predetermined shape is disposed and the data recording region storing data by multiple kinds of cells are provided in the code area. At least a part of the code area is shown using a shape, a pattern, a color or a combination of them. The shape, the pattern, the color or the combination of them specify a classification regarding code content of at least either the record content stored in the code area or the display content shown in the code area.

According to the second aspect, an information code is arranged with cells inside a predetermined code area. The cells functions as a unit of information. The information code includes a specific pattern region disposed with a specific pattern having a predetermined shape inside the code area, and a data recording region storing data with multiple kinds of cells. A shape, a pattern, a color, or a combination of the shape, the pattern, and the color identifies a classification regarding a code content of at least either a record content that is stored inside the code area or a display content that is displayed in the code area. At least a part of the code area is shown using the shape, the pattern, the color, or the combination of the shape, the pattern, and the color.

According to a third aspect, an information code use system includes an information code generation portion producing an information code, and an information code display portion enabling to display the information code generated by the information code generation portion. Cells are arranged inside a predetermined area of the information code, and the cells function as a unit of information. The information code generation portion provides a specific pattern region disposed with a specific pattern having a predetermined shape and a data recording region storing a data by multiple kinds of cells inside the code area. The information code generation portion generates the information code that shows at least a part of the code area using a shape, a pattern, a color, or a combination of the shape, the pattern, and the color that identifies a classification regarding a code content of at least either a record content stored in the code area or a display content displayed on the code area. The information code display portion includes a display device enabling to display an image. The display device displays the information code generated by the information code generation portion.

According to a fourth aspect, an information code use system includes an information code generation portion producing an information code, and an information code read portion reading the information code generated by the information code generation portion. Cells are arranged inside a predetermined code area of the information code, and the cells function as a unit of information. The information code generation portion provides a specific pattern region disposed with a specific pattern having a predetermined shape and a data recording region storing data by multiple cells inside the code area. The information code generation portion generates the information code that shows at least a part of the code area using a shape, a pattern, a color, or a combination of the shape, the pattern, and the color that identifies a classification regarding a code content of at least either a record content stored in the code area or a display content displayed on the code area.

According to the information code generation method, in the generated information code, it is possible to show at least a part of the code area using a shape, a pattern, a color, or a combination of them that specify a classification regarding the code content (at least either the record content stored in the code area or a display content shown in the code area). According to the information code, it is possible that a user and a third person recognize a classification of a target shown by the information code without reading, and that a new use method is performed. The new use method cannot be performed with a conventional information code.

According to the information code of the present disclosure, it is possible to provide information code that has an effect similar to the information code generation method.

Furthermore, the information code generation method may include a display region where a predetermined display target is displayed, inside the code area. It is possible to improve a design property. Since the display target and a design (a shape, a pattern, a color, or a combination of them) specifying a classification of the display target may be shown in the identical code area, it is possible to provide a novel method of use in which, when a user and a third person look at the information code, they are caused to immediately recognize the display target and the classification of the display target through an visual association.

The information code generation method may include a personal image illustrating at least a part of the person as the display target. At least a part of the code area may show the design (the shape, the pattern, the color, or the combination of them) specifying a classification regarding the person identified by the personal image. Accordingly, it is possible to show the information code while associating with the person, and a characteristic and a novel method of use in which the classification of the person displayed on the information code is immediately recognized may be possible.

The information code generation method may include the corporation specific image illustrating a content specifying the corporation as the display target. At least a part of the code area may be shown by the design (the shape, the pattern, the color, or the combination of them) specifying the classification regarding the corporation identified by the corporation specific image. According to this configuration, it is possible to display the information code while associating a corporation, and a characteristic and a novel method of use in which the classification of the person displayed on the information code is immediately recognized may be possible.

The information code generation method may include a target specific image specifying at least one of a product, a predetermined item other than the product, a service, and a predetermined action other than the service as the display target. At least a part of the code area may be shown using the shape, the pattern, the color or the combination of them, specifying the classification regarding at least one of the product, the predetermined item other than the product, the service, and the predetermined action other than the service identified by the target specific image. According to the configuration, it is possible to display the information code while associating with the display target (the product or the like), and a characteristic and a novel method of use in which the classification of the target (the product or the like) displayed on the information code is immediately recognized may be possible.

The information code generation method may secure a region (a free space) where a decode target data is not stored by a cell at a position other than the data recording region and the specific pattern region inside the code area. In addition, the information code generation method may generate the information code in which the free space is used as the display region displaying the target other than the cell. Since, in the free space, the decode target data is not stored by the cell, the display region may be hardly influenced by the cell and the display region may be configured more freely.

The information code generation method may show the specific portion configuring at least a part of the specific pattern region using a shape, a pattern, a color, and a combination of them specifying a classification regarding code content. Accordingly, when the specific portion in the specific pattern region is used as the display region of the design (the shape, the pattern, the color, or the combination of them) specifying the classification, it is possible to prevent the display content of the data recording region from changing by being influenced by the design. That is, it is possible to display the classification and to secure a stability of a display of the data recording region, so that it is possible to effectively prevent read defect.

The information code generation method may arrange a position detection pattern at a specific pattern region. The information code generation method may show the specific portion configuring at least a part of the position detection pattern by a design (a shape, a pattern, a color or a combination of them) specifying a classification regarding a code content. When the design specifying the classification is shown by the position detection pattern, which is conspicuous, a user and a third person who looks at the information code may recognize the classification associated with the code content more surely.

Furthermore, the information code generation method may store identification information to the data recording region, the identification information illustrating that a part of the code area is shown by a design (a shape, a pattern, a color or a combination of them) specifying a classification regarding the code content. According to this configuration, it is possible to determine based on the record content of the data recording region at the time of reading whether the information code is a normal information code without showing the classification or a characteristic information code with showing the classification in the code area.

The information code generation method may store display mode identification information to the data recording region, the display mode identification information specifying the display mode, which is displayed by the design (the shape, the pattern, the color, or the combination of them) specifying the classification. According to this configuration, it is possible to recognize the classification to which the code content belongs from content of the data recording region and from appearance of the code.

According to the information code of the present disclosure, it is possible to provide information code that has an effect similar to the information code generation method.

According to the information code use system, it is possible to provide information code that has an effect similar to the information code generation method. A novel method of use in which the information code showing the classification to which the code content belongs visually recognizably is displayed and used in the display device may be possible.

According to the information code use system, it is possible to use and display the information code in the portable terminal provided by a user, and, in addition, to show the classification to which the code content belongs of the information code on a display screen of the portable terminal in a visually recognize manner.

According to the information code use system, it is possible to provide a system in which a code image data of the information code generated by the information code generation portion is transmitted to the external portion from the information code generation portion and the information code display portion configured as another apparatus receives the code image date to display as the information code. Especially, this configuration may be advantageous for an application when an apparatus generating an information code and an apparatus displaying are configured separately and the apparatus for displaying downloads.

Furthermore, according to the information code use system, in the memory portion included in the information code generation portion, it is possible to store each data (each registration data) for generating the information code associated with each registration target, and it is possible to successively generate the information code associated with the registration target each either of the registration target is designated.

The information code use system may include an update portion in the information code generation portion, and may update a classification information corresponding to the registration target stored in the memory portion to a content designated by the change command, based on a case where the change command for changing the classification content of either of the registration target is input from the external portion. In this configuration, when changing the registration content (the classification information) at a side of the information code generation portion, the design of the classification of the information code displayed by a terminal is changed according to changing, and there is an advantage in an application a classification is changed in a certain amount of frequency.

According to the information code use system, it is possible to provide a system in which an information code having an effect similar to the information code generation method is generated. The information code use system is an electrically readable system.

According to the information code use system, it is possible to provide an information code use system that has an effect similar to the information code generation method.

The information code generation apparatus 2 corresponds to an example of an information code generation portion and a generation system. The control portion 3 corresponds to an example of a generation processing portion, an acquisition portion, a read portion, and an update portion. The communication portion 7 corresponds to an example of a transmission portion. The information code read apparatus 10 corresponds to an example of an information code read portion. The portable terminal 90 corresponds to an example of an information code display portion and a terminal apparatus. The control portion 91 corresponds to an example of a display control portion. The display portion 94 corresponds to an example of a display device. The communication portion 95 corresponds to an example of a receiver portion. The position detection patterns 104, 204 correspond to an example of a specific pattern. The alignment pattern 304a corresponds to an example of a specific pattern. The timing cell 304b corresponds to an example of a specific pattern. The free spaces 110, 210, 310, 410, 510, 610 correspond to an example of a display region.

While the embodiments, the configurations, the modes of the information code use system, the information code, and the information code generation method are exemplified, an embodiment, a configuration and a mode according to the information code use system, the information code, and the information code generation method is not limited to the above described each embodiments, each configuration, and each mode. For example, an embodiment, a configuration and a mode obtained by appropriately combining technical parts disclosed in different embodiments, configurations, and modes is included in a scope of an embodiment, a configuration and a mode according to the information code use system, the information code, and the information code generation method.

What is claimed is:
1. An information code generation method producing information code by an information code generation apparatus, cells being arranged inside a predetermined code area of the information code, the cells functioning as a unit of information, the information code generation method comprising:

providing a specific pattern region and a data recording region inside the code area, the specific pattern region being disposed with a specific pattern having a predetermined shape, the specific pattern region being placed at a predetermined position in the code area and indicating existence of the information code, the data recording region storing a data using a plurality of kinds of cells; and showing at least a part of the code area using a shape, a pattern, a color, or a combination of the shape, the pattern, and the color, wherein the shape, the pattern, the color, or the combination of the shape, the pattern, and the color identifies a classification regarding a code content of at least either a record content stored in the code area or a display content shown in the code area, the classification identifies a particular information code as being among a same kind of a plurality of information codes.

2. The information code generation method according to claim 1, comprising:

providing a display region inside the code area, wherein the display region shows a predetermined display target different from the cell and the specific pattern at least; and showing the at least part of the code area using a shape, a pattern, a color, or a combination of the shape, the pattern, and the color that identifies the classification regarding the display target.

3. The information code generation method according to claim 2, comprising:

including, as the display target, a personal image illustrating at least a part of a person; and showing the at least part of the code area using the shape, the pattern, the color, or the combination of the shape, the pattern, and the color that identifies the classification regarding the person identified by the personal image in the display region.

4. The information code generation method according to claim 2, comprising:

including, as the display target, a corporation specific image illustrating a content that identifies a corporation; and showing the at least part of the code area using the shape, the pattern, the color, or the combination of the shape, the pattern, and the color that identifies the classification regarding the corporation identified by the corporation specific image in the display region.

5. The information code generation method according to claim 2, comprising:

including, as the display target, a target specific image that identifies at least one of a product, a predetermined item other than the product, a service, and a predetermined action other than the service; and showing the at least part of the code area using the shape, the pattern, the color, or the combination of the shape, the pattern, and the color that identifies the classification regarding the at least one of the product, the predetermined item other than the product, the service, and the predetermined action other than the service, which are identified by the target specific image in the display region.

6. The information code generation method according to claim 2, comprising:

providing a free space where a decode target data is not stored by the cell, inside the code area at a position other than the specific pattern region and the data recording region, wherein:

the free space is larger than a size of a single cell; and the free space includes the display region.

7. The information code generation method according to claim 1, comprising:

showing a specific portion configuring at least a part of the specific pattern region using the shape, the pattern, the color, or the combination of the shape, the pattern, and the color that identifies the classification regarding the code content.

8. The information code generation method according to claim 7, comprising:

disposing a position detection pattern to the specific pattern region; and showing the specific portion configuring at least a part of the position detection pattern using the shape, the pattern, the color, or the combination of the shape, the pattern, and the color that identifies the classification regarding the code content.

9. The information code generation method according to claim 1, comprising:

storing identification information to the data recording region, wherein:

the identification information illustrates that a part of the code area is shown using the shape, the pattern, the color, or the combination of the shape, the pattern, and the color that identifies the classification regarding the code content.

10. The information code generation method according to claim 1, comprising:

storing display mode identification information that identifies a display mode to the data recording region, wherein:

the display mode is illustrated using the shape, the pattern, the color, or the combination of the shape, the pattern, and the color that identifies the classification.

11. An information code arranged with cells inside a predetermined code area, the cells functioning as a unit of information, the information code comprising:

a specific pattern region disposed with a specific pattern having a predetermined shape inside the code area, the specific pattern region being placed at a predetermined position in the code area and indicating existence of the information code; and a data recording region storing data with a plurality of kinds of cells, wherein:

a shape, a pattern, a color, or a combination of the shape, the pattern, and the color identifies a classification regarding a code content of at least either a record content that is stored inside the code area or a display content that is displayed in the code area, the classification identifies a particular information code as being among a same kind of a plurality of information codes; and at least a part of the code area is shown using the shape, the pattern, the color, or the combination of the shape, the pattern, and the color.

12. The information code according to claim 11, comprising:

a display region showing at least a predetermined display target different from the cell and the specific pattern inside the code area, wherein:

at least a part of the code area is shown using the shape, the pattern, the color, or the combination of the shape, the pattern, and the color that identifies the classification regarding the display target.

13. The information code according to claim 12, wherein: the display target includes a personal image illustrating at least a part of a person; and at least a part of the code area is shown using the shape, the pattern, the color, or the combination of the shape, the pattern, and the color that identifies the classification regarding the person identified by the personal image in the display region.

14. The information code according to claim 12, wherein: the display target includes a corporation specific image illustrating a content that identifies a corporation; and at least a part of the code area is shown using the shape, the pattern, the color, or the combination of the shape, the pattern, and the color that identifies the classification regarding the corporation identified by the corporation specific image in the display region.

15. The information code according to claim 12, wherein: the display target includes at least one of a product, a predetermined item other than the product, a service, and a predetermined action other than the service; and at least a part of the code area is shown using the shape, the pattern, the color, or the combination of the shape, the pattern, and the color that identifies the classification regarding the product, the predetermined item other than the product, the service, and the predetermined action other than the service, which are identified by a target specific image in the display region.

16. The information code according to claim 12, further comprising:

a free space where a decode target data is not stored by the cell is provided inside the code area at a position other than the specific pattern region and the data recording region, wherein:

the free space is larger than a size of a single cell; and
the free space includes the display region.

17. The information code according to claim 11, wherein a specific portion configures at least a part of the specific pattern region; and the specific portion is shown using the shape, the pattern, the color, or the combination of the shape, the pattern, and the color that identifies the classification regarding the code content.

18. The information code according to claim 17, wherein: a position detection pattern is disposed to the specific pattern region;

the specific portion configures at least a part of the position detection pattern; and the specific portion is shown using the shape, the pattern, the color, or the combination of the shape, the pattern, and the color that identifies the classification regarding the code content.

19. The information code according to claim 11, wherein: the data recording region stores identification information illustrating that a part of the code area is shown using the shape, the pattern, the color, or the combination of the shape, the pattern, and the color that identifies the classification regarding the code content.

20. The information code according to claim 11, wherein: display mode identification information identifies a display mode that is displayed using the shape, the pattern, the color, or the combination of the shape, the pattern, and the color, which identifies the classification; and the data recording region stores the display mode identification information.

21. An information code use system comprising:

an information code generation portion producing an information code, cells being arranged inside a predetermined area of the information code, the cells functioning as a unit of information; and an information code display portion enabling to display the information code generated by the information code generation portion, wherein:

the information code generation portion provides a specific pattern region disposed with a specific pattern having a predetermined shape and a data recording region storing a data by a plurality of kinds of cells inside the code area, the specific pattern region being placed at a predetermined position in the code area and indicating existence of the information code;

the information code generation portion generates the information code that shows at least a part of the code area using a shape, a pattern, a color, or a combination of the shape, the pattern, and the color that identifies a classification regarding a code content of at least either a record content stored in the code area or a display content displayed on the code area, the classification identifies a particular information code as being among a same kind of a plurality of information codes;

the information code display portion includes a display device enabling to display an image; and the display device displays the information code generated by the information code generation portion.

22. The information code use system according to claim 21, wherein:

the information code generation portion and the information code display portion are provided to an identical portable terminal.

23. The information code use system according to claim 21, wherein:

the information code generation portion includes a generation system including a generation processing portion generating a code image data to display the information code, and a transmission portion transmitting the code image data generated by the generation processing portion; and the information code display portion includes a terminal apparatus including the display device, a receiver portion receiving the code image data transmitted from the transmission portion in the information code generation portion, and a display control portion controlling the display device to display the information code based on the code image data received by the receiver portion.

24. The information code use system according to claim 21, wherein:

the information code generation portion includes a memory portion storing a registration data regarding each of a plurality of registration targets when each of the plurality of registration targets is associated with classification information, each of the plurality of registration targets being either a subject or an object,
an acquisition portion obtaining input information when designation information designating either of the registration targets from an external portion of the information code generation portion, and
a read portion searching the memory portion based on the designation information obtained by the acquisition portion and reading the registration data regarding a registration target designated by the designation information;
the information code generation portion generates the information code; and
in the information code,
based on the registration data of the registration target read by the read portion, the data recording region stores a content regarding the read registration target or the code area shows the content regarding the read registration target, and
the classification identified by the classification information stored and associating with the registration target in the memory portion is shown using the shape, the pattern, the color, or the combination of the shape, the pattern, and the color.

25. The information code use system according to claim 24, wherein:
the information code generation portion includes an update portion; and
the update portion updates the classification information corresponding to the registration target stored in the memory portion to a content designated by a change command, based on the change command that changes a classification content of either of the registration target, the change command being input from an external portion.

26. The information code use system according to claim 21, wherein:
the information code generation portion provides a display region inside the code area;
the display region at least displays a predetermined display target different from the cell and the specific pattern; and
the information code generation portion generates the information code that shows at least a part of the code area using the shape, the pattern, the color, or the combination of the shape, the pattern, and the color that identifies the classification regarding the display target.

27. The information code use system according to claim 26, wherein:
the information code generation portion causes the display target to include a personal image illustrating at least a part of a person; and
the information code generation portion generates the information code that showing at least a part of the code area using the shape, the pattern, the color, or the combination of the shape, the pattern, and the color that identifies the classification regarding the person identified by the personal image in the display region.

28. The information code use system according to claim 26, wherein:
the information code generation portion causes the display target to include a corporation specific image illustrating a content of a corporation; and
the information code generation portion generates the information code that shows at least a part of the code area using the shape, the pattern, the color, or the combination of the shape, the pattern, and the color that identifies the classification regarding the corporation identified by the corporation specific image in the display region.

29. The information code use system according to claim 26, wherein:
the information code generation portion causes the display target to include a target specific image identifying at least either a product, a predetermined item other than the product, a service, or a predetermined action other than the service; and
the information code generation portion generates the information code that shows at least a part of the code area using the shape, the pattern, the color, or the combination of the shape, the pattern, and the color that identifies the classification of either of the product, the predetermined item other than the product, the service, or the predetermined action other than the service, which are identified by the target specific image in the display region.

30. The information code use system according to claim 26, wherein:
the information code generation portion provides a free space where a decode target data is not stored by the cell inside the code area at a position other than the specific pattern region and the data recording region;
the free space is larger than a size of a single cell; and
the information code generation portion generates the information code so that the display region is provided inside the free space.

31. The information code use system according to claim 21, wherein:
the information code generation portion generates the information code that shows a specific portion providing at least a part of the specific pattern region using the shape, the pattern, the color, or the combination of the shape, the pattern, and the color that identifies the classification regarding the code content.

32. The information code use system according to claim 31, wherein:
the information code generation portion disposes a position detection pattern to the specific pattern region; and
the information code generation portion generates the information code that shows the specific portion providing at least a part of the position detection pattern using the shape, the pattern, the color, or the combination of the shape, the pattern, and the color that identifies the classification regarding the code content.

33. The information code use system according to claim 21, wherein:
identification information illustrates that a part of the code area is shown using the shape, the pattern, the color, or the combination of the shape, the pattern, and the color that identifies the classification regarding the code content; and
the information code generation portion generates the information code that stores the identification information to the data recording region.

34. The information code use system according to claim 21, wherein:
display mode identification information identifies a display mode displayed using the shape, the pattern, the color, or the combination of the shape, the pattern, and the color, which identifies the classification; and the information code generation portion generates the information code that stores the display mode identification information to the data recording region.

35. An information code use system comprising:

an information code generation portion producing an information code, cells being arranged inside a predetermined code area of the information code, the cells functioning as a unit of information; and an information code read portion reading the information code generated by the information code generation portion, wherein:

the information code generation portion provides a specific pattern region disposed with a specific pattern having a predetermined shape and a data recording region storing data by a plurality of cells inside the code area, the specific pattern region being placed at a predetermined position in the code area and indicating existence of the information code; and the information code generation portion generates the information code that shows at least a part of the code area using a shape, a pattern, a color, or a combination of the shape, the pattern, and the color that identifies a classification regarding a code content of at least either a record content stored in the code area or a display content displayed on the code area, the classification identifies a particular information code as being among a same kind of a plurality of information codes.

* * * * *